(12) United States Patent
Sakane et al.

(10) Patent No.: US 6,864,351 B2
(45) Date of Patent: Mar. 8, 2005

(54) ALIPHATIC COPOLYESTER RESIN, A PREPARATION METHOD, AN ALIPHATIC POLYESTER RESIN COMPOSITION, USES THEREOF, A COATING COMPOSITION, A PARTICLE-STATE COMPOSITION FOR AGRICULTURE AND GARDENING COATED BY DEGRADABLE LAYER

(75) Inventors: Masanori Sakane, Himeji (JP); Masaaki Ito, Himeji (JP)

(73) Assignee: Daicel Chemical Industries, Inc., Sakai (JP)

( * ) Notice: Subject to any disclaimer, the term of this patent is extended or adjusted under 35 U.S.C. 154(b) by 0 days.

(21) Appl. No.: 10/261,422

(22) Filed: Sep. 30, 2002

(65) Prior Publication Data

US 2003/0187181 A1 Oct. 2, 2003

Related U.S. Application Data

(62) Division of application No. 09/600,242, filed on Sep. 14, 2000, now Pat. No. 6,509,440.

(51) Int. Cl.$^7$ .............................................. C08G 63/08
(52) U.S. Cl. ........................................ 528/354; 528/355
(58) Field of Search ................................. 528/354, 355, 528/220

(56) References Cited

FOREIGN PATENT DOCUMENTS

EP        0 261 470    *  3/1988

* cited by examiner

*Primary Examiner*—Tae H. Yoon
(74) *Attorney, Agent, or Firm*—Morgan & Finnegan, LLP

(57) ABSTRACT

In the present invention, there are obtained aliphatic polyesters having a controlled thermal decomposing property, hydrolizability, and biodegradability, in which OH terminals and COOH terminals are decreased to 50% and 30%, respectively, through a ring-opening polymerization of a lactone and lactide by a mono alcohol having a high boiling point or a metal alkoxide, or by further decreasing both terminals through combining produced polymer terminals with a diisocyanate and, from a composition containing the polyesters, there is obtained a particle-state composition for agriculture and gardening in which a duration period of a fertilizing effect can be controlled, and which is not remained in soil by decomposition. From a resin primarily containing fatty acid cellulose ester derivatives, there are obtained a base film for a marking film which does not include a problem such as volatilization and migration of a plasticizer and a picture image formable heat-sensitive transfer recording material which is excellent in strippability, coloring concentration, and brightness, a conductive coating composition which is excellent in storage stability, adhesion, and conductivity, a single-liquid type coating and a moisture-curable graft copolymer, and a coating composition which have a non toxicity and nonirritating property and which are excellent in dryability. A copolymer in which average chain length in lactone and lactide units are controlled is excellent in heat resistance and impact resistance.

4 Claims, 5 Drawing Sheets

US 6,864,351 B2

ALIPHATIC COPOLYESTER RESIN, A PREPARATION METHOD, AN ALIPHATIC POLYESTER RESIN COMPOSITION, USES THEREOF, A COATING COMPOSITION, A PARTICLE-STATE COMPOSITION FOR AGRICULTURE AND GARDENING COATED BY DEGRADABLE LAYER

This is a divisional of prior application Ser. No. 09/600,242, filed Sep. 14, 2000, now U.S. Pat. No. 6,509,440, to which priority under 35 U.S.C. § 120 is claimed.

TECHNICAL FIELD

No. I of the present invention relates to aliphatic polyesters having a controlled thermal decomposition property, hydrolyzability, and biodegradability, and a method for the preparation thereof. In more detail, it relates to aliphatic polyesters which comprise polymerizing a cyclic ester monomer using a monoalcohol as an initiator, aliphatic polyesters in which terminal groups are modified, and a method for the preparation thereof.

Further, No. II of the present invention relates to a particle-state fertilizer coated by a degradable thin layer which comprises a biodegradable terminal-controlled aliphatic polyester which comprises a monomer unit of at least any one of a lactone and lactide, in which proportion of the number of an alcohol-terminal is not more than 50% and/or proportion of the number of a carboxylic acid-terminal is not more than 30%.

Still further, No. III of the present invention relates to a particle-state fertilizer coated by a degradable thin layer which comprises a biodegradable cyclic ester-modified cellulose ester.

The thin layer to be employed for the particle-state fertilizer of the present invention is decomposed by microorganisms in soil, and it does not finally remain in soil. Further, in the thin layer, a variety of additives and chemicals can be added for adjusting elution of the particle-state fertilizer.

Also, No. IV of the present invention relates a base film for a marking film which comprises resins primarily containing a specified cellulose ester-based derivative. In more detail, it relates to a base film for a marking film which comprises resins primarily containing a specified cellulose ester derivative in which a cyclic ester is ring-opening graft-polymerized.

Also, No. V of the present invention relates a heat-sensitive transfer picture image recording material. In more detail, it relates to a heat-sensitive transfer picture image recording material having an excellent strippability from a heat-transfer sheet containing a sublimatable dye, in which concentration of coloration is high and, in which there can be formed a recorded picture image having an excellent brightness, and relates to a method for the preparation thereof.

Also, No. VI of the present invention relates a heat-sensitive transfer recording material and, in more detail, it relates to a heat-sensitive transfer recording material in which there are not caused a sticking phenomenon and a blocking phenomenon, and which is excellent in storage stability and printing quality.

Also, No. VII of the present invention relates a conductive coating composition. In more detail, it relates to a conductive coating composition which comprises a mixture of a resin for a conductive coating containing a cellulose ester derivative obtained by a ring-opening graft-polymerization of cyclic esters to a cellulose ester having hydroxy groups with a conductive pigment composed of a mixture consisting of a conductive carbon black and a scaly graphite.

Also, No. VIII of the present invention relates a moisture-curable graft copolymer which is useful as a coating for car parts, construction, and repairing, and relates to a coating composition containing thereof.

And also, No. IX the present invention relates a lactide/lactone copolymer and a method for the preparation thereof and, in more detail, it relates a lactide/lactone copolymer in which an average continuous chain length is controlled in respective units of the copolymer, and relates to a method for the preparation in which an average continuous chain length can be freely controlled in respective units of the copolymer.

TECHNICAL BACKGROUND (The No. I of the Present Invention)

In recent years, treatment of waste plastics is becoming a social problem, and recycling of plastics material and biodegradable plastics are paid attention. An aliphatic polyester resin is one of materials which are largely desired owing to biodegradability.

As one of the aliphatic polyester resins which are industrially produced, a polycaprolactone is known. A polycaprolactone having a low molecular weight is an important material as a raw material for a polyurethane, a paint, and a coating agent. A polycaprolactone having a high molecular weight is employed as a molded article such as a compost bag, fishing lines, tees for golf, and a hot-melt adhesive, etc. owing to biodegradability.

Further, the aliphatic polyester has been widely employed as a preferred material also in uses such as a use for molding various portions of human body and a use by fitting to human body. For example, a gyps for medical care (JP-A-58081042 Official Gazette) and a face mask for irradiating radiation rays (JP-A-60215018 Official Gazette) have been known.

It is known that although such the aliphatic polyester has a peculiar thermally-decomposing property, hydrolyzability, and biodegradability, etc., respectively, in the case of the uses, thermally-decomposing property, hydrolyzability, and biodegradability, decomposition or degradation rate become important depending upon the uses thereof, accordingly, their properties can be modified by various copolymerization.

For example, the thermally-decomposing property, hydrolyzability, and biodegradability of the aliphatic polyesters are controlled by a copolymerization of a lactone with a lactide, a copolymerization of a lactone with a glycolide, a copolymerization of a lactone with a carbonate, a copolymerization of a lactone with a cyclic ester, a copolymerization of a lactone with a lactam and, or modification of composition ratio, etc.

Still further, in a polycondensation type polyester, it is tried to highly-polymerize by an isocyanate compound (JP-A-04189823 and JP-A-05178955 Official Gazettes). However, since a polymer having a sufficiently high molecular weight can be obtained without a crosslinking reaction in the aliphatic polyester which is obtained by the ring-opening polymerization such as in the present invention, there was not investigated a reaction with an isocyanate compound, etc.

In the case of controlling the thermally-decomposing property, hydrolyzability, and biodegradability of the aliphatic polyesters, although there can be obtained a polymer having a desired thermally-decomposing property, hydrolyzability, and biodegradability by copolymerization, there is a problem that the copolymerization also affects to various other physical properties, resulting in that there cannot be obtained a target polymer.

(The No. II of the Present Invention)

Hitherto, for the purpose of manifestation of a fertilizing effect depending upon growth of farm products, there have been developed various fertilizing effect-controllable fertilizers.

Particularly, there have been disclosed and commercially-supplied a particle-state fertilizer in which a coating material is coated on the surface. As described in JP-B-95000505 Official Gazette, there have been proposed various fertilizing effect-controllable fertilizers in, for example, U.S. Pat. No. 3,295,950, JP-B-65028927, JP-B-69028457, GB Patent 815829, JP-B-62015832 and JP-B-67013681 Official Gazettes. However, it is taught that it is difficult to adjust an elution rate of fertilizing components in all the fertilizing effect-controllable fertilizers.

On the other hand, JP-B-85021952 and JP-B-85003040 Official Gazettes disclose a method for forming a thin layer in which there is employed a coating material primarily containing a polyolefin, and in the case of coating the surface of particle-state fertilizers, a hot air is blown to dry together with spraying a solution of the coating material over the particle-state fertilizers. It is taught that the method is characterized in that an elution rate of the fertilizers can be controlled, and the above-described method is widely put into practice, in which a thin layer is formed over the surface of the particle-state fertilizers.

Further, JP-B-85003040 and JP-A-55901672 Official Gazettes, etc. show that a function for controlling elution is maintained by dispersing inorganic powders such as talc and sulphur into a thin layer of the polyolefin-based resin and, at the same time, there is accelerated the degradation or decomposition of residual thin layer after elution.

In the particle-state fertilizers which have been conventionally proposed, the coating layers do not cause degradation or decomposition, and even though those caused the degradation, those remain in soil, resulting in that it is anxious that those produce pollution in the growth of farm products, soil circumstances, and water for irrigation and river around fields.

From that reason, there has been intensively desired a particle-state fertilizer in which a thin layer has degradability and a duration period of a fertilizing effect can be controlled.

In such the degradable thin layer, degradability means degradation by light, oxygen, and microorganisms, etc.

Particularly, in the conventional particle-state fertilizer coated, it is difficult to control the elution rate of fertilizing components, and there has been a drawback that the fertilizing period is apt to be readily affected by circumstances such as weather and soil. Further, it is pointed that the thin layer after elution of the fertilizing components remain in soil over a long time of period without degradation.

For that reason, utilization of biodegradable resins has been often tried and, for example, JP-A-07033576 Official Gazette states a combination of a polycaprolactone, a polylactic acid, or an aliphatic polyester compound with cellulose derivatives, low molecular weight polyethylenes, and paraffins, etc. However, since the polycaprolactone to be employed in the case has a melting point of 60° C., blocking is occasionally caused in transport or storage of products.

Further, the above-described JP-B-95000505 also likewise discloses particle-state fertilizers coated by a polycaprolactone.

However, in the coating material such as the polycaprolactone and polylactic acid, since degradation of the coating materials is too quick, those are not preferred in the case of employing as a gradually-dischargeable fertilizer.

(The No. III of the Present Invention)

In addition to the above-described problems relating to the coating materials, since the polylactic acid and the aliphatic polyester have a low solubility to solvents, it is difficult to put into practice, resulting in being not sufficiently satisfied.

Further, in JP-A-11116371 Official Gazette, there is proposed the use of a cellulose acetate having a low substitution degree which is poor in solubility and, in the case of employing coating for a particle-state fertilizer, trichloroethylene and tetrahydrofran are employed as solvents. Accordingly, handling and price of the solvents have been problematic.

(The IV of the Present Invention>

A marking film means a film which is stuck on wall surface of transport vehicles, buildings, and electric-light poles, etc. in which a printed and ink layer are formed on one surface of a base film for (wappen) to prepare various patterns, and a pressure sensitive adhesive layer is formed on other surface, which is employed by sticking it at surface of a large-size outdoor advertisements, road signs, signboards on streets, company trade names, etc., and clothes, daily necessaries, and toys, etc. It is pais attention owing to effectively setting by only sticking in place of a method for individually coating a paint. As a base film which has been conventionally employed for a marking film, although a polyester film and a polyurethane film are also known a little, a film made from a polyvinylchloride-based resin is typical in view of weatherability, total properties in use (that is, characteristics depending upon elasticity, a readily sticking property onto a curved surface, a readily sticking property of a curved film onto a plain surface, and bulkiness of a film), and costs.

The vinylchloride-based resin is excellent in various properties such as physical properties, weatherability, film formability and printing applicability, and which has been preferably employed as a base film material for the marking film.

In the vinylchloride-based resin which is a typical example as described above, polymerization degree is preferably 300–2000, and more preferably 600–1500, and a polyvinylchloride homopolymer resin or a copolymer resin of vinylchloride monomer with various monomers such as an olefin-based, diene-based, halogenated vinyl-based, (meth)acrylic ester-based, vinyl ester-based, vinyl ether-based, and styrene-based monomers.

Incidentally, as one example of the marking film and use modes thereof, there is exemplified a rolled marking film in which there is prepared a base film having 50 μm for the marking film of the vinylchloride resin cast by a plastisol method, and desired durable patterns, etc. are printed on one surface, and optionally, a clear ink is over-printed to give a high durability and, an acrylic-based pressure sensitive adhesive is coated in the thickness of approximately 30 μm on another surface, and optionally, a releasing film is laminated as a backing film. It is stuck on surface of the body of a car, etc., stripping off the releasing film at a sticking place after forming a cutting mark line in order to cut it into a desired shape by a hand-cut, computerized machine-cut, and punching cut.

In the meantime, it is reported that the above-described polyvinylchloride-based resin which has been preferably employed has a large possibility that it produces harmful substances such as dioxine during burning and dumping, and as a result, a research for substitute resin materials is in progress.

As one of the substitute resins, there are paid attention a cellulose ester, for example, a cellulose acetate, a cellulose acetate butylate, a cellulose acetate propionate which are all a cellulose derivative, and which satisfy a variety of properties to be required such as excellent toughness, glossiness, transparency, oil resistance, and weatherability as a resin for the marking film.

However, if those are thermally melted alone, discoloration and decomposition are simultaneously caused and, further, even though there is applied a so-called block method in which the above-described cellulose derivatives are dissolved, kneaded, compressed, and molded to prepare a sheet, there cannot be obtained a resin having an excellent fluidity in heating and a plasticizing property without the addition of a plasticizer. In the case, as a plasticizer, there are employed a phthalate (for example, dimethyl phthalate, diethyl phthalate, dibutyl phthalate, butylbenzyl phthalate, and ethylphthalyl phthalate ethyl glycolate, etc.), a trimeritate (for example, trimethyl trimeritate, triethyl trimeritate, and 2-ethylhexyl azelate, etc.), a normal phosphate (for example, tributyl phosphate, cresyl diphenyl phosphate, and 2-ethylhexyl diphenyl phosphate, etc.), and a licinolate (for example, methyl acetyl licinolate), etc.

However, the cellulose esters containing the plasticizers have a problem that a softening point becomes too low.

Further, since the cellulose derivatives such as the cellulose esters are usually strong in polarity, there must be selected a plasticizer having a strong polarity. However, as a plasticizer which satisfies wide range properties, compatibility, a plasticizing effect, a high transparency, non-volatility, and a non-migrating property, a conventionally known plasticizer having a low molecular weight is known alone, and the plasticizer is apt to readily volatile during molding or after molding. Accordingly, it has a problem that a working circumstance during molding becomes worse and dimensional stability lowers in a molded article.

Further, the plasticizer migrates toward a pressure sensitive adhesive layer or a printing surface in the marking film, resulting in that an adhesive power lowers in the former and a stain by dust sticking is caused in the latter.

As a result, there is limited the use of a low molecular weight plasticizer for the cellulose derivatives such as the cellulose esters, etc., and it is an existing circumstance that it obstructs an enlargement of uses for a film or a sheet made by the materials, particularly, the use for the marking film, etc.

In order to overcome the limitation in use of the low molecular weight plasticizer, for example, JP-B-68016305 Official Gazette discloses a technology in which there is added a high molecular weight plasticizer which is a polyester having an average molecular weight of 700–4000 obtained from a cellulose acetate which is a fatty acid cellulose ester, a glycol, and an aliphatic dibasic acid. The plasticizer is excellent in compatibility with a cellulose acetate having an acetylated degree of not less than 52% (substitution degree of not more than 2.2).

Further, U.S. Pat. No. 3,813,81 Specification discloses a technology in which a polymer from a cyclic monomer such as e-caprolactone is added to a cellulose acetate (substitution degree of 2.5) which is a cellulose ester.

Still further, U.S. Pat. No. 4,731,122 Specification discloses a thermoplastic resin composition in which a cellulose acetate butylate and a cellulose acetate contain tributyl citrate, triethyl citrate, and a polyethylene glycol.

However, the above-described high molecular weight plasticizer is still insufficient in compatibility with the cellulose ester and, particularly, in the case that it is applied to a cellulose ester having a low substitution degree, it is difficult to prevent that it bleeds out of a molded article, and it volatilizes from a molded article, resulting in that it adversely affects to physical properties such as an outer appearance of a molded article which includes a decrease of transparency by phase separation, and a decrease of a plasticizing effect.

(The No. V of the Present Invention)

As a heat-transfer method for a picture image, various methods have been conventionally known and, for example, there is proposed a method in which a variety of full-color picture images are thermally formed on a picture image recording sheet by bringing into contact a heat-transferable sheet in which a recording agent such as a sublimatable dye is carried on a base material sheet (for example, a polyester film, etc.) with a picture image recording sheet having a dye receiving layer on a material (for example, paper and plastic film, etc.) to be transferred which is capable of dying by using a sublimatable dye.

In the method, a thermal head of a printer is employed as a heating means, and a great many of color dots including 3 or 4 colors are transferred to a picture image recording sheet by heating for an exceedingly short time of period, resulting in that a variety of full-color picture images are thermally reappeared on a recording sheet. Thus-formed picture image is very distinct because a dye is employed as a coloring material, and it is excellent in transparency. Accordingly, a picture image obtained is excellent in repeatability of a medium color and a contrast, and there can be formed a high-quality picture image which is much for a full-color photograph.

In the heat transfer method, there is important not only a construction of a heat-transferable sheet but also a construction of a picture image recording sheet. As the picture image recording sheet by a heat-sensitive transfer, there has been known a sheet in which there is formed a picture image recording layer using, for example, a polyester-based resin, a vinyl resin containing halogens such as a polyvinyl chloride-based resin, a polycarbonate-based resin, a polyvinyl butylal-based resin, an acrylic-based resin, a cellulose-based resin, an olefin-based resin, and a styrene-based resin, etc.

In such the picture image recording sheet by a heat-sensitive transfer, as a means by which a dyeing property becomes excellent in the sublimatable dye to be transferred, there is a method for forming a dye receiving layer using a resin having an excellent dyeing property.

For example, JP-A-62211195 Official Gazette proposes a picture image recording sheet by a heat-sensitive transfer in which a picture image recording layer having a high surface smoothness is formed by a mixture containing a pigment and a resin which can be readily dyed such as a polyester, an epoxy resin, and a polystyrene. In the JP, it is described that the resin which can be readily dyed may be a water soluble-type and an emulsion type one.

However, the resin which can be readily dyed by a dye has a low softening point and, in the case that a dye-receiving layer is formed in the heat transferable picture image recording sheet using such the resins, the dye-receiving layer and the heat-transfer sheet are adhered to each other by heat of a thermal head during forming a picture image and, when those are stripped from each other, there is caused a problem (a so-called abnormal transfer) that a dye layer in the heat-transfer sheet is entirely transferred onto the picture image recording sheet by fusing each other. Also, as a method for improving a dye-affinity in a dye, there are a method in which a plasticizer is contained in the dye-receiving layer and a method for improving a diffusible property in the dye of heat-transfer. However, a picture image formed blots and storage property is low.

JP-A-62222895 Official Gazette discloses a picture image recording medium in which a dyeing layer in the picture image recording medium which is a sublimatable heat-sensitive type one contains an acrylic-based polymer and a surface improver having a fluorine-based or silicone-based graft or block structure.

JP-A-06024152 Official Gazette proposes that a dye receiving layer in a picture image recording medium which is a sublimatable heat-sensitive type one is formed by a composite polymeric water-based based dispersion in which a core-shell structure is formed by a polymer of a copolyester resin having at least one polar group with a copolymerizable unsaturated compound. However, in the picture image recording medium, it is difficult to improve a coloring concentration and clearness of a picture image while elevating a strippability from a heat-transfer sheet. As described above, when improving a dye-affinity of a dye receiving layer, a strippability lowers and, when intending to improve the strippability and storage stability by forming a picture image recording layer using a resin in which a dye absorbed is not apt to migrate through the dye absorbing layer, dye-affinity of the dye becomes lower, resulting in that there cannot be formed a picture image having a high concentration and high clearness.

(The Sixth Aspect of the Present Invention)

In a heat-transfer recording method, a printing is recorded on a paper to be transferred as follows. First of all, the paper to be transferred is brought into contact with a heat-transferable ink layer in a heat-transfer recording medium composed of a substrate and the heat-transferable ink layer which is arranged on the surface of the substrate under pressure, and then, a thermal head is brought into contact with an opposite surface (back surface) of the heat-transferable ink layer in the substrate. Subsequently, the thermal head is heated by supplying a pulse-state signal current into the thermal head and, the heat-transferable ink layer is melted or sublimated by heating.

In a thermally melt type transfer recording method, a picture image is recorded as follows. In the case of black painting, there is employed a heat-transfer recording medium in which carbon black is added to an ink layer and, in the case of color printing, a heat-transfer recording medium composed of three primary colors such as yellow, magenta, and cyan are separately prepared and, the three primary colors are transferred in order onto the same paper to be transferred, respectively.

On the other hand, in a sublimation type heat-transfer method, a contrast-controlled printing can be readily conducted while controlling the amount of an ink which sublimates by a heat amount from a thermal head. In order to print a picture image with a high concentration, input voltage is elevated or input time of period of an electric current pulse is lengthened and, in order to print a picture image with a low concentration, input voltage is lowered or input time of period of an electric current pulse is shortened. A color printing can be conducted by the same method as in the thermally-melting type method, and a color printing having a high contrast can be conducted by changing quantity of heat on the thermal head.

In the mean time, as a substrate for a thermal melting or a sublimation type heat-transferable recording medium, there has been conventionally employed a plastic film such as a polyethylene terephthalate (PET). Herein, the plastic film such as the PET occasionally fusedly-adheres to a thermal head by melting in a contact portion to the thermal head because of heat of the thermal head during transferring, resulting in that the recording medium cannot become transferred with a stable speed.

The phenomenon (a sticking phenomenon) not only remarkably lowers a printing quality but also causes a significant noise when the fusedly-adhered film is stripped off from the thermal head, and allows to stop transferring of the recording medium, or occasionally causes a fracture of the substrate. In order to prevent the sticking phenomenon, there are proposed a variety of methods for forming a thermally resistible protecting layer at one surface (a surface bringing into contact with the thermal head which is an opposite side of a heat-transferable ink layer) in the substrate.

For example, JP-A-55007467 and JP-A-63172688 Official Gazettes propose that there is set up a heat-resistible protecting layer composed of a silicone resin, an epoxy resin, a melamine resin, a phenol resin, fluorine resin, a polyimide resin, a polyamide resin or a cellulose resin at one surface of a substrate.

Further, JP-A-60201989 Official Gazette proposes that there is set up a heat-resistible protecting layer composed of an aromatic polyamide, and JP-A-60201989 Official Gazette proposes a heat-resistible protecting layer composed of an aromatic polysulphone-based resin, respectively. However, the heat-resistible protecting layer is insufficient for protecting the sticking phenomenon and, in the case that the heat-transferable recording medium is stored in a rolled state, there is caused a so-called blocking phenomenon that the heat-resistible protecting layer adheres to a heat-transferable ink layer. By occurrence of the blocking phenomenon, the heat-transferable recording medium in a rolled state becomes not occasionally smoothly transferred, components in the ink layer which migrate and adhere to the heat-resistible protecting layer adhere to a heating body in the thermal head and surroundings thereof, resulting in that printing quality is remarkably lowered.

Still further, JP-A-61143195 Official Gazette proposes that there is set up a back surface layer (a heat-resistible protecting layer) composed of a silicone-graft or block acrylic-based copolymer. The back surface layer composed of the silicone-graft or block acrylic-based copolymer is excellent in a slipping property and prevents a sticking phenomenon, and it is excellent in heat resistance and a blocking resistance. However, since the silicone-graft or block acrylic-based copolymer is poor in a film formability, the back surface layer composed of the copolymer is shaved by the thermal head when continuously printing and, components of the back surface layer adhere to the heating body of the thermal head and circumstances thereof, printing quality lowers as well as in the case of the occurrence of the blocking phenomenon.

For that reason, there is a drawback that the thermal head must be often cleared in order to obtain an excellent printing quality.

JP-A-01221281 Official Gazette proposes that there is set up a heat-resistible protecting layer in which a silicone oil added to an ethyl cellulose resin. However, as well as a method (JP-A-57129789 Official Gazette) in which there is set up a resin layer in which there is added a surface active agent which is solid or semi-solid at ordinary temperatures, there is a drawback that additives such as the silicone oil or the surface active agent migrate toward an ink layer, and there are caused unevenness of transferring and lack of a picture image, resulting in that printing quality is remarkably lowered.

JP-A-01234292 Official Gazette describes that there is set up a heat-resistible protecting layer in which a silicone oil is added to a cellulose ester resin containing acetate group or the ester resin containing a silicone oil, and JP-A-07172076 Official Gazette describes that there is set up a protecting layer in which waxes, higher fatty acid amides, or an ester are added to an acrylic resin, a polyester resin, and a cellulose derivative, etc. However, there are still remained an inconvenience such as the above-described sticking phenomenon and blocking phenomenon, and an inconvenience such as the unevenness of transferring and a lack of a picture image by migration of the additives toward the ink layer.

JP-A-06270561 Official Gazette proposes that there is employed a cellulose modified polymer in which a cellulose and/or a cellulose derivative are a main polymer and a copolymer of a reactive silicone oil with a vinyl monomer is a branch polymer as a protecting layer. As a method for introducing the vinyl monomer into the cellulose derivative, two methods are proposed. One is a method in which a polymerization of the vinyl monomer is initiated by pulling out an active hydrogen of the cellulose, and another is a method in which vinyl groups are introduced into the cellulose derivative, followed by allowing to polymerize with other vinyl monomers. Further, there are proposed two methods for introducing a reactive silicone oil, and one is a method in which a reactive silicone oil having vinyl group is allowed to react with other vinyl monomers and the above-described cellulose derivative.

Another is a method in which a reactive silicone oil having a hydroxyl group or an epoxy group at a terminal is combined with an isocyanate compound having vinyl group to introduce a double bond, followed by allowing to react with other vinyl monomers and the above-described cellulose derivative. As described above, the method for the preparation of the cellulose-modified derivative is complicated in the JP-A-06270561 Official Gazette and, productivity is poor, and the monomers to be employed are expensive. Accordingly, the methods are not preferred because of a viewpoint of costs.

As described hereinabove, it is an existing circumstance that as the heat-resistible protecting layer for the heat-transferable recording medium, although there have been proposed various materials until now, there is occasionally caused a decline of a printing quality by occurrence of a worse transferring and an abrasion of a thermal head, or occurrence of a fracture, etc. in a substrate and, moreover, a blocking resistance and thermal head stain resistance, etc. are insufficient, and satisfied protecting layers are not found out.

(The No. VII of the Present Invention)

Heretofore, as a method for coating a conductive coating, there has been usually carried out a method in which a conductive coating composition is coated on a nonconductive material to be coated such as inorganic materials and plastics, and after giving conductivity to the surface of the nonconductive material to be coated, and then, a finishing-coating composition is coated by static coating.

As the conductive coating composition, there has been known, for example, a mixture in which an amino alkyd-based resin and an amino acrylic-based resin, etc. are mixed and dispersed with, for example, powdered metals such as a stainless steel, tin, copper, ad aluminum; a metal oxide such as zinc oxide, conductive fillers such as a titanium dioxide-coated mica, a silicone, and cobalt sulphide, which are a conductive pigment.

However, since the powdered metals themselves have small electric resistance, although the use amount is small, those are not practical because of a high price. Further, there is a drawback that since those have large specific gravity, those are separated from resin components and sink in a bottom of a vessel, and those aggregate, and those cause hard-caking during a long term storage, it becomes difficult to disperse again in an original state in spite of agitating, resulting in that there is formed a coating layer containing a small amount of powdered metals, and conductivity becomes worse in a coating layer.

On the other hand, the metal oxides have a drawback that since the metal oxides themselves have a larger electric resistance compared to powdered metals, in the case of intending to obtain a coating layer having equal conductivity to the powdered metals, use amount becomes large, resulting in that there become worse storage stability and physical properties in a coating composition.

Further, it is difficult to obtain a coating layer having an excellent conductivity by a small amount even in the conductive fillers.

Still further, it has been known that conductivity can be elevated by conductive pigments such as a conductive carbon and a scaly graphite which are a carbon-based pigment.

Although the conductive carbon is usually mixed and dispersed into a coating using a dispersing machine such as a ball mill or a sand mill, it has a drawback that when the conductive carbon is dispersed until becoming a state of primary particles in the case of dispersing, conductivity of the coating layer becomes poor by formation of a coating layer in which conductive carbon particles do not sufficiently bring into contact each other, and in the case of increasing the mixing amount of the conductive carbon in order to elevate the conductivity, physical properties become poor in the coating layer. On the other hand, in the case that aggregated particles of the conductive carbon are placed in a large amount without sufficiently dispersing the particles of the conductive carbon, it has a drawback that a storage stability becomes worse in the coating composition, and an outer appearance of the coating layer also becomes poor after finishing.

Also, although the scaly graphite can form a coating layer having an excellent conductivity even in the case of the smaller use amount compared to the conductive carbon, it has a drawback that it is poor in, particularly, an adhering property to a plastic material to be coated and adhesion to an over coating layer.

(The No. VIII of the Present Invention)

Heretofore, in the case of coating or repairing industrial machines, buildings, structures, furniture, and cars, etc., an acrylic urethane coating has been mainly employed in view of durability, a finishing property, and weatherability.

The coating can form a coating layer having excellent properties as an ordinary temperature-curable type one.

However, since the acrylic urethane coating is usually a two-liquid type, it must be employed within a fixed time of period, resulting in that it has a problem in coating workability. Further, in the coating, since a polyisocyanate compound having a relatively low molecular weight is employed as a curing agent, it includes a problem of toxicity and an irritating property by vapor thereof when coating it at a coating site.

On the other hand, there have been conventionally proposed a variety of moisture-curable type coatings using isocyanate group which is a single liquid type. For example, JP-A-56118409 and JP-A-64075578 Official Gazettes disclose coatings using a copolymer containing isocyanate group, whereby, an improvement is attained in view of coating workability and, safeness and public health.

However, the coatings do not attain to properties of the two liquid type acrylic urethane coatings in view of dryability and physical properties which are particularly desired as the ordinary temperature-curable type coatings.
(The No. IX of the Present Invention)

In recent years, treatments of waste plastics are becoming a large social problem, and a biodegradable plastics has been largely paid attention. An aliphatic polyester is one of materials which are largely expected owing to a high biodegradability compared to other synthetic resin.

As the aliphatic polyesters which are industrially manufactured, there can be enumerated, for example, a polylactic acid which is an aliphatic polyester having a high melting point, a polyhydroxy butyrate, a polyglycol acid, and a polycaprolactone which is an aliphatic polyester having a low melting point, etc.

The polylactic acid having a high molecular weight and the polycaprolactone have been employed as medical uses such as surgical strings, medical gyps (JP-A-58081042 Official Gazette), and a face mask for irradiating radiation rays (JP-A-60215018 Official Gazette), and compost bags, fishing lines, tees for golfing and a variety of molded articles, and a hot-melt adhesive, etc., which are usual applications.

However, the aliphatic polyester having a high melting point, which is typified by by the polylactic acid (a melting point of approximately 175° C.), the polyhydroxy butylate, and the polyglycol acid, etc., has a drawback of being hard and brittle because of high crystallinity and rigid molecular structure, and the polyester typified by the polycaprolactone includes a practical problem because of a low melting point.

Therefore, there have been conventionally investigated a method in which a plasticizer is added to a polyester having a high melting point (JP-A-04335060 Official Gazette) and a mere copolymer of a polyester having a high melting point with a polyester having a low melting point (JP-A-07053685 and JP-A-07316271 Official Gazettes), those are not still sufficient from a viewpoint of practical uses.

That is, in the method in which the plasticizer is employed, there become largely problematic a toxicity and low biodegradability of the plasticizer itself, bleed out during molding, and staining of a mold, etc. In a lactide/ε-caprolactone copolymer having a very long chain which is a completely block type as described in the JP-A-07316271 Official Gazette, there is not almost improved a drawback of being hard and brittle, it is exceedingly limited in practical uses. Likewise, as described in the JP-A-07053685 Official Gazette, in the case that the monomer formulation of the lactide/ε-caprolactone is merely only regulated without any consideration of an average continuous chain length of constructing monomer units, it is clear that there cannot be always prepared a copolymer having a desired physical properties.

On the other hand, as a method for the preparation of a lactide/ε-caprolactone copolymer having a controlled average continuous chain, there is reported a method (Polymer Bulletin 25, 335–341 (1991), Macromol. Chem. 194, 907–912 (1993)) in which an average continuous chain length of respective units is controlled by changing reaction temperature and catalysts. However, in the case of changing the reaction temperature and catalysts, there are not avoidable fluctuations of preparation conditions and, in the case of consideration of a production change among several grades using an identical production apparatus, it is clear that it becomes a factor of a remarkable decline in productivity.

Accordingly, it is virtually difficult that conventionally known methods are applied to an actual production in an industrial fashion.

PROBLEM TO BE SOLVED BY THE INVENTION

A purpose of the No. I of the present invention is to obtain an aliphatic polyester having a controlled thermal decomposition, hydrolizability, and biodegradability. Further, it is to modify a terminal of the aliphatic polyester without adversely affecting to other physical properties.

A purpose of the No. II of the present invention is to obtain a particle-state composition for agriculture and gardening in which in the case of coating it on a fertilizer, etc., biodegradability rate in a thin layer can be appropriately controlled depending upon purposes thereof, a fertilizing duration period can be controlled and, after elution of fertilizing components, the thin layer is disintegrated and decomposed by microorganisms in soil without remaining in the soil, and, after a lapse of a cultivating period of farm products, the thin layer disappears.

A purpose of the No. III of the present invention is to provide a particle-state composition for agriculture and gardening in which in the case of coating it on particle-state fertilizers, there can be employed a solvent which can be readily handled and is low in costs and, in the case of coating it on fertilizers, etc., a fertilizing duration period can be controlled and, after elution of fertilizing components, a thin layer is disintegrated and decomposed by microorganisms in soil without remaining in the soil, and, after a lapse of a cultivating period of farm products, residual components disappear by disintegration and decomposition of the thin layer.

A purpose of the IV of the present invention is to provide an excellent marking film in which there is solved a problem in relation to a volatilizing and migrating property of a plasticizer contained in a cellulose ester.

A purpose of the No. V of the present invention is to provide a heat-sensitive transferable recording material having an excellent strippability (a releasing property) in a formulation process of a picture image or thermally transferring in a thermally transferring method using a sublimatable dye, and the material can form a recording picture image having a high coloring concentration and an excellent clearness, and to provide a method for the preparation thereof.

A purpose of the No. VI of the present invention is to provide a heat-transferable recording material in which occurrence of a sticking phenomenon can be prevented and, even in the case that the heat-transferable recording material is stored in a rolled state at a high temperature for a long time of period, constructing components in a heat-resistible protecting layer do not migrate toward the surface of an ink layer, and a blocking phenomenon does not occur and, the heat-resistible protecting layer is not shaved by an abrasion power of a thermal head, whereby, an excellent printing quality can be obtained, and further, such the properties can be maintained even in the case of applying to a high speed printer.

A purpose of the No. VII of the present invention is to solve problems in the above-described conventional conductive coating and, to provide a conductive coating composition having an excellent storage stability which can form a coating layer having an excellent adhesion to a material to be coated and a finishing coating layer, and an excellent conductivity.

A purpose of the No. VIII of the present invention is to provide a moisture-curable type graft copolymer which is useful for a single-liquid type coating and a sealing agent which do not include toxicity and an irritating problem, and which is excellent in dryability and does not deteriorate a variety of physical properties in a coating layer, and to provide a coating composition containing thereof.

A purpose of the No. IX of the present invention is to establish and provide a lactide/ε-caprolactone copolymer having more excellent physical properties such as heat resistance and impact resistance, and a novel highly-effective method for the preparation in order to commercially supply stably the copolymer by a low cost.

DISCLOSURE OF THE INVENTION

As a result of an investigation in relation to a structure of terminal groups which is the purpose of the No. I in the present invention, the present inventors found out that an alcohol terminal (it means the presence of a hydroxyl group at terminal) or a carboxylic acid terminal (it means the presence of a carboxylic group at terminal) affects to a thermal decomposition property, hydrolizability, and biodegradability in a polymer chain obtained by a ring-opening polymerization of a cyclic ester monomer, that the above-described various properties can be controlled by decreasing the terminals, and that there can be obtained a preferred aliphatic polyester by modifying the terminals, particularly, by changing the polymer terminals to an alkyl group using an isocyanate, etc. after a ring-opening polymerization, and the present invention has been completed.

That is, No. 1 of the present invention provides an aliphatic polyester, which is an aliphatic polyester composed of at least one kind of a monomer unit of any one of a lactone or a lactide, in which a proportion of the number of the alcohol terminals is not more than 50% based on the number of total terminals in the aliphatic polyester and/or a proportion of the number of the carboxylic acid terminals is not more than 30% based on the number of total terminals in the aliphatic polyester.

No. 2 of the present invention provides an aliphatic polyester described in the No. 1 of the present invention in which a proportion of the number of the alkyl group terminals and/or alkenyl group terminals (herein, the alkyl group and/or alkenyl group are a group having a straight chain and cyclic or branched chain which contain a carbon number of 1–24 pieces) is not less than 30% based on the total terminals in the aliphatic polyester.

No. 3 of the present invention provides an aliphatic polyester described in any one of the No. 1 or 2 of the present invention in which there is contained a bond produced by allowing to react a modifying agent with the alcohol terminals and/or carboxylic acid terminals in 0.2–40 pieces on average based on one molecule of a polymer after modifying.

No. 4 of the present invention provides an aliphatic polyester described in No. 4 of the present invention in which the bond produced by allowing to react the modifying agent is at least one selected from the group consisting of urethane bond, ether bond, ester bond, and amide bond.

No. 5 of the present invention provides a method for the preparation of an aliphatic polyester by adjusting a proportion of the number of the alcohol terminals to not more than 50% and/or a proportion of the number of the carboxylic acid terminals to not more than 30% based on the number of total terminals, in which at least one kind of a lacton or lactide is polymerized by ring-opening using at least one kind of a monoalcohol having a high boiling point or a metal alkoxide as an initiator.

No. 6 of the present invention provides a method for the preparation of an aliphatic polyester described in the No. 5 of the present invention in which a bond produced by allowing to react a modifier to terminals in the aliphatic polyester having the alcohol terminals and/or the carboxylic acid terminals is contained in 0.2–40 pieces on average.

In relation to the purpose of the No. II of the present invention, as a result of an intensive investigation concerning a selection of a material for a thin layer in order to prepare a particle-state fertilizer coated by a degradable thin layer having degradability in which duration period of a fertilizing effect can be widely controlled, the present inventors found out that a terminal-controlled aliphatic polyester is appropriate as a coating layer for a gradually-dischargeable fertilizer, and the present invention has been completed.

That is, No. 7 of the present invention provides a particle-state composition for agriculture and gardening characterized in that surface of a particle-state fertilizer is coated by a coating material II-A alone or a mixture of the coating material II-A with a coating material II-B, the coating material II-A is composed of a terminal-controlled aliphatic polyester, the terminal-controlled aliphatic polyester is an aliphatic polyester composed of at least one kind of monomer units of any one of a lactone or a lactide, and in which a proportion of the number of the alcohol terminals is not more than 50% based on the number of total terminals in the aliphatic polyester and/or a proportion of the number of the carboxylic acid terminals is not more than 30% based on the number of total terminals in the aliphatic polyester, the coating material II-B is composed of at least one kind of selected from the group consisting of an olefine polymer, a copolymer containing an olefine, a vinylidene chloride polymer, a copolymer containing vinylidene chloride, a diene-based polymer, waxes, a petroleum resin, a natural resin, a cellulose acetate resin, a polycaprolactone, oils & fats and a modified product therefrom.

No. 8 of the present invention provides a particle-state composition for agriculture and gardening described in the No. 7 of the present invention, in which a proportion of the number of the alkyl group terminals and/or alkenyl group terminals (herein, the alkyl group and/or alkenyl group is a group having a straight chain and cyclic or branched chain which contain a carbon number of 1–24 pieces) is not less than 30% based on the total terminals in the aliphatic polyester.

No. 9 of the present invention provides a particle-state composition for agriculture and gardening described in any one of the No. 7 or 8 of the present invention, in which the terminal-controlled aliphatic polyester is an aliphatic polyester obtained by allowing to react a modifier with the alcohol terminals and/or the carboxylic acid terminals in an aliphatic polyester composed of at least one kind of monomer units of a lactone or a lactide, and bonds produced by allowing to react the modifier are contained in 0.2–40 pieces on average based on one molecule of a polymer after modifying.

No. 10 of the present invention provides a particle-state composition for agriculture and gardening described in the No. 9 of the present invention, in which the bonds produced by allowing to react the modifier is at least one kind selected from the group consisting of a urethane bond, an ether bond, an ester bond, and an amide bond.

No. 11 of the present invention provides a particle-state composition for agriculture and gardening described in the No. 7 of the present invention, in which the coating material II-B is a polycaprolactone, a cellulose acetate, or a mixture thereof.

No. 12 of the present invention provides a particle-state composition for agriculture and gardening described in the No. 7 or 11 of the present invention, in which there are further added inorganic fillers and/or additives for resins.

No. 13 of the present invention provides a particle-state composition for agriculture and gardening described in the No. 12 of the present invention, in which the inorganic fillers are talc, calcium carbonate, or a mixture thereof.

In relation to the purpose of the No. III of the present invention, as a result of an intensive investigation concerning a selection of a coating material having degradability in order to prepare a particle-state fertilizer coated by a degradable thin layer in which a duration period of a fertilizing effect can be controlled, and, in consideration of solubility into a solvent in coating and price of the solvent, the present inventors have completed the present invention.

That is, No. 14 of the present invention provides a particle-state composition for agriculture and gardening characterized in that the surface of a particle-state fertilizer is coated by a coating material II-A alone or a mixture of the coating material II-A with a coating material II-B, the coating material II-A is composed of a cyclic ester-modified cellulose ester, the coating material II-B is composed of of at least one kind of selected from the group consisting of an olefine polymer, a copolymer containing an olefine, a vinylidene chloride polymer, a copolymer containing vinylidene chloride, a diene-based polymer, waxes, a petroleum resin, a natural resin, a cellulose acetate resin, a polycaprolactone, oils & fats and a modified product therefrom.

No. 15 of the present invention provides a particle-state composition for agriculture and gardening described in the No. 14 of the present invention, in which the cyclic ester-modified cellulose ester is a cellulose ester derivative obtained by a ring opening graft polymerization of a cyclic ester with a cellulose ester having hydroxyl groups.

No. 16 of the present invention provides a particle-state composition for agriculture and gardening described in the No. 15 of the present invention, in which the cellulose ester having hydroxyl groups is a cellulose acetate, a cellulose acetate-butylate, a cellulose acetate-propionate, or a mixture thereof.

No. 17 of the present invention provides a particle-state composition for agriculture and gardening described in the No. 15 of the present invention, in which the cyclic ester is ε-caprolactone.

No. 18 of the present invention provides a particle-state composition for agriculture and gardening described in the No. 14 of the present invention, in which the coating material II-B is a polycaprolactone, a cellulose acetate, or a mixture thereof.

No. 19 of the present invention provides a particle-state composition for agriculture and gardening described in the No. 14 the present invention, in which inorganic fillers and/or additives for resins are further added.

No. 20 of the present invention provides a particle-state composition for agriculture and gardening described in the No. 19 of the present invention, in which the inorganic fillers are talc, calcium carbonate, or a mixture thereof.

In relation to the purpose of the No. IV of the present invention, as a result of an intensive investigation in view of the above-described circumstances, the present inventors found out that a cellulose ester derivative of a fatty acid is excellent in a nonvolatility and nonmigrating property, and it is appropriate for a marking film, and which is obtained by a ring-opening graft polymerization of cyclic esters to a fatty acid cellulose ester having hydroxyl groups, and the present invention has been completed.

That is, No. 21 of the present invention provides a base film for a marking film characterized by comprising a resin primarily containing a cellulose ester derivative of a fatty acid obtained by a ring-opening graft polymerization of cyclic esters to a fatty acid cellulose ester having hydroxyl groups.

No. 22 of the present invention provides a base film for a marking film described in the No. 21 of the present invention, in which the fatty acid cellulose ester having hydroxyl groups is at least one kind selected from the group consisting of a cellulose acetate, a cellulose acetate-butylate, and a cellulose acetate-propionate.

No. 23 of the present invention provides a base film for a marking film described in the No. 21 or 22 of the present invention, in which the fatty acid cellulose ester having hydroxyl groups is a cellulose acetate having a substitution degree of acetyl groups of 1–3.

No. 24 of the present invention provides a base film for a marking film described in any one of the Nos. 21–23 of the present invention, in which the cyclic ester are ε-caprolactone.

No. 25 of the present invention provides a base film for a marking film described in any one of the Nos. 21–24 of the present invention, in which ε-caprolactone is graft-polymerized in 2–50 mol based on glucose unit in the fatty acid cellulose ester having hydroxyl groups.

No. 26 of the present invention provides a base film for a marking film described in any one of the Nos. 21–25 of the present invention, in which a mass average molecular weight (heretofore, it has been referred to as a weight average molecular weight, hereinafter the same) is 200,000–2,000,000 in the fatty acid cellulose ester derivative.

As a result of an intensive investigation in order to attain the purpose of the No. V in the present invention, the present inventors found out that there can be obtained a picture image recording material having an excellent strippability from a heat transfer sheet and a high concentration of color generation, and a recording picture image having an excellent clearness can be formed on the picture image recording material by forming a dye receiving layer in a picture image recording material for a heat-sensitive transfer using a cyclic ester-modified cellulose derivative.

That is, No. 27 of the present invention provides a picture image recording material for a heat-sensitive transfer recording is composed of a cyclic ester-modified cellulose derivative obtained by a ring-opening polymerization of a cyclic ester to a cellulose ester derivative having hydroxyl groups.

No. 28 of the present invention provides a picture image recording material for a heat-sensitive transfer recording described in any one of the No. 27 of the present invention, in which a dye receiving layer is coated on at least one surface of a base material.

Further, Nos. 29 and 30 of the present invention provide a picture image recording material for a heat-sensitive transfer recording described in any one of the No. 27 of the present invention, in which the cellulose derivative having hydroxyl groups is a cellulose acetate, and the cyclic ester is ε-caprolactone.

No. 31 of the present invention provides a method for the preparation of a picture image recording material for a heat-sensitive transfer recording by coating a solution of a cyclic ester-modified cellulose derivative obtained by a ring-opening polymerization of a cyclic ester with a cellulose derivative having hydroxyl groups.

As a result of a variety of investigations in order to attain a purpose of the No. VI in the present invention, the present inventors found out that a specified cellulose derivative is desirable as a heat-resistible recording layer for a heat transfer recording material, and the present invention has been completed.

That is, No. 32 of the present invention provides a heat-transfer recording medium which comprises setting up a heat-transfer ink layer on the surface of a supporting material, and setting up a heat-resistible protecting layer on other surface of the supporting material, and in which the heat-resistible protecting layer is composed of a cyclic ester-modified cellulose derivative obtained by a ring-opening graft-polymerization of a cyclic ester to a cellulose derivative having hydroxyl groups.

Further, No. 33 of the present invention provide a heat-transfer recording medium described in the No. 32 of the present invention, in which the cellulose derivative having hydroxyl groups is a cellulose acetate, and No. 34 of the present invention provide a heat-transfer recording medium described in the No. 32 of the present invention, in which the cyclic ester is ε-caprolactone.

As a result of an intensive investigation in order to attain a purpose of No. VII the present invention and to solve the above-described problems, the present inventors found out that a coating composition is excellent in storage stability and, further can form a coating layer which is excellent in adhesion to an article to be coated and a coating layer of a finishing coating and conductivity, and the coating composition contains a resin primarily containing a cellulose ester derivative obtained by a ring-opening graft-polymerization of a cyclic ester to a cellulose derivative having hydroxyl groups and a conductive pigment in which a specified proportion of a conductive carbon black is employed together a scaly graphite, and the present invention has been completed.

No. 35 of the present invention provide a conductive coating composition which comprises formulating 75–85% by mass of a conductive coating resin (A) composed of 2–20% by mass of a cellulose ester derivative (a) obtained by a ring-opening graft-polymerization of a cyclic ester to a cellulose derivative having hydroxyl groups and 98–80% by mass of a resin for coating (b) [total of (a) and (b) is 100% by mass] and 25–15% by mass of a conductive pigment (B) [total of (A) and (B) is 100% by mass] composed of 40–60% by mass of a conductive carbon black (c) and 60–40% by mass of a scaly graphite (d) [total of (c) and (d) is 100% by mass].

No. 36 of the present invention provide a conductive coating composition described in the No. 35 of the present invention, in which the cellulose ester having hydroxyl groups is at least one kind selected from the group consisting of a cellulose acetate, a cellulose acetate-butylate, a cellulose acetate-propionate, and a cellulose acetate-nitrate.

No. 37 of the present invention provide a conductive coating composition described in the No. 35 or 36 of the present invention, in which the cellulose ester having hydroxyl groups is a cellulose acetate having an acetyl group substitution degree of 1–2.9.

No. 38 of the present invention provide a conductive coating composition described in any one of the Nos. 35–37 of the present invention, in which the cyclic ester is ε-caprolactone.

No. 39 of the present invention provide a conductive coating composition described in any one of the Nos. 35–38 of the present invention, in which the cellulose ester (a) contains 1–50 mol of graft-polymerized ε-caprolactone based on a glucose unit in the cellulose ester having hydroxyl groups.

No. 40 of the present invention provide a conductive coating composition described in any one of the Nos. 35–39 of the present invention, in which a mass average molecular weight is 50,000–1,000,000 in the cellulose ester derivative (a).

As a result of an intensive investigation in order to attain a purpose of No. VIII in the present invention and to solve the above-described problems, the present inventors found out that the above-described problems can be solved by using a cellulose ester derivative obtained by a ring-opening graft-polymerization of a cyclic ester to a cellulose derivative having hydroxyl groups and a graft polymer in which an isocyanate group component is introduced into a main chain of a graft copolymer obtained by copolymerization of polymerizable unsaturated monomers as a compound of a coating thin layer, and optionally by formulating a curing agent and resin components, and the present invention has been completed.

That is, No. 41 of the present invention provides a graft copolymer (I) characterized in that the graft copolymer (I) is obtained by copolymerization of 1–30% by mass of a cellulose ester derivative (a) obtained by a ring-opening graft-polymerization of a cyclic ester to a cellulose derivative having hydroxyl groups with 70–99% by mass of a polymerizable unsaturated monomer (b) [total of (a) and (b) is 100% by mass], and introduction of an isocyanate group component into the graft copolymer is conducted by the use (i) of an isocyanate group-contained unsaturated monomer (f) as a portion of the polymerizable unsaturated monomer (b), or the reaction (ii) of the polyisocyanate compound (c) to an active hydrogen-contained polymerizable monomer (h) which is employed as a portion of the polymerizable unsaturated monomer (b) [in the case, total of (b) and (c) correspond to the above-described 70–99% by mass (b), and isocyanate group content is 0.5–28.5% by mass in the graft copolymer (I).].

No. 42 of the present invention provides a graft copolymer described in the No. 41 of the present invention characterized in that mass average molecular weight is 2,000–150,000.

No. 43 of the present invention provides a graft copolymer described in the No. 41 of the present invention characterized in that a glass transition temperature is 0–90° C.

No. 44 of the present invention provides a coating composition which contains a graft copolymer (I) described in the No. 41 or 42 of the present invention and, optionally, at least one kind of components described below;

a polyisocyanate compound (II), a cellulose ester derivative (III), a modified vinyl-based copolymer (III') not containing an isocyanate group component which comprises copolymerization of 5–75% by mass of the cellulose ester derivative (III) with 25–95% by mass of other polymerizable unsaturated monomer (g) (total of (III) and (g) is 100% by mass), a graft copolymer (IV) which comprises copolymerization of 3–30% by mass of a macromonomer (m) with 70–97% by mass of other polymerizable unsaturated monomer (J) (it is the component (b) except the component (h)) (total of (m) and (j) is 100% by mass), and, a nonaqueous dispersed resin (V), in which the graft copolymer (I) is contained in not less than 50% by mass in the total resin solid components which are composed of the (I), (II), (III), (III'), (IV), and (V) which are 100% by mass.

No. 45 of the present invention provides a coating composition described in the No. 44 of the present invention, in which the polyisocyanate compound (II) is contained in 0.5–40% by mass based on the total resin solid components.

No. 46 of the present invention provides a coating composition described in the No. 45 of the present invention, in which the polyisocyanate compound (II) is a polymer (e) containing a low molecular weight compound (d) having at least two isocyanate groups in the molecule or an unsaturated monomer (f) having an isocyanate group.

No. 47 of the present invention provides a coating composition described in any one of the Nos. 44–46 of the present invention, in which the cellulose ester derivative (III) is contained in 0.5–20% by mass based on total resin solid components.

No. 48 of the present invention provides a coating composition described in any one of the Nos. 44–47 of the present invention, in which the modified vinyl-based copolymer (III') is contained in 1–30% by mass based on total resin solid components.

No. 49 of the present invention provides a coating composition described in any one of the Nos. 44–48 of the present invention, in which the graft copolymer (IV) is contained in 1–20% by mass based on total resin solid components.

No. 50 of the present invention provides a coating composition described in any one of the Nos. 44–49 of the present invention, in which a nonaqueous dispersed resin (V) (resin components) is contained in 0.5–50% by mass based on total resin solid components.

No. 51 of the present invention provides a coating composition described in any one of the Nos. 50 of the present invention, in which the nonaqueous-dispersed resin (V) is resinous components in a dispersed liquid of polymer particles (q) having a glass transition temperature of 0–100° C. obtained by polymerization of a polymerizable unsaturated monomer (g) in a nonaqueous solvent under the presence of a dispersant which is a polymer (p) having a mass average molecular weight of 3,000–150,000.

As a result of a variety of investigations in order to attain a purpose of No. IX the present invention, the present inventors found out a synthesis method by which an average continuous chain length can be freely controlled in a copolymer, and that the method is an influential method for giving a new physical property to a lactic acid polymer/copolymer, and the present invention has been completed.

That is, No. 52 of the present invention provides a lactide/lactone copolymer in which an average continuous chain length is at least 3 in a lactide unit and an average continuous chain length is 1–10 in a lactone unit, and in which the lactide unit is composed of a random portion having the average continuous chain length of not more than 5 and a block portion having the average continuous chain length of not less than 5, and a number average continuous chain length 1LL(B) in the block portion is satisfied by formula described below;

$$1LL(B)^2 > (fL/(fL+fCap))^3 \times 23$$

(wherein, fL is a lactone component in the lactide/lactone copolymer and fCap is a lactide component in the lactide/lactone copolymer).

No. 53 of the present invention provides a method for the preparation of a lactide/lactone copolymer having an average continuous chain length of not less than 3 in the lactide unit and an average continuous chain length of 1–10 in the lactone unit or the lactide/lactone copolymer shown in the No. 52 of the present invention, characterized in that a polymerization is conducted by adding residual lactide during or after a polymerization of 2–85% of the lactide in total lactide components with the lactone.

No. 54 of the present invention provides a method for the preparation of a lactide/lactone copolymer having an average continuous chain length of not less than 3 in the lactide unit and an average continuous chain length of 1–10 in the lactone unit or a lactide/lactone copolymer having an average continuous chain length of 1–20 in the lactide unit and an average continuous chain length of not less than 3 in the lactone unit, or a lactide/lactone copolymer shown in the No. 52 of the present invention, characterized in that a polymerization is conducted by adding residual lactide and lactone during or after a polymerization of 2–85% of the lactide in total lactide components with 50–98% of the lactone in total lactone components.

No. 55 of the present invention provides a method for the preparation of a lactide/lactone copolymer having an average continuous chain length of not less than 3 in the lactide unit and an average continuous chain length of 1–10 in the lactone unit or a lactide/lactone copolymer having an average continuous chain length of 1–20 in the lactide unit and an average continuous chain length of not less than 3 in the lactone unit, or a lactide/lactone copolymer shown in the No. 52 of the present invention, characterized in that there is repeatedly conducted an operation by adjusting the ratio of a lactide/lactone unit number to not more than 2.5 and adding at least one of residual lactide and lactone during or after a polymerization of 2–85% of the lactide in total lactide components with 50–98% of the lactone in total lactone components.

BRIEF EXPLANATION OF MARKS IN THE FIG. 7

Figure 1:
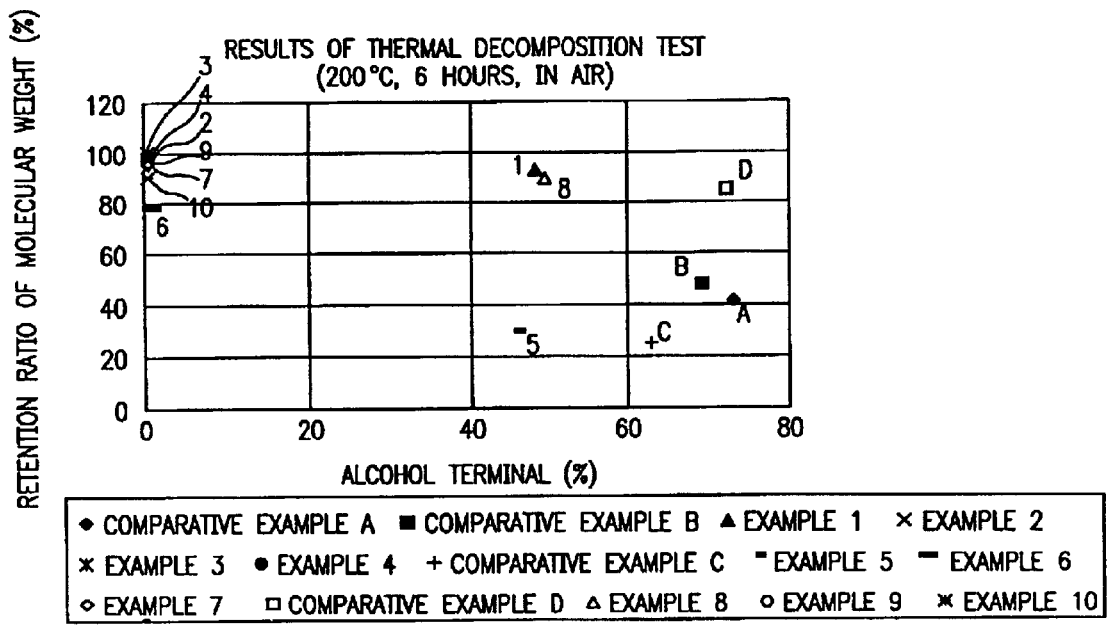
FIGS. 1–6 represent a graph showing results of Table I-1 in the No. I of the present invention.
Figure 2:
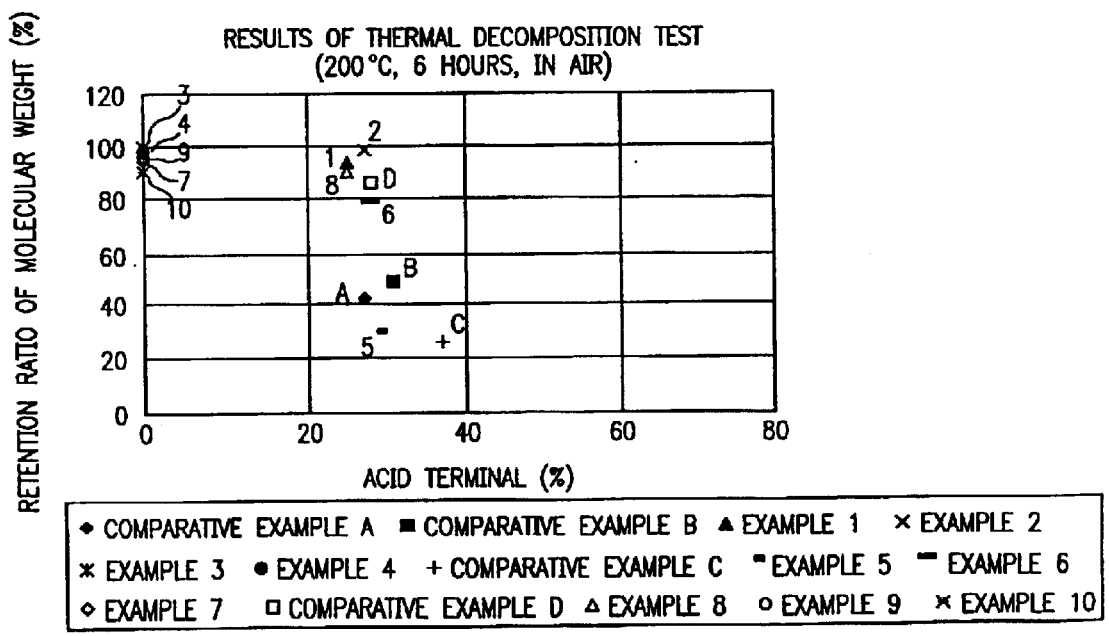
Figure 3:
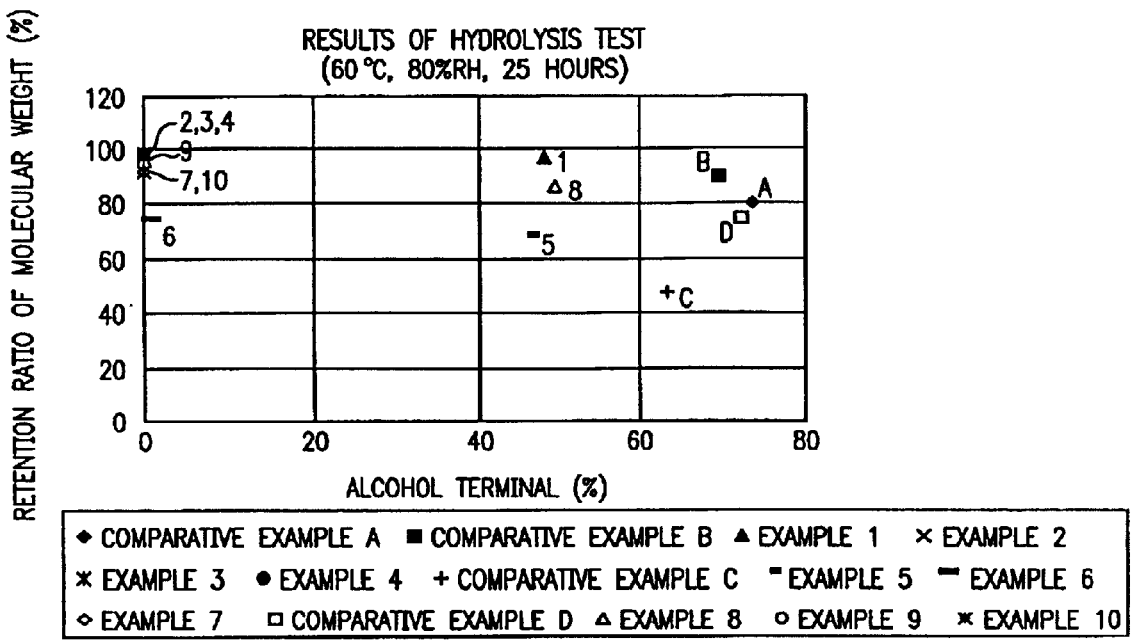
Figure 4:
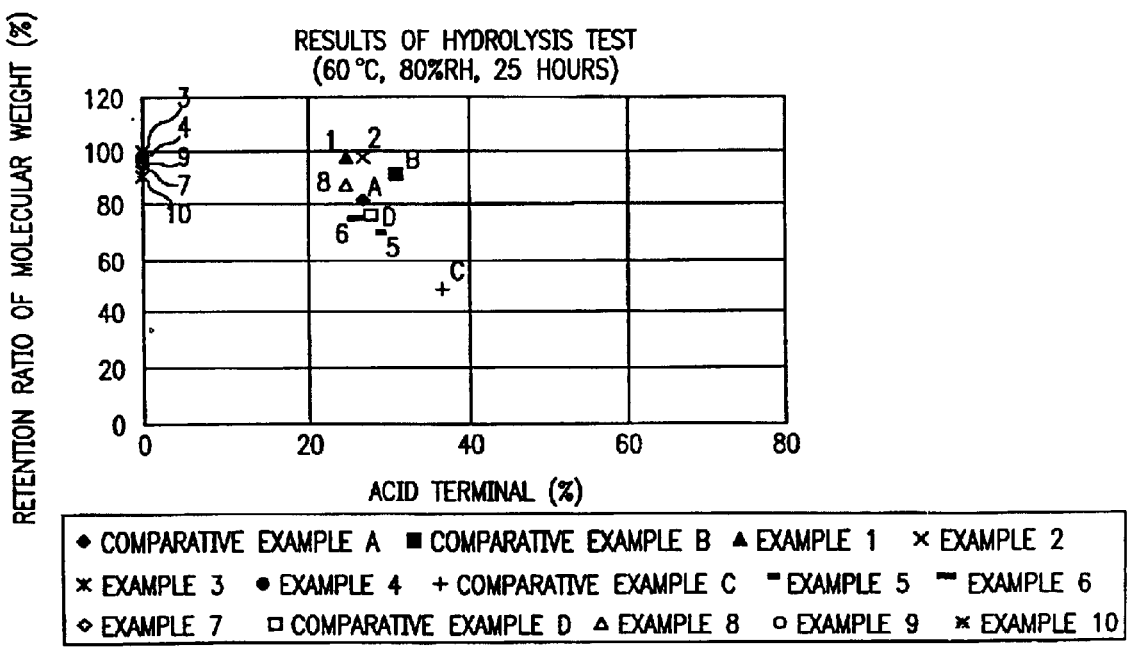
Figure 5:
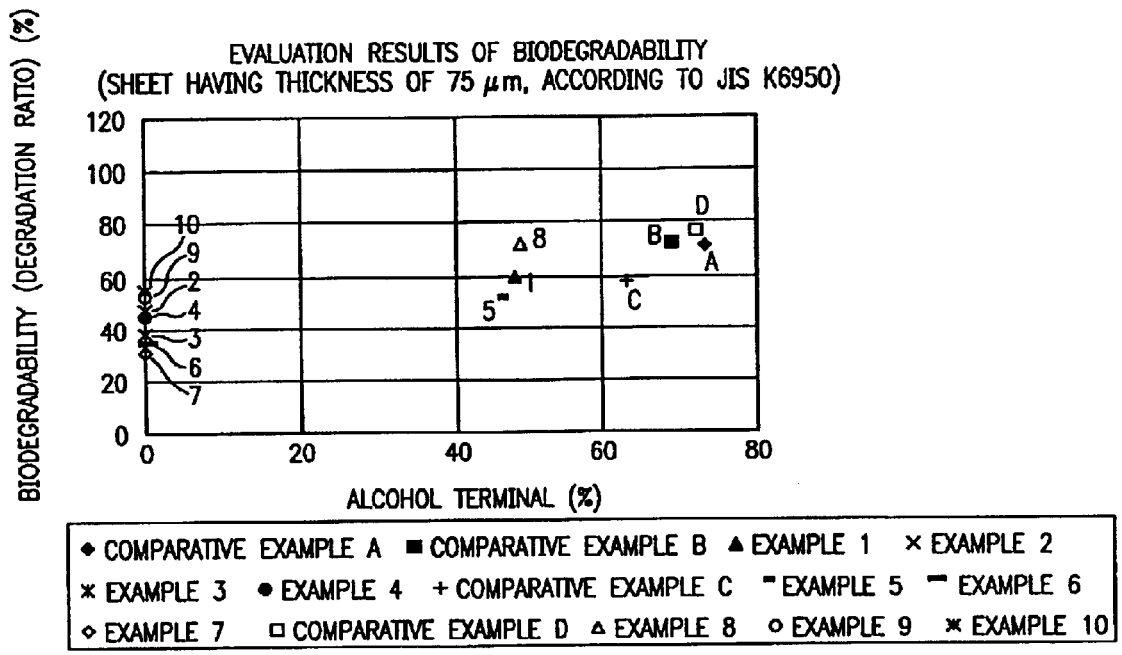
Figure 6:
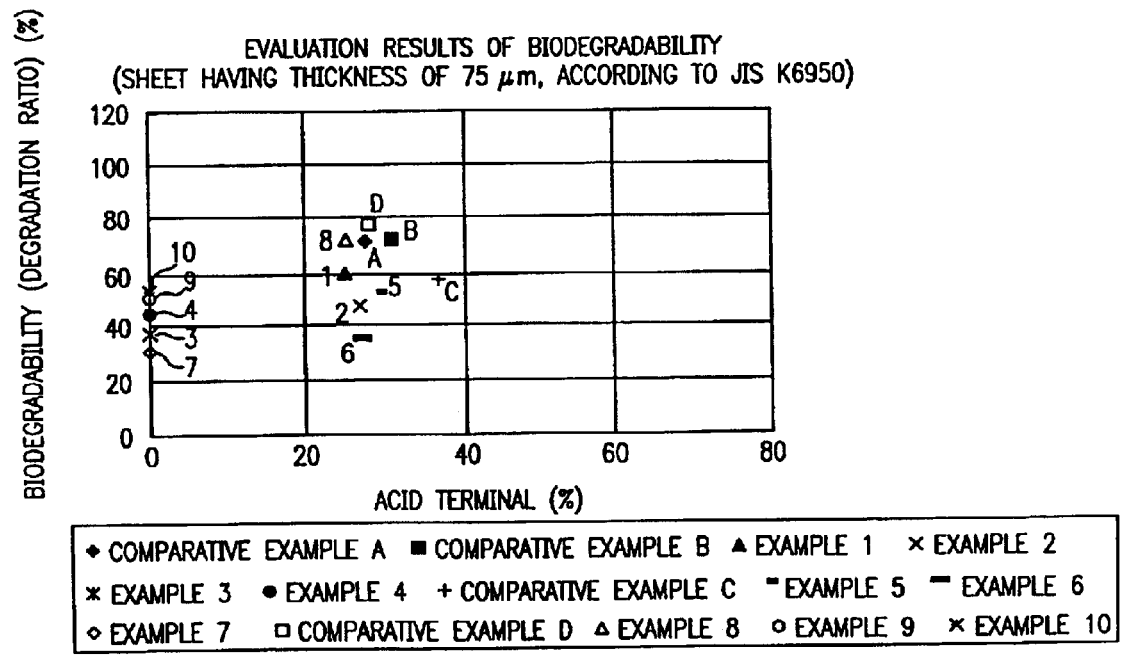

1 Spraying tower
2 Throwing inlet for a fertilizer
3 Outlet for blowing waste gas
4 Nozzle for a fluid
5 Pump
6 Valve
7 Outlet for discharging
8 Heat exchanger
9 Orifice flow meter
10 Blower
11 Liquid tank
$T_1$, $T_2$, $T_3$ Thermometer
SL Steam

BEST MODE FOR CARRYING OUT THE INVENTION

Hereinafter, the present invention will be illustrated in detail.

First of all, the No. I of the invention is illustrated.

As the cyclic ester monomer to be employed in the present invention, a lactone and lactide, etc. are enumerated.

The lactone is a compound having an intramolecular cyclic ester structure and, specifically, there can be exemplified lactones such as β-propiolactone, β-butyrolactone, γ-butyrolactone, ε-caprolactone, γ-varelolactone, δ-varelolactone, α,α-dimethyl-β-propiolactone, β-ethyl-δ-varelolactone, α-methyl lactone, β-methyl-ε-caprolactone, γ-methyl-ε-caprolactone, 3,3,5-trimethyl-ε-caprolactone, 3,5,5-trimethyl-ε-caprolactone, enantolactone, and dodecalactone.

Further, the lactide to be described in the present invention is a bimolecular cyclic ester of an aliphatic hydroxy-carboxylic acid and, specifically, there can be exemplified glycolide, lactide, diethyl glycolide, dimethyl glycolide, α,α-dimethyl glycolide, L-lactide, D-lactide, D,L-lactide and MESO-lactide, etc. which are the bimolecular cyclic ester of lactic acid, glycol acid, ethyl glycol acid, dimethyl glycol acid, etc.

In the present invention, the above-described cyclic ester monomers can be employed solely or in combination of two or more kinds.

In the present invention, in the case of ring-opening polymerization of the above-described cyclic ester monomers, there are preferably employed the cyclic ester monomers having water content of not more than 80 ppm and an acid value of not more than 0.12 mg(KOH)/g. In the case of a monomer having the water content and the acid value exceeding the above values, it is difficult to adjust a carboxylic terminal of a polymer to not more than 30% because of an action as an initiator for ring-opening by water and an acid (hydroxyl acid). Further, it becomes difficult to allow to completely react even in capping of carboxylic acid or alcohol terminals, and it is incapable of attaining the purpose of the present invention.

In the present invention, in the case of ring-opening polymerization of the above-described cyclic ester monomers, a monoalcohol and/or a metal alkoxide are employed as a polymerization initiator.

When the lactone and lactide are ring-opening-polymerized by employing the monoalcohol as a polymerization initiator, an initiating terminal becomes a monoalkyl group, and a polymerized terminal becomes hydroxyl group. In the present invention, an alkyl terminal represents an alkyl group from the above-described monoalcohol.

For example, when ε-caprolactone is polymerized using ROH (R represents an alkyl group) as an initiator, there is obtained a polymer having a formula described below.

Accordingly, although proportion of the number of the alcohol terminal becomes 50% with respect to the number of total terminals, when water is eliminated from the alcohol terminal, the proportion of the number of the alcohol terminal becomes not more than 50%.

On the other hand, when the lactone and lactide are ring-opening-polymerized using the metal alkoxide as a polymerization initiator, an initiating terminal becomes a monoalkyl group, and a terminal of a polymer becomes a metal, and it becomes hydroxyl group by subjecting to hydrolysis. In the present invention, an alkyl terminal represents an alkyl group from the above-described metal alkoxide.

For example, when ε-caprolactone is polymerized using $M(OR)_m$ (M represents a metal, and R represents an alkyl group) as an initiator, there is obtained a polymer having a formula described below.

Metal terminal becomes an alcohol terminal by a post treatment such as neutralization and hydrolysis after polymerization.

The monoalcohol to be employed is mono-ols having a carbon number of 1–24, preferably, mono-ols having a high boiling point of not less than 150° C. For example, there can be employed hexane, heptane, octane, butoxyethanol, phenol, ethoxyphenol, cyclohexanol, an alcohol having an alkenyl group such as hydroxyethyl acrylate, a reaction product of an alcohol with a lactone, a reaction product of an alcohol with a cyclic ether (for example, ethylene oxide and propylene oxide, butylene oxide, and styrene oxide, etc.), or a compound having one hydroxyl group at most. It is to be noted that the compound having one hydroxyl group at most is a product obtained by a ring opening polymerization of a lactone or lactide using a metal alkoxide which is an initiator and, a terminal of a polymer is a metal, and it becomes a hydroxyl group by hydrolysis, in which hydrolysis degree is low, and hydroxyl group is not more than 1.

The initiators may be employed solely or even in combination of two or more kinds.

In the case that the initiators are employed, a catalyst becomes required. As the catalyst, there are enumerated metal compounds such as Al, Ti, Sn, and Zn which are usually employed, and it is not limited to the compounds. The compounds may be employed solely or even in combination of two or more kinds.

As the metal alkoxide to be employed as an initiator in the present invention, specifically, there are enumerated aluminum alkoxide, titanium alkoxide, zinc alkoxide, tin alkoxide, zirconium alkoxide, yttrium alkoxide, samarium alkoxide, niobium alkoxide, neodymium alkoxide, and antimony alkoxide, etc.

As the alkoxide, there are enumerated aliphatic or aromatic alkoxides having a carbon number of 1–24 such as a methoxide, an ethoxide, a propoxide, a butoxide, a phenoxide, and 2,6-diisopropyl phenoxide.

The alkoxides may be employed solely or even in combination of two or more kinds.

As a compound for giving urethane bond, ether bond, ester bond, and amide bond to the aliphatic polyester of the present invention, there are enumerated an isocyanate compound such as a monoisocyanate, a diisocyanate, and a triisocyanate, a carbodiimide compound, an isocyanurate compound, a Schiff base, an anhydride such as succinic anhydride, a cyclic ether such as ethylene oxide, propylene oxide, butylene oxide, and an epoxide such as styrene oxide.

At least one kind of the compounds are preferably and, for example, the cyclic ether and the isocyanate are preferably employed together. More preferably, the epoxide is desirably added after the completion of a reaction by adding the isocyanate.

For example, by adding ½ molar ratio of the diisocyanate to a monofunctional alcohol-terminated aliphatic polyester obtained using a monoalcohol which is an initiator, an aliphatic polyester having alkyl groups at terminals is obtained by connecting through a urethane bond derived from 2 mols of the aliphatic polyesters.

Further, by adding an epoxy compound such as butylene oxide, an alcohol terminal is produced together with formation of an ester bond in a carboxylic acid terminal, and an alcohol terminal is produced together with formation of an ether bond in an alcohol terminal. Accordingly, by a reaction of the alcohol terminals with an isocyanate, there is obtained an aliphatic polyester having an alkyl terminal at both terminals as well as the above description.

In the case, there becomes smaller a proportion occupied by the alcohol terminal and the carboxylic acid terminal with respect to total terminals in the aliphatic polyesters, and there becomes larger an effect for a thermal degradability, hydrolizability, and biodegradability.

Further, the urethane bond, ether bond, ester bond, or amide bond may be even remained at terminals of a polymer molecule, and a monoepoxy compound and monoisocyanate compound, etc. are employed for capping the terminals of a polymer chain produced and, a polyfunctional compound such as a diepoxy compound and diisocyanate compound is employed for coupling a polymer chain produced.

The present invention also includes a polymer obtained by allowing to react a diisocyanate with both terminals of a diol-initiated aliphatic polyester and allowing to connect a mono-ol-initiated aliphatic polyester to residual isocyanate groups.

In the present invention, an aliphatic polyester which is excellent in thermal disintegrabability, hydrolizability, and biodegradability can be obtained by the above-mentioned synthesis methods, and the present invention is not limited to those.

Proportion of the alcohol terminals and carboxylic acid terminals is not more than 50% and not more than 30%, preferably not more than 20% and not more than 8%, and more preferably 0% and 0%, respectively, with respect to total terminals of the aliphatic polyester, by which there can be controlled thermal disintegrabability, hydrolizability, and biodegradability.

In the case that it has the alcohol terminals and carboxylic acid terminals exceeding the above-described range (50%), thermal degradability, hydrolizability, and biodegradability become an identical extent to those obtained by a prior art, resulting in that the purpose of the present invention cannot be attained.

In the present invention, it is desired to possess an alkyl group terminal and/or an alkenyl group terminal of not less than 30% with respect to total terminals, which have a straight chain, a ring, and a branch containing 1–24 carbons.

In the case that the carbon number in the alkyl group and/or the alkenyl group exceeds 24, it affects to various physical properties of the aliphatic polyester, resulting in that the purpose of the present invention cannot be attained.

Further, in the case that the alkyl group terminal and/or the alkenyl group terminal are not more than 30%, it becomes difficult to control the thermal degradability, hydrolizability, and biodegradability.

It is to be noted that the alkyl group terminal in the present invention is derived from a monoalcohol which is an initiator, and derived from a modifier to be employed for capping the hydroxyl terminals and carboxylic acid terminals. Further, the alkenyl group terminal is derived from alcohol terminals by elimination of water, or derived from hydroxyethyl(meth)acrylate employed as an initiator and a modifier.

In the present invention, the aliphatic polyester may even have 0.2–40 pieces of bonds other than ester bonds in one polymer molecule. That is, one polymer molecule after modifying has 0.2–40 pieces (on average) of bonds produced by modifying the alcohol terminals and/or carboxylic acid terminals through allowing to react a modifier with the aliphatic polyester.

For example, if an alcohol-terminated polycaprolactone produced by polymerization of caprolactone using octanol which is an initiator is allowed to react with ½ equivalent of a diisocyanate, since two molecules of the polycaprolactone connect to each other through two urethane bonds, one molecular chain of a polymer after modifying results in containing two urethane bonds.

The bonds are produced by controlling the terminals of a polymer chain, and the polymer is preferably controlled in a polymerization degree of 0.2–2% {(number of bond produced by modifying)/(polymerization degree of a lactone or lactide monomer)×100}. The bonds other than ester bonds, that is, in the case that the bonds produced by bonding to the modifier are too large amount than the above-described range, it affects to various physical properties of the aliphatic polyester, resulting in that the purpose of the present invention cannot be attained.

In the present invention, solvents can be employed in the case of the ring-opening polymerization of the cyclic ester monomer. The solvents to be employed herein are not particularly limited if those are a compound which does not react with catalysts, initiators, and monomers. As the preferred solvents, there are enumerated an aromatic hydrocarbon such as toluene and xylene, and an aliphatic hydrocarbon such as hexane and cyclohexane. Further, in the present invention, the aliphatic polyester can be also prepared without using solvents in the case of the ring-opening polymerization of the cyclic ester monomer.

In the present invention, the cyclic ester monomer can be polymerized by ring-opening through continuously supplying the cyclic ester monomer into a continuous polymerization apparatus.

As the continuous polymerization apparatus to be employed, there can be employed a vessel type reactor equipped with an agitator, a plug-flow type reactor, and a combination thereof.

More specifically, in addition to the vessel type reactor equipped with an agitator, there can be employed a static mixer type reactor, a column type reactor, and an extruder type reactor, etc. Further, the reactors can be employed in combination of two or more kinds.

Hereinafter, the No. II of the present invention will be illustrated.

The particle-state composition for agriculture and gardening of the present invention is a particle-state fertilizer characterized by being obtained spraying a solution composed of the above-described coating materials on the particle-state fertilizer and, by coating while simultaneously drying through blowing a high speed hot air stream to momentarily dry, and in which a coating layer has degradability and disintegrability, and a duration period of a fertilizing effect can be controlled.

In the beginning, a terminal-controlled aliphatic polyester is illustrated which is employed as a coating material II-A in the present invention.

As the terminal-controlled aliphatic polyester in the present invention, there is employed the aliphatic polyester of the No. I of the present invention.

Materials employed as a coating material II-B in the present invention include at least one or more kinds of substances selected from the group consisting of an olefine polymer, a copolymer containing an olefine, a vinylidene chloride polymer, a copolymer containing vinylidene chloride, a diene-based polymer, waxes, a petroleum resin, a natural resin, a cellulose acetate resin, a polycaprolactone, oils & fats and a modified product thereof.

The olefine polymer includes a polyethylene, a polypropylene, an ethylene-propylene copolymer, a polybutene, a butene-ethylene copolymer, a butenepropylene copolymer, and a polystyrene, etc., the copolymer containing an olefine include an ethylene-vinyl acetate copolymer, an ethylene-acrylic acid copolymer, an ethylene-acrylate copolymer, an ethylene-methacrylate copolymer, an ethylene-carbon monoxide copolymer, and an ethylene-vinyl acetate-carbon monoxide copolymer, etc. The copolymer containing vinylidene chloride includes a vinylidene chloride-vinyl chloride based copolymer, and the diene-based polymer includes a butadiene polymer, an isoprene polymer, a chloroprene polymer, a butadiene-styrene copolymer, an EPDM polymer, and a styrene-isoprene copolymer, etc. The waxes include bee waxes, wood waxes, and paraffins, etc., and the natural resin includes a natural rubber and rosins, etc. The cellulose acetate resin includes diacetates having an average substituent degree of 2.5 and triacetates having an average substitution degree of 2.9. The polycaprolactone is a polyester prepared by a ring-opening addition polymerization of $\epsilon$-caprolactone, and which has a molecular weight of not less than 10,000, and preferably 50,000–100,000. The oils & fats and the modified product thereof are a hydrogenated oil, a solid fatty acid, and metal salts thereof, etc.

Weight percentage of the coating material with respect to a coated particle-state substance (for example, a particle-state fertilizer) in the present invention, that is, coating ratio ranges preferably in 2–20% (by mass). Further, the coating material II-A is employed in a range of 10–100% (by mass) based on total of the coating material II-A and the coating material II-B, and preferably in a range of 50–100% (by mass), and the coating material II-B is employed in a range of 0–90% (by mass), and preferably in a range of 0–50% (by mass).

It is to be noted that the coating material in the present invention can be optionally mixed with third coating layer components which are capable of being mixed. As such the third coating layer components (it is shown as coating material II-C in Table II-1 of Examples), there are enumerated additives for resins such as plasticizers, surface active agents as an elution controller, talc as insoluble fillers, calcium carbonate, and fillers such as metal oxides, etc. Mixture is required to be uniformly mixed. In the case of not being uniform, micro particles are partially one-sided and a continuous phase is lost in the coating materials, resulting in that an effect by the coating material is lost.

Addition amount of the fillers which include talc, calcium carbonate, metal oxides, and a mixture thereof is 0–200 parts by weight, preferably 10–150 parts by weight, and more preferably 20–100 parts by weight based on 100 parts by weight of the coating material II-A alone or 100 parts by weight of the mixture of the coating material II-A with the coating material II-B. In the case of larger than the range, holes are apt to be formed in a coating thin layer, and an elution of the fertilizer cannot become controlled.

In the present invention, a fourth component is further optionally employed for the coating thin layer. As the fourth component, for example, there can be enumerated a photo-degradation accelerator, a biodegradation accelerator, an elution controller, and cellulose powder, etc., and the components can be employed by uniformly dispersing.

As the photo-degradation accelerator, for example, there can be exemplified benzoins, benzoin alkyl ethers, benzophenone and derivatives thereof such as benzophenone, and 4,4'-bis(dimethylamino)benzophenone; acetophenone and derivatives thereof such as acetophenone and $\alpha,\alpha$-diethoxyacetophenone; quinones; thioxanthone; a photo-exciting agent such as phthalocyanine, an anatase-type titanium oxide, an ethylene-carbon monoxide copolymer, and an accelerator such as an aromatic ketone and a metal salt thereof, etc. The photo-degradation accelerators can be employed solely or in combination of two or more kinds. By the use of the photo-degradation accelerators, a cellulose ester can be photo-decomposed. For that reason, biodegradability can be interdependently elevated upon the photo-degradability.

As the accelerators for biodegradation, there are exemplified, for example, an organic acid such as an oxo acid (for example, an oxo acid having a carbon number of 2–6 or so such as glycolic acid, lactic acid, citric acid, tartaric acid, and malic acid), a saturated dicarboxylic acid (for example, a lower saturated dicarboxylic acid having a carbon number of 2–6 or so such as oxalic acid, malonic acid, succinic acid, succinic anhydride, and glutaric acid); a lower alkyl ester of the organic acids with an alcohol having a carbon number of 1–4 or so. A preferred accelerator for biodegradation includes citric acid, tartaric acid, and malic acid which are an organic acid having a carbon number of 2–6 or so.

The accelerators for biodegradation are employed solely or in combination.

Further, as the accelerators for biodegradation, there are also included a hydrolysis enzyme such as biodegradable enzyme, for example, lipase, cellulase, and esterase, etc. The biodegradable enzyme can be employed by suspending or dispersing in a solvent. It is to be noted that the above-mentioned accelerators for photodegradation can be employed together with the accelerators for biodegradation. Further, cellulose powder can be also mixed in order to prevent an aggregation of coated particles.

In the present invention, the coating material is dissolved or dispersed in a solvent, and it is sprayed on the surface of the particle-state fertilizers while maintaining at a high temperature, and a high speed heated air stream is simultaneously blown to instantly dry and coat, whereby, the particle-state fertilizer can be obtained.

As the solvents, there can be enumerated ketones such as acetone and 2-butanone (MEK), ketones such as cyclohexanone, esters such as methyl formate, methyl acetate, and ethyl acetate, and cyclic ethers such as THF and dioxane which are low in price and have an appropriate boiling point (70–90° C.), and THF is more preferred from a viewpoint of an excellent solubility to the coating material II-A and the coating material II-B.

Hereinafter, the No. III of the invention is illustrated.

In the beginning, the cyclic ester-modified cellulose ester is illustrated which is employed for the coating material III-A in the present invention.

The cyclic ester-modified cellulose ester in the present invention is a product in which a cyclic ester is graft-modified by a ring-opening polymerization into a cellulose ester having hydroxyl groups.

The cellulose esters having hydroxyl groups is a product in which the hydroxyl groups in a cellulose are partially esterified by a fatty acid and inorganic acid, for example, there are exemplified a cellulose acetate, a cellulose acetate propionate, a cellulose butylate, and a cellulose acetate phthalate, a cellulose nitrate, a mixed ester such as a cellulose nitrate-acetate. The cellulose esters may be employed solely or in combination of one or more kinds. Of the cellulose esters, there are preferred the esters of an organic acid such as the cellulose acetate, a cellulose acetate propionate, and cellulose acetate butylate. Particularly, the cellulose acetate is useful.

Hereinafter, an ester by a fatty acid (a fatty acid cellulose ester) is illustrated as a typical example.

Ester bond is 1–2.9 pieces on average, that is, a substitution degree is preferably 1–2.9, which is composed of the fatty acid and hydroxyl groups in glucose units of the cellulose. Accordingly, residual hydroxyl group is 0.1–2 pieces on average, particularly, more preferably 0.2–0.9 piece on average.

In the case that the substitution degree is less than the range, when it is coated by the cyclic ester-modified cellulose ester, water resistance lowers in the surface of the particle-state fertilizer and, in the case of exceeding the range, there remarkably lower not only a compatibility with other components and flowability in melting, but also biodegradability.

It is to be noted that the substitution degree DS in the cellulose ester, as an example in the case of the cellulose acetate, when a combined acetate acid % (acetylated degree) is X, and Y is X/100, is calculated by the equation described below.

Substitution degree $DS=(162 \times Y)/(60-42 \times Y)$

The cyclic ester, which is employed for allowing to react with the cellulose ester, is not particularly limited, if it can be ring-opening polymerized, and there are enumerated ones exemplified in the No. I of the present invention. Likewise, there are also enumerated glycolide and lactide which are exemplified in the No. I of the present invention. The cyclic ester in the present invention is not limited to a unitary one, and there may be combined a plurality of the above-described various ones.

It is to be noted that as the cyclic ester, $\epsilon$-caprolactone is preferred in view of readily obtaining and relatively low price, and which is excellent in compatibility with the fatty acid cellulose ester such as the cellulose acetate in the present invention.

There is not particularly limited a feeding ratio of the fatty acid cellulose ester having hydroxyl groups with respect to the cyclic ester which is employed for obtaining the cyclic ester-modified fatty acid cellulose ester, and the cyclic ester is desirably 99–15% by mass based on 1–85% by mass of the fatty acid cellulose ester having hydroxyl groups (total of both is 100% by mass). In the case that the ratio of the fatty acid cellulose ester having hydroxyl groups exceeds 85% by mass, viscosity is remarkably elevated in a reaction system, resulting in becoming difficult in handling. Contrarily, in the case that it is less than 1% by mass, productivity lowers. In the case that ductility is required, it is preferred to elevate the feeding ratio of the cyclic ester In the case that it is difficult to handle because of a too high viscosity, it is also possible to lower the viscosity in the reaction system for allowing to readily react by adding supplementary third components which include an organic solvent not having an active hydrogen or a polyvalent alcohol having a reactivity, and which are excellent in compatibility with the fatty acid cellulose ester and the cyclic ester.

As catalysts to be employed in a graft polymerization reaction of the cyclic ester, particularly, the lactones with the fatty acid cellulose ester having hydroxyl groups, there are enumerated catalysts conventionally employed in a ring-opening reaction of the cyclic ester, for example, an alkali metal such as sodium and potassium or a derivative such as an alkoxide, an organic metal or a metal complex such as an alkyl aluminum typified by triethyl aluminum and a derivative therefrom, an alkoxy titanium typified by tetrabutyl titanate, tin octylate and dibutyltin dilaurate, and inorganic tin such as a metal halide, etc.

It is to be noted that tin octylate is a catalyst to be preferably employed for preparing the cyclic ester-modified fatty acid cellulose ester in the present invention.

For obtaining the cyclic ester-modified fatty acid cellulose ester which is a graft polymer in the present invention, there is preferably employed a twin-screw extruder in addition to a usual reactor equipped with an agitator and a condenser (equipped with a drying tube) as a reaction apparatus.

As a temperature in a polymerization for obtaining the graft polymer in the present invention, there is preferred a temperature which is applied for a ring-opening polymerization of the cyclic ester, and it is preferably 100–210° C.

Further, reaction time of period for the polymerization depends upon a kind of the fatty acid cellulose ester having hydroxyl groups and the cyclic ester, feeding ratio thereof, a kind and amount of the catalyst, reaction temperature, and reaction apparatus, and although it is not particularly limited, it is preferably 1–8 hours.

Still further, in the case of obtaining the graft polymer, respective raw materials, nitrogen, and the apparatus, etc. in the polymerization reaction are desirably employed after sufficiently dried.

Besides, moisture content in the reaction system is not more than 0.1% by mass, preferably not more than 0.01% by mass, and more preferably not more than 0.001% by mass.

Molecular weight in the graft copolymer thus-obtained, that is, the cyclic ester-modified fatty acid cellulose ester depends upon a molecular weight in the fatty acid cellulose ester having hydroxyl groups and a kind of the cyclic ester to be grafted, and a mass-average molecular weight is preferred in 200,000–2,000,000, and more preferred in 300,000–1,000,000. In the case that the mass-average molecular weight is less than 200,000 in the graft copolymer, for example, when a fatty acid cellulose ester, for example, a cellulose acetate having a mass-average molecular weight of 157,000 is employed as a starting material, the amount of the cyclic ester to be added is small, and ductility is apt to become insufficient in the coating material III-A obtained from the graft polymer. In the case of exceeding 2,000,000, viscosity becomes too high in the graft polymer, resulting in that a problem in a coating thin layer is apt to be caused.

In the average graft polymer obtained by the polymerization reaction in such the feeding ratio of the fatty acid cellulose ester having hydroxyl groups with the cyclic ester, the cyclic ester, for example, $\epsilon$-caprolactone is preferably 2–50 mol, more preferably 3–30 mol with respect to residual hydroxyl groups in the glucose unit, and there is most preferred the cyclic ester having a structure by addition polymerization of 5–20 mol.

By an internal plasticizing effect in the fatty acid cellulose ester by addition of the cyclic ester, a melting temperature in a product can be lowered and thermal decomposition temperature can be elevated. By the effect, coating can be conducted without adding a large amount of a plasticizer by an apparatus to be employed for coating of usual thermoplastic resins.

Further, since a coating thin layer internally-plasticized by the cyclic ester in the present invention does not show a migrating property, even though a molded article is placed in a contact state with other molded articles under a high temperature and moisture, it is not anxious that it damages the other molded articles.

The cyclic ester-modified fatty acid cellulose ester to be employed in the present invention may be employed solely or, so far as containing a cyclic ester-modified fatty acid cellulose ester, it may be even constructed by a composition (it is prepared from a mixture composed of a plurality of fatty acid cellulose esters having a different substitution degree) containing a variety of the cyclic ester-modified fatty acid cellulose esters having a different substitution degree. Such the composition may contain other cellulose esters such as cellulose esters having a high substitution degree in the case of employing as the coating material III-B which is described hereinafter.

Substitution degree in the cellulose esters having a high substitution degree contains a cellulose esters having a high substitution degree (for example, substitution degree of not less than 2.2, preferably not less than 2.4) which is poor in biodegradability.

Further, a preferred cellulose esters having a high substitution degree frequently has an identical or similar substitution group to the previously-described fatty acid cellulose ester having hydroxyl groups and, particularly, it frequently has an identical substitution group. In the case that the fatty acid cellulose ester is a cellulose acetate, the identical or similar substitution group includes an ester residual group of an organic acid having a carbon number of 1–4 or so.

The composition containing a plurality of the cyclic ester-modified fatty acid cellulose esters having a different substitution degree is characterized in that even though there is low a content of the cyclic ester-modified fatty acid cellulose esters, biodegradability can be elevated in the coating thin layer.

The content of the cyclic ester-modified fatty acid cellulose esters is not less than 10% by mass, preferably not less than 10–90% by mass, and more preferably not less than 10–75% by mass or so (for example, 10–50% by mass) based on total amount of the fatty acid cellulose esters and the cyclic ester-modified esters (a graft polymer). In the case that the content of the cyclic ester-modified fatty acid cellulose esters is not less than 10% by mass, biodegradability can be jumpingly elevated in a cellulose ester having a poor biodegradability. It is to be noted that when the content of the graft polymer increases in the cellulose esters having a low substitution degree, a cellulose ester composition can be decomposed by biodegradation within a short time of period.

A mechanism of biodegradation is not distinct in such the composition. However, it is guessed that there are cultivated microorganisms which do not inherently have degradability for the cellulose esters having a high substitution degree by allowing to contain a small amount of the cellulose esters having a low substitution degree, resulting in that the cellulose esters having a high substitution degree can be also decomposed.

It is to be noted that the cellulose esters which are a starting raw material can be prepared by a common method regardless of high or low substitution degree.

Further, the substitution degree of the cellulose esters may be adjusted by a one-stage reaction in a reaction of an organic acid or an acid anhydride with a cellulose and, the substitution degree may be adjusted by hydrolysis after the preparation of the cellulose esters having a high substitution degree (for example, 3-substituted esters).

Substances to be employed as the coating material III-B in the present invention are the substances exemplified in the No. II of the present invention.

Still further, as the coating material in the present invention, there can be optionally employed third components for a coating thin layer which can be mixed. In the present invention, there can be further optionally employed fourth components for a coating thin layer. The third components (it is represented by coating material III-C in Table III-1 of Example) and fourth components for a coating thin layer are as described in the No. II of the present invention, and those can be likewise employed as in the second aspect of the present invention.

In the present invention, the coating material is dissolved or dispersed in a solvent, and it is sprayed on the surface of the particle-state fertilizers while maintaining at a high temperature, and a high speed heated air stream is simultaneously blown to instantly dry and coat, whereby, the particle-state fertilizer can be obtained.

As the solvents, since the cellulose acetate having a low substitution degree shown in the above-described JP-A-11116371 Official Gazette is poor in solubility into solvent, although there are employed cyclohexanone, methyl formate, methyl acetate, THF, dioxane, and acetone, of those, there are not solvents having an appropriate a boiling point (70–90° C.) at which an operability is good. For example, THF has a boiling point of 65° C. which is a little low, and it is expensive.

On the other hand, the cyclic ester-modified fatty acid cellulose ester such as a lactone-modified cellulose ester can be dissolved in ethyl acetate and 2-butanone (MEK) in addition to the above-described solvents. Ethyl acetate and 2-butanone have a boiling point of approximately 80° C., and lower in price compared to THF.

Hereinafter, the No. IV of the invention is illustrated.

The fatty acid cellulose esters having hydroxyl groups in the present invention is a product in which the hydroxyl groups in a cellulose are partially esterified by a fatty acid and inorganic acid, for example, there are exemplified cellulose esters such as a cellulose acetate, a cellulose acetate propionate, a cellulose acetate butylate, and a cellulose acetate phthalate, and a cellulose nitrate. Of the cellulose esters, there are preferred the cellulose acetate, a cellulose acetate propionate, and cellulose acetate butylate, and particularly, the cellulose acetate is useful.

Ester bond is 1–2.9 pieces on average, that is, a substitution degree is preferably 1–2.9, which is composed of the fatty acid and hydroxyl groups in glucose units of the cellulose. Accordingly, residual hydroxyl group is 0.1–2 pieces on average, particularly, more preferably 0.2–0.9 piece on average.

The cyclic ester in the present invention is as described in the No. III of the invention.

There is not particularly limited a feeding ratio of the fatty acid cellulose ester having hydroxyl groups with respect to the cyclic ester which are employed for obtaining the fatty acid cellulose ester derivative in the present invention, and it can be appropriately selected depending upon a mode for employing as a base fill for a marking film. For example, in the case that the marking film is stuck on a curved surface, since ductility is required in the base fill for a marking film, the feeding ratio of the cyclic ester is preferably elevated. Polymerization for allowing to graft the cyclic ester to the fatty acid cellulose ester having hydroxyl groups is as described in the No. III of the invention.

Molecular weight in a reaction product obtained as described hereinabove depends upon a molecular weight in the fatty acid cellulose ester having hydroxyl groups which is a raw material and a kind of the cyclic ester to be grafted. A mass-average molecular weight is preferred in a range of 200,000–2,000,000, and more preferred in 300,000–1,000,000. In the case that the mass-average molecular weight is less than 200,000 in the graft copolymer, when a cellulose acetate has a mass-average molecular weight of 157,000, the amount of the cyclic ester to be added is small, and ductility is apt to become insufficient in the base film for a marking film obtained from the graft polymer. In the case of exceeding 2,000,000, viscosity becomes too high in the graft polymer, resulting in that a problem in molding is apt to be caused.

In the average graft polymer obtained by the polymerization reaction in such the feeding ratio of the fatty acid cellulose ester having hydroxyl groups with the cyclic ester, the cyclic ester, for example, ε-caprolactone is preferably 2–50 mol, more preferably 3–30 mol with respect to residual hydroxyl groups in the glucose unit, and there is most preferred the cyclic ester having a structure by addition polymerization of 5–20 mol.

By an internal plasticizing effect in the fatty acid cellulose ester by addition of the cyclic ester, a melting temperature in a product can be lowered and thermal decomposition temperature is elevated. By the effect, a mold-fabricating can be conducted without adding a large amount of a plasticizer by usual means for molding thermoplastic resins, for example, injection molding and compression molding.

Further, since a coating thin layer internally-plasticized by the cyclic ester in the present invention doe not show a migrating property, even though a molded article is placed in a contact state with other molded articles under a high temperature and moisture, it is not anxious that it damages the other molded articles.

Still further, the fatty acid cellulose ester derivative in the present invention may be employed together with one or a mixture of a variety of stabilizers such as an anti-oxidant and an ultraviolet ray absorbent, and additives such as dyes and pigments, fillers, lubricants, static agents, and flame retardants according to purposes thereof as well as a usual resin or resin composition.

As a method for molding the fatty acid cellulose ester derivative for the use as a base film for a marking film, there are preferably utilized a casting molding method and calendar molding method, and the casting molding method is particularly preferred.

In the preparation of a film by the casting molding method, an appropriate plasticizer or solvent is added and mixed to the fatty acid cellulose ester derivative to once prepare a fatty acid cellulose ester derivative composition. In the case, other additives as described hereinabove can be also optionally added and mixed.

Since thus-obtained fatty acid cellulose ester derivative composition can provide a desired shape by freely flowing by the gravitational force alone without necessity of giving a special external force, it can provide a desired casting film through the film-preparation by thermally drying alone a solution. As heating and drying conditions in the case, for example, there can be exemplified conditions such as approximately 30–200° C. and approximately 2–120 minutes.

Hereinafter, the No. V of the invention is illustrated.

A cyclic ester-modified cellulose derivative to be employed in the present invention is obtained by grafting of a cyclic ester into a cellulose ester having hydroxyl groups. The cellulose ester having hydroxyl groups which is employed as a raw material is a product in which the hydroxyl groups in a cellulose are partially esterified or etherized by a fatty acid and inorganic acid. As the cellulose ester having hydroxyl groups, for example, there are enumerated cellulose esters such as a cellulose acetate, a cellulose acetate butylate, a cellulose acetate propionate, a cellulose acetate phthalate, and a cellulose nitrate, or cellulose ethers such as an ethyl cellulose, a methyl cellulose, a hydroxyethyl cellulose, and a hydroxypropyl cellulose, etc. Of those, cellulose fatty acid esters are preferably employed in the present invention because of a relatively low price and readily obtaining in an industrial fashion and, further, the cellulose acetate, the cellulose acetate butylate, and the cellulose acetate propionate are preferred because of readily handling.

Ester bond is 1–2.9 pieces on an average, that is, a substitution degree is preferably 1–2.9, which is composed of the fatty acid and hydroxyl groups in glucose units of the cellulose.

Accordingly, residual hydroxyl group is 0.1–2 pieces on average, particularly, more preferably 0.2–0.9 piece on average.

Particularly, there are preferred a cellulose acetate having a substitution degree of acetyl groups of 1.5–2.8 (an acetylated degree of 39–60%), a cellulose acetate propionate having a substitution degree of propionyl groups of 0.5–2.8 (a propionylated degree of 12–63%) and a substitution degree of acetyl groups of 0.5–2.8 (an acetylated degree of 16–60%), and a cellulose acetate butylate having a substitution degree of butyryl groups of 0.5–2.5 (a butyrylated degree of 14–67%) and a substitution degree of acetyl groups of 0.5–2.8 (an acetylated degree of 16–60%).

The cyclic ester in the present invention, which is employed for allowing to cyclic ester-modify, that is, to graft polymerize with the cellulose derivative having hydroxyl groups, is as described in the No. III of the present invention.

In the present invention, there is not particularly limited a feeding ratio of the cellulose derivative having hydroxyl groups with respect to the cyclic ester and, in order to modify by the cyclic ester, the cellulose derivative having hydroxyl groups is employed in 1–85% by mass, and preferably 30–70% by mass, and the cyclic ester is employed in 15–99% by mass, and preferably 30–70% by mass. In the case that the ratio of the cellulose derivative having hydroxyl groups exceeds 85% by mass, viscosity is remarkably elevated in a reaction system, resulting in becoming difficult in handling. Contrarily, in the case that the ratio of the cellulose derivative having hydroxyl groups is less than 1% by mass, productivity lowers. It is to be noted that in the case of a particularly high viscosity, a reacting processing apparatus in which a twin-screw extruder is optionally employed may be applied together with an apparatus for recovering monomers by distilling out in vacuo.

Further, in the case of a high viscosity, there may be employed an organic solvent not having an active hydrogen which is excellent in compatibility with cellulose acetate and the cyclic ester as a third component, whereby, viscosity in the system can be lowered to a range capable of readily handling.

As the solvents, there can be enumerated ketone-based or ester-based solvents such as acetone, methylethyl ketone, methylisobutyl ketone, ethyl acetate, butyl acetate, and cellosolve acetate, or a mixed solvent thereof.

As catalysts to be employed in a graft-polymerization reaction of the cyclic ester with the cellulose derivative having hydroxyl groups, there are enumerated catalysts conventionally employed in a ring-opening reaction of the cyclic ester, for example, an alkali metal such as sodium and potassium or a derivative such as an alkoxide, an organic metal such as tin octylate and dibutyltin dilaurate, and a metal halide such as stannous chloride, etc., in usual, which are widely described in literatures.

However, a preferred catalyst to be employed in the present invention is tin octylate. Further, reaction time of period depends upon a kind of the cellulose derivative having hydroxyl groups and the cyclic ester, feeding ratio thereof, a kind and an amount of the catalyst, reaction temperature, and reaction apparatus, and although it is not particularly limited, it is preferably 1–8 hours. Particularly, in the case of employing the twin-screw extruder together with an apparatus for recovering monomers by distilling out in vacuo, a purpose can be also attained by exceedingly shortening the reaction time of period to not more than 10 minutes.

Still further, in the case of obtaining the graft polymer, respective raw materials, nitrogen for purging a reactor, and the reactor, etc. are desirably employed after sufficiently dried.

Moisture content in the reaction system is not more than 0.1%, preferably not more than 0.001%. The reaction temperature is preferably a temperature at which a ring-opening polymerization of a cyclic ester is usually conducted, and it is preferably 100–210° C.

Molecular weight in thus-obtained cyclic ester-modified cellulose derivative depends upon a molecular weight in the cellulose derivative having hydroxyl groups and a kind of the cyclic ester to be grafted. A mass-average molecular weight (conventionally, it is referred to as a weight-average molecular weight) is preferred in a range of 50,000–1,000,000.

Average graft polymer obtained by the polymerization reaction in such the feeding ratio of the cellulose derivative having hydroxyl groups with the cyclic ester, the cyclic ester, for example, $\epsilon$-caprolactone has a structure containing 1–50 mol of $\epsilon$-caprolactone, preferably 2–50 mol, more preferably 2–30 mol, and particularly preferably 2–20 mol based on 1 mol of the glucose unit.

Heat-transfer picture image-recording material is obtained by coating a solution of the cyclic ester-modified cellulose derivative onto a base material to prepare a dye-receiving layer.

As the base material for the picture image-recording material, there can be employed, for example, a paper made from natural materials, a synthetic paper (for example, a polypropylene-based, a polystyrene-based, and a polyester-based synthetic paper, etc.), a plastic film (for example, a polyester film such as a polyethylene terephthalate film), or a laminate thereof, etc. A preferred base film includes the synthetic paper and the plastic film.

Thickness of the base material can be optionally selected from a range of, for example, 5–500 $\mu$m, preferably 10–300 $\mu$m, and more preferably 50–200 $\mu$m or so. In the base material, particularly, the synthetic paper and the plastic film, there may be added stabilizers such as an anti-oxidant, an ultraviolet ray absorbent, and a thermal stabilizer, and additives such as lubricants, static agents, and pigments. The picture image-recording material has a dye-receiving layer containing the above-described resins over at least one surface of the base material. The dye-receiving layer is formed by coating a coating solution containing the resins onto the base material, followed by drying. The coating solution can be prepared using a resin composition and an appropriate solvent.

As a method for coating the coating solution, there can be employed a usual method, for example, a roll-coating method such as a gravure and reverse method, a doctor-knife method, a knife-coating method, and a nozzle-coating method, etc.

The dye-receiving layer in the picture image-recording material may be any one of a single layer and a laminated layer, usually, it is a single layer. Thickness of the dye-receiving layer can be optionally selected from a range of, for example, not less than 0.1 $\mu$m (for example, 0.5–40 $\mu$m), and preferably 1–30 $\mu$m or so according to the base material and use purposes. The cyclic ester-modified cellulose derivative is employed in 5–50% by mass, and preferably 10–40% by mass based on solid components of the dye-receiving layer.

The picture image recording material of the present invention is employed in combination with a heat-transfer sheet containing a sublimatable dye. The picture image-recording material of the present invention is useful for forming a picture image onto the picture image-recording material by a heat-transfer method, for example, in which a picture image-recording material is brought into contact with a heat-transfer sheet containing and a sublimatable dye and heated by a thermal head to move a dye for heat-transferring onto the picture image-recording material.

Hereinafter, the No. VI of the invention is illustrated.

The cyclic ester-modified cellulose derivative to be employed in the present invention is illustrated as described in the No. V of the invention.

As a substrate in the present invention, there can be employed a film made from a polycarbonate, a polyallylate, a polyetherimide, a polysulfone, a polyphenyl ether, a polyamideimide, a polyimide, a polyethylene naphthalate, a polyphenyl sulphide, a polyetherether ketone, and a fluorine resin, and a film made from a polyethylene terephthalate, a polybutylene terephthalate, a polyethylene, a polypropylene, a polystyrene, a polyvinyl chloride, a polyvinylidene chloride, and a nylon, etc.

Preferably, it is a biaxially-oriented film.

As an ink layer having a heat-transferring property in the present invention, there is employed a melt type or sublimatable type ink layer having a heat-transferring property which is conventionally publicly-known as it is, and it is not particularly limited. That is, the ink layer having a heat-transferring property to be employed in the present invention is constructed by coloring agents, waxes, and resins, and additives such as lubricants, surfactants, etc.

As the coloring agents, there are employed dyes and pigments such as carbon black, an iron oxide red, a lakered C, a first skyblue, a benzidine yellow, copper phthalocyanine green, copper phthalocyanine blue, a direct dye, an oily dye, and a basic dye, etc. As the waxes, there are enumerated, for example, natural waxes such as a carnauba wax, an olicury wax, a canderrila wax, a japan wax, a cane wax, a montan wax, an ozokerite, a microcrystalline wax, an ceresine wax, and a paraffin wax, and synthesized waxes such as a Fischer-tropsh wax, a low molecular weight polyethylene, an oxidized wax, and a hydrogenated wax, etc.

Further, as the resins, there are exemplified, for example, a vinyl-based resin such as a polyacrylic acid, a polyacrylate, a polymethacrylic acid, a polymethacrylate, a polyacrylic amide, a polystyrene, a polyvinyl acetate, a polyvinyl alcohol, a polyvinyl butylal alcohol, a polyvinyl pyrolidone, a polyvinyl chloride, a polyvinylidene chloride, a cellulose-based resin such as an ethyl cellulose, a hydroxyethyl cellulose, an ethylhydroxy cellulose, a hydroxypropyl cellulose, a methyl cellulose, and a cellulose acetate, a polyester resin, a polyacetal resin, an epoxy resin, a terpene resin, a rosin resin, a fluorine resin, and a silicone resin, etc.

As the additives, there can be employed a fatty acid, a metal salt of a fatty acid, a fatty acid ester, a fatty acid amide, an inorganic salt, a nonionic-based surface active agent, a cationic-based surface active agent, an anionic-based surface active agent, and an ampholytic surface active agent, etc., and those are not particularly limited.

The ink layer having a heat-transferring property can be formed by a publicly-known method. For example, a composition of the melt type ink layer having a heat-transferring property is specifically exemplified in Example VI-1, and a composition of the sublimatable type ink layer having a heat-transferring property is specifically exemplified in Example VI-3.

A heat-resistible protecting layer is formed by adjusting a viscosity of the cyclic ester-modified cellulose derivative using a solvent to modify to a condition being capable of coating, by coating it onto an opposite surface of the substrate on which the ink layer having a heat-transferring property is formed, and by drying at 50–150° C.

Proportion of the cyclic ester-modified cellulose derivative in the heat-resistible protecting layer is 40–100% by mass and, further, preferably 60–100% by mass based on solid components in the heat-resistible protecting layer. Thickness is 0.01–2.00 μm and, further, preferably 0.05–0.75 μm. As described hereinabove, there can be obtained a heat-transferring recording material in which the ink layer having a heat-transferring property is formed on the surface of the substrate, and the heat-resistible protecting layer composed of the cyclic ester-modified cellulose derivative is formed on the opposite surface of the ink layer in the substrate.

Hereinafter, the No. VII of the invention is illustrated.

The conductive coating resin (A) to be employed in the present invention contains 2–20% by mass, preferably 5–15% by mass of a cellulose ester derivative (a) obtained by a ring-opening graft-polymerization of a cyclic ester with a cellulose ester derivative having hydroxyl groups and 98–80% by mass, preferably 95–85% by mass of a resin for coating (b) [total of (a) and (b) is 100% by mass].

In the case that an amount of the cellulose ester derivative (a) is less than 2% by mass, it becomes difficult to elevate conductivity in a dried coating layer or undried coating layer, resulting in that an adhering efficiency of a finishing coating becomes worse. On the other hand, in the case that an amount is more than 20% by mass, compatibility with the resin for coating (b) becomes worse, resulting in that a storage stability is unpreferably deteriorated in a coating composition.

The cellulose ester having hydroxyl groups in the present invention is as described in the illustration for the No. III of the present invention. Ester bond is 1–2.9 pieces on average, that is, a substitution degree is preferably 1–2.9, which is composed of the fatty acid and hydroxyl groups in glucose units of the cellulose and, accordingly, residual hydroxyl group is 0.1–2 pieces on average, particularly, more preferably 0.2–1.3 piece on average.

The cyclic ester in the present invention is not limited, if it can be ring-opening polymerized, and there are enumerated ones exemplified in the No. III of the present invention.

There is not particularly limited a feeding ratio of the cellulose ester derivative having hydroxyl groups with respect to the cyclic ester which is employed for obtaining the cellulose ester in the present invention and, it can be appropriately selected according to a use mode of the conductive coating composition. In order to conduct the graft polymerization of the cellulose ester having hydroxyl groups with the cyclic ester, the cyclic ester is desirably 99–15% by mass based on 1–85% by mass of the fatty acid cellulose ester having hydroxyl groups. In the case that the ratio of the cellulose ester derivative having hydroxyl groups exceeds 85% by mass, viscosity is remarkably elevated in a reaction system, resulting in becoming difficult in handling.

Contrarily, in the case that it is less than 1% by mass, a characteristics such as a heat resistance is unpreferably lost in the cellulose ester.

In the case that it is difficult to handle because of too high viscosity, it is also possible to lower the viscosity in the reaction system for allowing to readily react by adding supplementary third components which include an organic solvent not having an active hydrogen or a polyvalent alcohol having a reactivity, and which are excellent in compatibility with the fatty acid cellulose ester and the cyclic ester.

Conditions for the preparation of the cellulose ester derivative (a) which is a graft polymer in the present invention are as described in the No. III of the present invention.

A molecular weight of thus-obtained cellulose ester derivative (a) depends upon a molecular weight of the cellulose ester having hydroxyl groups and a kind of the cyclic ester to be grafted which are raw materials. Mass-average molecular weight (it is measured using an analytical curve of a standard polystyrene in chloroform in GPC) preferably ranges in 50,000–1,000,000, and more preferably in 80,000–800,000. In the case that the mass-average molecular weight is less than 50,000, strength of a coating layer is apt to become insufficient in the conductive coating composition.

Further, in the case of exceeding 1,000,000, viscosity becomes too high in the graft polymer, and smoothness lowers in the coating layer, resulting in that a problem is apt to be caused in coating.

As the resin (b) for a coating to be employed in combination with the cellulose ester derivative, there can be employed conventionally-known resins for a coating.

For example, there are enumerated a polyolefin-based resin such as a chlorinated polypropylene resin, a maleic acid-modified chlorinated polypropylene resin, an ethylene-acrylic acid copolymer, and an EPDM (an ethylene-diene terpolymer), a polybutadiene-based resin, a copolymer obtained by a graft-reaction of the polyolefin-based resin or the polybutadiene-based resin with a radical polymerizable unsaturated monomer such as a (meth)acrylate or styrene, a thermoplastic resin such as an epoxide-fatty acid ester-based resin, an alkyd-based resin, and acrylic-based resin, a thermosetting resin composed of a base resin such as an acrylic-based resin, a polyester-based resin, an alkyd-based resin, an epoxide-based resin, and urethane-based resin and a crosslinking agent (an amino resin and a blocked isocyanate compound), and an ordinary temperatures-curable resin composed of the base resin and the crosslinking agent (a polyisocyanate compound), etc.

The conductive pigment (B) to be employed in the present invention is composed of 40–60% by mass, preferably 45–5% by mass of a conductive carbon black (c) and 60–40% by mass, preferably 55–45% by mass of a scaly graphite (d) [total of (c) and (d) is 100% by mass]. In the case that formulating proportion of the conductive carbon black is less than 40% by mass, and formulating proportion of the scaly graphite is more than 60% by mass, there unpreferably lowers an adhering property in an article to be coated and a finishing coating layer. On the other hand, in the case that formulating proportion of the conductive carbon black is more than 60% by mass, and formulating proportion of the scaly graphite is less than 40% by mass, physical properties unpreferably lower in the coating layer.

The conductive carbon black (c) to be employed in the present invention is a powder-state substance primarily containing carbon, and itself is already known. For example, it can be employed by appropriately selecting from a method for the preparation of a thermal black, a furnace black, a lamp black, a contact black (channel black, roll black, and disk black).

Further, as the conductive carbon black (c), there is preferably employed one having a DBP (dibutyl phthalate) absorbing amount ranging in 70–250 ml/100 g, preferably 100–200 ml/100 g and an electrical resistivity ranging in not more than 1 Ω·cm, preferably not more than 0.1 Ω·cm. In the case that the DBP absorbing amount is less than 70 ml/100 g, since a large amount of the conductive carbon black is required in order to elevate the conductivity of the coating layer, it is anxious that physical properties unpreferably lower in the coating layer. On the other hand, in the case that the DBP absorbing amount is more than 250 ml/100 g, a storage stability occasionally tends to unpreferably lower in a coating composition, and a finishing outer appearance tends to unpreferably lower in a finishing coating. Further, in the case that the electrical resistivity is more than 1 Ω·cm, a storage stability occasionally tends to unpreferably lower in a coating composition and physical properties unpreferably lower in the coating layer because of a large use amount.

As a preferred specific example of the conductive carbon black (c), there can be enumerated, for example, Vulcan XC-72 (manufactured by Cabot. Corp.), CONDUCTEX 900, CONDUCTEX 975 (both are manufactured by Columbian Chemicals Company), and DENKA HS-100 (manufactured by Denki Kagaku Kogyo, Ltd.), etc.

It is to be noted that the DBP absorbing amount and the electrical resistance were measured by testing methods described below.

DBP absorbing amount: 1.00±0.01 g of a dried sample is precisely weighed, and it is moved onto a plain glass plate or stone plate having not less than approximately 300×300 mm. If it is particle-state, particles are crushed with a spatula while appropriately compressing. Appropriately ½ of a necessary amount of DBP is slowly poured from a burette onto the plain glass plate or stone plate, and DBP is circularly and uniformly spread, and then, a sample is gradually scattered by moving onto DBP, followed by carefully kneading like drawing a small circle with the spatula.

The sample adhered to the spatula is removed by another spatula, and approximately ⅓–¼ of DBP is further added, followed by repeating the same operations to adjust a mixture to a uniform state. When nearing a terminating period, it is added one drop by one drop, and when further nearing the terminating period, it is added ½ drop by ½ drop, and operations are terminated at a period that a whole becomes a shrunk lump. The operations are adjusted as terminating within 10–15 minutes, and the absorbing amount is calculated according to the following equation by monitoring a DBP dropwise amount in the burette at 3 minutes after a lapse of the operations.

$$OA = (V/W) \times 100$$

wherein
OA: absorbing amount (ml/100 g)
V: use amount (ml) of DBP until a termination period
W: weight (g) of a dried sample Electrical resistivity: Approximately 0.25 g of a dried sample is packed in an insulating cylindrical vessel, and sample amount is adjusted to a sample height of 10±0.5 mm when the sample is compressed by pressure of 50±1 kg/cm$^2$, and then, electrical resistivity (Ω·cm) is calculated according to the following equation from electric potential difference, electric current, packing height of the sample, and cross-sectional area under the pressure.

$$\rho = (S/L) \times R$$

wherein $$R = V/A$$

ρ: Electrical resistivity (Ω·cm)
S: Cross-sectional area of a sample (cm$^2$)
L: Packing height (cm) of a sample R: Electrical resistance (Ω)
V: Electric potential difference (V)
A: Electric current (A)

The scaly graphite (d) is powder-state, thickness ranges in not more than 0.5 mm, and average particle diameter ranges in 0.5–15 μm, and preferably 1–7 μm.

In the case that the thickness is more than 0.5 mm, the use amount becomes large, there unpreferably tend to lower storage stability of a coating and physical properties of a coating layer.

In the case that the average particle diameter is less than 0.5 μm, conductivity of the coating layer is not sufficient and, on the other hand, in the case that the average particle diameter is more than 15 μm, workability tends to lower in spray coating, and there unpreferably tend to lower adhesion, etc. to an article to be coated and a finishing coating layer.

As a preferred specific example of the scaly graphite (d), there can be enumerated graphite powders SP-10, SP-20, HAG-15, HAG-150, and HAG-300 (those are manufactured by Nihon Kokuen, Ltd.), and artificial graphites POG-2, POG-10, and POG-20 (those are manufactured by Sumitomo Chemicals, Ltd.), which are a trade name.

The above-described conductive resin for a coating (A) and conductive pigment (B) are formulated in a proportion of 75–85% by mass, preferably 78–82% by mass of the conductive resin for a coating (A) and 25–15% by mass, preferably 22–18% by mass of the conductive pigment (B) (total of the (A) and the (B) is 100% by mass).

In the case that the formulating amount of the conductive resin for a coating (A) is less than 75% by mass and the formulating amount of the conductive pigment (B) exceeds 25% by mass, there unpreferably lower physical properties of the coating layer and there unpreferably lowers an adhesion to an article to be coated and a finishing coating layer. On the other hand, in the case that the formulating amount of the conductive resin for a coating (A) exceeds 85% by mass and the formulating amount of the conductive pigment (B) is less than 15% by mass, there cannot be unpreferably formed a coating layer which is excellent in conductivity.

The coating composition of the present invention is preferably employed as a solvent-type coating in which an organic solvent is a medium, and a non-aqueous dispersion coating.

As the organic solvent, if it dissolves or disperses the above-described resins, it can be limitedly employed and, specifically, there can be enumerated an aromatic hydrocarbon such as benzene, toluene, and xylene, an aliphatic hydrocarbon such as hexane, heptane, octane, and decane, a chlorinated hydrocarbon such as trichloroethylene, perchloroethylene, dichloroethylene, dichloroethane, and dichlorobenzene, a ketone-based solvent such as methylethyl ketone and diacetone alcohol, an alcohol-based solvent such as ethanol, propanol, and butanol, and a cellosolve-based solvent such as methylcellosolve, butylcellosolve, and cellosolve acetate, etc.

In the coating composition of the present invention, there can be formulated other pigments in addition to the above-described conductive pigments. As the other pigments, if those are employed for usual coatings, those are not particularly limited, and those are roughly divided into an inorganic pigment and an organic pigment which are described below.

As the inorganic pigments, there are enumerated white color-based ones which include titanium oxide, zinc oxide, basic lead carbonate, basic lead sulphate, a phosphate such as zinc phosphate, a molybdate such as calcium molybdate, black color-based ones which include carbon black, rosin black, graphite, and iron black, yellow color-based ones which include yellow lead, synthesized iron oxide yellow, transparent iron oxide, titanium yellow, zinc yellow, and strontium chromate, red color-based ones which include iron oxide, transparent iron oxide, red lead, molybdate orange, cuprous oxide, basic lead chromate, and lead cyanamide, green color-based ones which include chromium oxide and chromium green, blue color-based ones which include iron blue, ultramarine blue, and cobalt blue, extender pigments which include calcium carbonate, barium sulphate, talc, clay, mica, silica, and plaster, non-conductive metal powder which includes a surface-oxidized aluminum powder and lead suboxide powder, and pearly pigment, etc.

Further, as the organic pigments, there are enumerated an azolake-based one which includes a β-naphthol-based one, a β-oxynaphthoic acid-based one, a naphthol AS-based one, an acetoacetic anilide, an insoluble azo-based one which includes a P-naphthol-based one, naphthol AS-based one, an acetoacetic anilide-based one, and a pyrazolone-based one, a condensed azo-based one which includes a naphthol AS-based one and an acetoacetic anilide-based one, a polycyclic pigment which includes anthraquinone-based one, phthalocyanine-based one, quinacridone, isoindorinone, dioxadine, perylene, perynone, thioindigo, pyrocholine, fluorubine, and quinophthalone, and metal complex-based ones, etc.

Further, in the coating composition of the present invention, there can be optionally added a variety of additives such as a plasticizer, a dispersant, a modifier for a coating surface layer, a fluidity controller, an ultraviolet ray absorbent, an ultraviolet ray stabilizer, an anti-oxidant, an accelerator for a crosslinking reaction, a depressant for a crosslinking reaction, which are publicly-known. In order to prepare the coating composition of the present invention using the above-described substances, there may be employed same apparatuses and processes as in conventional methods for the preparation of coatings. For example, a coating can be prepared by a method in which pigments are dispersed in a mixture of a binder with a solvent using an appropriate dispersing apparatus such as a ball mill, a sand mill, and a roll mill to prepare a pigment paste, and necessary components are further added and uniformly mixed by a Disper. The coating composition of the present invention can be applied to a nonconductive or conductive material or a material in which it is desired to further elevate a conductivity and, as the materials, there are enumerated plastic materials, reinforced plastic materials, and inorganic materials, etc.

The coating composition of the present invention can be coated by conventional coating methods. That is, coating can be conducted by means such as an air spray coating, an airless spray coating, a variety of static coating, a roll coating, and a brush coating.

Thickness of a coating layer usually ranges in approximately 5–40 $\mu$m, and preferably 10–25 $\mu$m based on thickness of a dried coating layer. Further, the coating layer is dried at room temperature or forcibly until surface resistance to be desired attains to $1 \times 10^6$ $\Omega$/cm in the coating layer.

The coating layer formed by the coating composition of the present invention can be utilized as a coating layer for shielding electromagnetic wave or, an intermediate-coating or a static under-coating layer for finishing coating.

As the intermediate-coating, there can be employed an already known intermediate-coating itself which is excellent in adhesion, smoothness, clearness, and weatherability. Specifically, there can be enumerated a thermosetting intermediate-coating which primarily contains a short oil having an oil length of not more than 30% or a long-short oil alkyd resin, or oil-free polyester resin and an amino resin which are a vehicle.

The alkyd resin and the polyester resin have a hydroxyl value of 60–140 mg KOH/g and an acid value of 5–200 mg KOH/g, in which an unsaturated oil (an unsaturated fatty acid) is preferably employed as an oil to be modified. Further, as the amino resin, there are appropriate an alkyl (preferably, a carbon number of 1–5)-etherized melamine resin, a urea resin, and a benzoguanamine resin, etc.

As formulating ratio of the both resins, preferably, the alkyd resin and (or) the oil-free polyester resin are 65–85% by mass, and particularly 70–80% by mass, and the amino resin is 35–15% by mass, and particularly 30–20% by mass. Further, the amino resin can be partially changed to a polyisocyanate compound or a blocked polyisocyanate compound.

Further, as types of the intermediate-coating, there can be employed an organic solvent-type one using the vehicles, a nonaqueous-dispersed type one, a high solid type one, an aqueous solution type one, a water-dispersed-type one, and a powder type one, etc. which are conventionally publicly-known. Still further, there can be optionally formulated extender pigments, coloring pigments, and other additives for coatings in the intermediate coating.

The intermediate coatings are a coating for coating onto the surface of the conductive surface to be coated in the present invention, and coating operation can be conducted by the same method as for the above-described conductive coating. The thickness of the coating layer preferably ranges in 10–50 $\mu$m based on a coating layer after curing. Temperature for curing the coating layer depends upon components in the vehicle, and in the case of heating, it ranges in 60–160° C. and, particularly, in 80–150° C.

The finishing coating is a coating for coating on the surface of the conductive coating layer or the surface of the intermediate coatings, and it gives a decorating property to an article to be coated.

Specifically, there can be employed an already known coating itself being capable of forming a coating layer which is excellent in a finishing outer appearance (clearness, smoothness, and gloss), weatherability (a retention property of gloss, a keeping property of color, and whitening-resistible property), chemical resistance, water of color, and whitening resistible property), chemical resistance, water resistance, moisture resistance, and curability, etc. For example, there are enumerated a coating primarily containing an amino acrylic-based resin, an amino alkyd-based resin, and an amino polyester-based resin as a vehicle and, further, there can be also applied a coating in which the amino resin is partially or wholly changed to a polyisocyanate compound or a blocked polyisocyanate compound.

Type of the finishing coating is not particularly limited, and there can be employed an organic solvent type one, a nonaqueous solvent-dispersed type one, a water soluble (dispersed) type one, a powder type one, and a high solid type one, etc. Drying or curing of the coating layer is conducted by drying at ordinary temperature, drying at heating, and irradiation by active energy rays, etc.

The finishing coating to be employed in the present invention may be even an any type of an enamel coating in which metallic pigments and (or) coloring pigments are formulated in the coating primarily containing the above vehicles, or a clear coating which does not contain the pigments at all or almost does not contain.

And, as a method for forming the finishing coating layer using the coatings, for example, there are enumerated the following methods.

(1) a method (metallic- or solid-color finishing by a one-coat and one-baking style) in which there is coated and thermally cured a metallic coating composed of a metallic coating and optionally coloring pigments or a solid color coating containing coloring pigments.

(2) a method (metallic- or solid-color finishing by a two-coat and two-baking style) in which a metallic coating or a solid color coating is coated, and then, thermally cured, followed by further coating a clear coating and thermally curing again by heating.

(3) a method (metallic- or solid-color finishing by a two-coat and one-baking style) in which a metallic coating or a solid color coating is coated, and then, a clear coating is coated, followed by simultaneously curing both coating layers by heating.

The finishing coatings are preferably coated by spray coating and an electrostatic coating.

Further, thickness of the coating layer in the (1) ranges in 25–40 μm based on a dried coating layer and, in the (2) and (3), in the case of a metallic coating or solid color coating, it preferably ranges in 10–30 μm, and it preferably ranges in 25–50 μm in the case of a clear coating, respectively. Heating and curing condition can be freely selected by materials of an article to be coated and vehicle components, and it is usually 60–160° C., and particularly, preferably 100–150° C. for 10–40 minutes.

In the present invention, by formulating the conductive carbon black (c) and the scaly graphite (d) at a specified proportion, since the conductive carbon black (c) forms a structure having a continuous chain structure or a chain structure, and it exists in a coating composition in the form in which the scaly graphite (d) aggregates with the structure, it is not anxious that the conductive pigment (B) is separated from the conductive resin for a coating (A) or sinks, resulting in that there is shown an effect of an excellent storage stability for a long time of period.

And, since the conductive carbon black and the scaly graphite in the coating layer which are formed from those have a same structure as in the above-descriptions, and these connect to each other, there can be effectively reproduced an effect for elevating conductivity in the coating layer.

Although functions in the cellulose ester derivative (a) are not clear, which is obtained by a ring-opening graft-polymerization of cyclic esters onto a cellulose ester having hydroxyl groups, it is presumed that an effect is elevated by an action which allows to orientate so that a scaly plain surface is opposite to surface to be coated. By the effect, scales often come into contact with each other, and there can be shown an effect that conductivity in a coating layer is elevated by a connection of the conductive carbon black (c) with the scaly graphite (d).

Hereinafter, the No. VIII of the present invention is illustrated in detail.

In the beginning, there are roughly shown symbols representing respective components in the present invention and a relationship therebetween.

Cellulose ester derivative (a): It is obtained by a ring-opening graft polymerization of cyclic esters with a cellulose ester having hydroxyl groups.

Polymerizable unsaturated monomer (b): It includes an unsaturated monomer having an isocyanate group (f), a polymerizable monomer (h), and other polymerizable monomers (g), etc.

Graft copolymer (I): It is obtained by a copolymerization of the cellulose ester derivative (a) with the polymerizable unsaturated monomer (b).

Unsaturated monomer having an isocyanate group (f)
Polymerizable monomer having an active hydrogen (h)
Polyisocyanate compound (c)
Polyisocyanate compound (II): It includes a polymer (e), etc. containing an isocyanate compound having a low molecular weight (d) and the unsaturated monomer having an isocyanate group (f) as constructing units.
Isocyanate compound having a low molecular weight (d)
Polymer (e) containing the unsaturated monomer having an isocyanate group
Oxazoline compound (II')
Cellulose ester derivative (III): If it is the same kind as in the cellulose ester derivative (a), it may be not an identical one.
Modified vinyl-based copolymer (III'): It is obtained by a copolymerization of the cellulose ester derivative (III) (If it is the same kind as in the above-described cellulose ester derivative (III)), it may be not an identical one) with other polymerizable unsaturated monomers (g).
Graft copolymer (IV): It is obtained by a copolymerization of a macro monomer (m) with other polymerizable unsaturated monomers (i) except it.
Other polymerizable unsaturated monomers (j) except it: It is component (b) other than component (h).
Nonaqueous-dispersed resin (V): It is a resin component in a dispersed liquid of a polymer (q) particle obtained by a polymerization of other polymerizable unsaturated monomers (g) in a nonaqueous solvent using as a dispersion stabilizer which is a polymer (p).
Polymer (p): a dispersion stabilizer, mass-average molecular weight of 3,000–150,000.
Polymer (q): It is obtained by a polymerization of the polymerizable unsaturated monomer (g) in a nonaqueous solvent under the presence of the dispersion stabilizer (p), which has a glass transition temperature of 0–100° C.

1. Cellulose Ester Derivative (a)

The cellulose ester derivative (a) to be employed in the present invention is obtained by a ring-opening graft polymerization of cyclic esters with a cellulose ester having hydroxyl groups. The cellulose ester having hydroxyl groups is a product in which the hydroxyl groups in a cellulose are partially esterified by an acid, and it is the same as the cellulose ester derivative (a) in the VII of the present invention.

The cellulose ester derivative (a) obtained by a graft polymerization includes 2–50 mol, preferably 3–30 mol, and more preferably 5–20 mol of ε-caprolactone based on (0.1–2 pieces on average) of residual hydroxyl groups in glucose units as an average structure.

2. Polymerizable Unsaturated Monomer (b)

As the polymerizable unsaturated monomer (b) to be employed in the present invention, there are enumerated an unsaturated monomer having an isocyanate group (f), a polymerizable monomer having an active hydrogen (h), and other polymerizable unsaturated monomers (g).

As the other polymerizable unsaturated monomers (g), the following substances are exemplified.

There are enumerated a (meth)acrylate which includes, for example, an alkyl or cycloalkyl ester of (meth)acrylic acid having a carbon number of 1–20 such as methyl(meth)acrylate, ethyl(meth)acrylate, propyl(meth)acrylate, butyl(meth)acrylate, 2-ethylhexyl(meth)acrylate, octyl(meth)acrylate, lauryl(meth)acrylate, cyclohexyl(meth)acrylate, isobonyl(meth)acrylate, adamantyl(meth)acrylate, and an alkoxyalkyl ester of (meth)acrylic acid having a carbon number of 2–8 such as ethoxybutyl(meth)acrylate, etc.

As substances other than the (meth)acrylate, there are enumerated, for example, glycidyl(meth)acrylate, styrene, α-methylstyrene, vinyltoluene, (meth)acrylonitrile, (meth) acrolein, butadiene, and isoprene, etc., these can be employed in combination.

As the polymerizable monomer having an active hydrogen (h), there are enumerated a (meth)acrylate containing a hydroxyl group and a (meth)acrylate containing an amino group which are described below, and which can be employed in combination.

As the (meth)acrylate containing a hydroxyl group, there are enumerated, for example, a hydroxyalkylester of (meth) acrylate having a carbon number of 2–8 such as hydroxyethyl(meth)acrylate and hydroxypropyl(meth) acrylate, Placcel FA-1 (a monomer in which 1 mol of ε-caprolactone is introduced into 1 mol of hydroxyethylacrylate), Placcels FM-1, FM-3, and FM-5 (a monomer in which 1 mol, 3 mol, and 5 mol of ε-caprolactone is introduced into 1 mol of 2-hydroxyethylacrylate, respectively) which is a commercially product by Daicel Chemical Industries, Ltd., which are a commercially product by Daicel Chemical Industries, Ltd., TONE-100 (a monomer in which 1 mol of ε-caprolactone is introduced into 1 mol of 2-hydroxyethylacrylate) which is a commercially product by Union Carbide, Ltd. in USA, which are an adduct of 1–5 mol of lactones into 1 mol of the (meth)acrylate containing a hydroxyl group, and which can be employed in combination.

As the (meth)acrylate containing an amino group, there are enumerated, for example, an aminoalkyl ester of (meth) acrylic acid such as dimethylaminoethyl(meth)acrylate, diethylamino ethyl(meth)acrylate, and (meth)acryl amide, etc., and which can be employed in combination.

As the monomer having an isocyanate group (f), there are enumerated, for example, isocyanate ethyl(meth)acrylate, isocyanate propyl(meth)acrylate, isocyanate butyl(meth) acrylate, isocyanate hexyl(meth)acrylate, m-isopropenyl-α, α'-dimethylbenzyl isocyanate, and m-ethylenyl-α,α'-dimethylbenzyl isocyanate, etc. and, further, there is enumerated an unsaturated compound in which a polyisocyanate compound such as hexamethylene diisocyanate is added to the polymerizable monomer containing an active hydrogen (h) such as hydroxyethyl(meth)acrylate, and which can be employed in combination.

The polymerizable unsaturated monomer (b) exemplified as the above-described (f), (g), and (h) can be employed also in combination, it is employed by selecting depending upon desired physical properties.

3. Graft Copolymer (I)

The graft copolymer (I) of the present invention is prepared by a radical polymerization of the above-described cellulose ester derivative (a) and unsaturated monomer (b) through a solution polymerization under the presence of a radical polymerization initiator, the component (b) forms a trunk polymer (a trunk portion), and the component (a) forms a branched polymer, whereby, the graft copolymer (I) of the present invention can be obtained.

In the case that the polymerizable monomer having an active hydrogen (h) is employed as a portion of the polymerizable unsaturated monomer (b), and the polyisocyanate compound (c) is allowed to react with the polymerizable monomer having an active hydrogen (h), it is prepared by a radical polymerization of the above-described cellulose ester derivative (a) with unsaturated monomer (b) through a solution polymerization under the presence of a radical polymerization initiator, whereby, the component (b) forms a trunk polymer, and the component (a) forms a branched polymer, and then, the polyisocyanate compound (c) is allowed to react with an active hydrogen in the monomer (h).

As the radical polymerization initiator, there can be employed a peroxide initiator such as benzoyl peroxide, t-butylhydroperoxide, cumylhydroperoxide, cumenhydroperoxide, t-butylperoxybenzoate, and an azo-based initiator such as t-butylperoxy-2-ethylhexanoate, azobisisobutyronitrile and azobisdimethyl valeronitrile, As a solvent to be employed in the solution polymerization, there are enumerated benzene, toluene, xylene, an ester-based solvent such as butyl acetate, ethyl acetate, propyl acetate, and cellosolve acetate, an ether-based solvent such as dioxane and ethylene glycol dibutylether, and a ketone-based solvent such as methylethyl ketone and methyl isobutyl ketone, etc., and which there can be employed solely or in combination of two or more kinds.

As use proportion of the components (a) and (b), the component (a) is 1–30% by mass, and preferably 5–20% by mass, and the component (b) is 70–99% by mass, and preferably 80–95% by mass (total of the (a) and (b) is 100% by mass).

In the case that the polymerizable monomer having an active hydrogen (h) is employed as a portion of the polymerizable unsaturated monomer (b), and the polyisocyanate compound (c) is allowed to react with the polymerizable monomer having an active hydrogen (h), total of the (b) and (c) corresponds to 70–99% by mass of the (b).

In the case that the component (a) is less than 1% by mass, dryability and hardness become unpreferably insufficient in a coating layer obtained and, in the case that the component (a) exceeds 30% by mass, durability unpreferably lowers in a coating layer obtained.

The graft copolymer (I) of the present invention has an isocyanate group at a trunk portion formed by the radical polymerization of the polymerizable unsaturated monomer (b), and the content of the isocyanate group is 0.5–28.5% by mass, and preferably 35–15% by mass based on the total mass of the graft copolymer (I). In the case that the content of the isocyanate group is less than 0.5% by mass, solvent resistance and durability become poor in a coating layer obtained, unpreferably resulting in that dryability and hardness also become insufficient and, on the other hand, in the case of exceeding 28.5% by mass, a coating layer becomes brittle, unpreferably resulting in that durability rather lowers.

The graft copolymer (I) of the present invention is a polymer having an isocyanate group at a trunk portion and, in order to introduce an isocyanate group into the trunk portion, there can be applied methods (i) and (ii) described below.

(i): The above-described monomer having an isocyanate group is employed as the polymerizable unsaturated monomer (b), or (ii): Active hydrogen is introduced into a trunk portion of a polymer which should become the copolymer (I) of the present invention using the above-described polymerizable monomer having an active hydrogen such as hydroxyl group or amino group as the polymerizable unsaturated monomer (b), and more than equivalent mol of the polyisocyanate compound is allowed to react with the active hydrogen.

In the case that the polymerizable monomer having an active hydrogen (h) is employed as the polymerizable unsaturated monomer (b), as the polyisocyanate compound which is allowed to react with the active hydrogen, there are enumerated aliphatic diisocyanates such as hexamethylene diisocyanate and trimethylhexamethylene diisocyanate, aliphatic group-substituted aromatic isocyanates such as xylylene diisocyanate, and cycloaliphatic diisocyanates such as isophorone diisocyanate, etc.

It is to be noted that in the case of employing the polyisocyanate compound (c), total of the polymerizable monomers including the (c) corresponds to 70–99% by mass of the polymerizable monomer (b).

Thus-obtained graft copolymer (I) of the present invention has a structure that the component (b) forms a trunk polymer (a trunk portion), the trunk portion has an isocyanate group, and the component (a) forms a branched polymer.

Mass average molecular weight (it is measured using a curve of a standard Polystyrene in chloroform by a GPC) of the graft copolymer (I) is 2,000–150,000, preferably 5,000–50,000, and glass transition temperature is 0–90° C., preferably 15–75° C. In the case that the mass average molecular weight is less than 2,000, it is unpreferably difficult to obtain a satisfied dryability and hardness in a coating layer obtained and, on the other hand, in the case of exceeding 150,000, storage stability lowers, and it is unpreferably difficult to obtain a finishing property in a coating layer obtained. Further, in the case that the glass transition temperature is less than 0° C., it is unpreferably difficult to obtain a satisfied dryability and hardness in a coating layer obtained and, on the other hand, in the case of exceeding 90° C., coating layer becomes brittle, resulting in that durability rather unpreferably tends to lower.

The graft copolymer (I) of the present invention can provide a coating thin layer by moisture curing alone.

4. Coating Composition

The present invention provides a single-liquid type coating composition primarily containing the graft copolymer (I), and optionally contains a variety of curing agents and resinous components.

That is, the coating composition of the present invention is comprised the graft copolymer (I) and, optionally at least one of components described below,

- a polyisocyanate compound (II),
- a cellulose ester derivative (III) obtained by a ring-opening graft polymerization of cyclic esters with a cellulose ester having hydroxyl groups,
- a modified vinyl-based copolymer (III') not containing an isocyanate group component which comprises copolymerization of 5–75% by mass of the cellulose ester derivative (III) with 25–95% by mass of other polymerizable unsaturated monomer (h) (total of (III) and (h) is 100% by mass),
- a graft copolymer (IV) which comprises copolymerization of 3–30% by mass of a macromonomer (m) with 70–97% by mass of other polymerizable unsaturated monomer (j) (total of (m) and (j) is 100% by mass), and,
- a nonaqueous dispersed resin (V).

In the coating composition, the graft copolymer (I) is contained in not less than 50% by mass in the total resin solid components which are composed of the (I), (II), (III), (III'), (IV), and (V) which are 100% by mass.

Polyisocyanate compound (II) and oxazolidine compound (II')

As the above-described curing agents, the polyisocyanate compound (II) and oxazolidine compound (II') can be formulated in view of single-liquid type.

As the polyisocyanate compound (II), there can be employed a low molecular weight isocyanate compound (d) having at least two isocyanate groups and a polymer (e) containing an unsaturated monomer having isocyanate groups as a constructing unit.

As the low molecular weight compound (d), there are enumerated aliphatic isocyanates such as hexamethylene diisocyanate and trimethylhexamethylene diisocyanate, cycloaliphatic isocyanates such as xylylene diisocyanate and isophorone diisocyanate, an adduct of the diisocyanates with polyvalent alcohols, a low molecular weight polyester resin, and water, a polymer of the diisocyanates themselves (an adduct of a diisocyanate monomer, there are enumerated Collonate L manufactured by Nihon Polyurethane, Ltd. and Takenate D102 manufactured by Takeda Pharmaceutical, Ltd.) and, further, an isocyanate buret compound, etc.

As the polymer (e) containing an unsaturated monomer having isocyanate groups, there is enumerated a copolymer containing isocyanate groups obtained by copolymerization of the above-described monomer (f) containing an isocyanate group with other polymerizable unsaturated monomer (g) such as styrene and (meth)acrylates.

The above-described polyisocyanate compound (II) is formulated in a range of 0.5–40% by mass, and preferably 1–20% by mass based on total solid resinous components.

The above-described oxazolidine compound (II') is formulated in a range of 0.5–5% by mass, and preferably 1–3% by mass based on total solid resinous components.

Cellulose Ester Derivative (III) and Modified Vinyl-based Copolymer (III')

In the coating composition of the present invention, there can be formulated the cellulose ester derivative (III) obtained by a ring-opening graft polymerization of cyclic esters with a cellulose ester having hydroxyl groups and the modified vinyl-based copolymer (III') which comprises copolymerization of the cellulose ester derivative (III) with other polymerizable unsaturated monomer (g) from a viewpoint of an improvement of dryability.

As the cellulose ester derivative (III) obtained by a ring-opening graft polymerization of cyclic esters with a cellulose ester having hydroxyl groups, there can be employed one (it may be not identical to the cellulose ester derivative (a)) which is mentioned in the illustration of the cellulose ester derivative (a) component which becomes a constructing unit in the above-described graft copolymer (I), and it is appropriately formulated in a range of 0.5–20% by mass based on total resinous components Further, the modified vinyl-based copolymer (III') is a graft copolymer not containing an isocyanate group component which comprises copolymerization of 5–75% by mass of the cellulose ester derivative (III) described above (it may be not identical to the cellulose ester derivative (III) or the cellulose ester derivative (a)) with 25–95% by mass of other polymerizable unsaturated monomer (g).

The other polymerizable unsaturated monomer (g) can be employed by appropriately selecting from the monomers (except the monomer (f) containing an isocyanate group and the monomer containing an active hydrogen (h)) which are stated in the illustration of the polymerizable unsaturated monomer (b) which becomes a constructing unit in the above-described graft copolymer (I).

The modified vinyl-based copolymer (III') is appropriately formulated in a range of 1–30% by mass based on total resinous components.

Graft Copolymer (IV)

Further, in the coating composition of the present invention, there may be formulated a copolymer of ethylenic polymerizable monomers, particularly, the graft copolymer (IV) which comprises polymerization of 3–30% by mass of a macromonomer (m) with 70–97% by mass of other polymerizable unsaturated monomer (j) from a viewpoint of an improvement of dryability.

The macromonomer is an oligomer or polymer having polymerizable unsaturated group at a terminal, it is prepared by conventionally publicly-known methods, and there is preferred one having a glass transition temperature of not less than 50° C. and a mass-average molecular weight of 1,000–25,000.

As the macromonomer, there is enumerated an oligomer or polymer such as a methacryloyl having methylmethacrylate or a methacryloyl having butylacrylate as a segment. As a commercially supplied product, there are enumerated AA-2, AA-6, AB-2, and AB-6 which are manufactured by Toa Gosei Chemicals, Ltd.

The other polymerizable unsaturated monomer (j) can be employed by appropriately selecting from the monomers (except the monomer containing an active hydrogen (h)) which are stated in the illustration of the polymerizable unsaturated monomer (b) which becomes a constructing unit in the above-described graft copolymer (I). The graft copolymer (IV) is appropriately formulated in a range of 1–20% by mass based on total resinous components.

Still further, in the coating composition of the present invention, there may be formulated the nonaqueous dispersed resin (V) from a viewpoint of an improvement of durability and dryability. The nonaqueous dispersed resin (V) is obtained by a polymerization of the monomer (g) under the presence of a dispersant in an organic liquid which can dissolve the monomer (g) and does not substantially dissolve a polymer formed from the monomer (g) and, as the nonaqueous dispersed resin (V), there is preferred a dispersion liquid of a polymer particle having a glass transition temperature of 0–100° C. obtained by a polymerization of a monomer appropriately selected from the other polymerizable unsaturated monomer (g) under the presence of a polymer (p) having a mass-average molecular weight of 3,000–150,000.

As the polymer (p), there is enumerated a polymer or copolymer of a (meth)acrylate or styrene.

Concentration of the nonaqueous dispersed resin (V) is 10–60% by mass in the dispersion liquid and the nonaqueous dispersed resin (V) is a resinous component in the dispersion liquid.

The nonaqueous dispersed resin (V) is appropriately formulated in a range of 0.5–50% by mass, preferably 1–30% by mass with respect to total solid resins.

The coating composition of the present invention primarily contains the above-described graft copolymer (I), and the curing agents and resinous components of the (II)-(V) are optionally formulated and, preferred storage stability and physical properties of a coating layer are obtained by selecting a composition showing an isocyanate group content of 0.5–28.5% by mass, preferably 3.0–15% by mass in total solid resins as a whole of the composition.

In the coating composition of the present invention, there can be optionally formulated pigments, solvents, ultraviolet ray absorbents, catalysts for curing, and dehydrating agents, etc. which are usual additives for coatings.

The coating composition of the present invention can be employed as a single-liquid coating which is capable of coating by adjusting alone to viscosity for coating with solvents for dilution.

As a coating method for the coating composition of the present invention, there can be utilized a conventionally publicly-known method such as a spray coating, a brush coating, and a roller coating and, in usual, it is coated in thickness of the coating layer of 10–80 $\mu$m or so.

Hereinafter, No. IX of the present invention is illustrated in detail.

As a Lactide and lactone in the present invention, there are enumerated ones exemplified in the No. I of the present invention.

In the present invention, in the case of a ring-opening polymerization of the above-described cyclic ester monomer, there is preferably employed a monomer having a moisture content of not more than 80 ppm and an acid value of not more than 0.12 mg KOH/g.

In the case of employing a monomer having more than the moisture content and the acid value, it becomes difficult to control an average continuous chain length in respective units, occasionally resulting in being incapable of attaining purpose of the present invention.

In the present invention, a compound having hydroxyl group is employed as an initiator. The compound may have a plurality of hydroxyl groups, and a plurality of the compounds may be even employed. Further, a metal alkoxide may be also employed as an initiator. As specific examples, there can be enumerated aluminum alkoxide, titanium alkoxide, zinc alkoxide, tin alkoxide, zirconium alkoxide, yttrium alkoxide, samarium alkoxide, niobium alkoxide, neodymium alkoxide, and antimony alkoxide, etc.

As catalysts for the polymerization to be employed in the present invention, there can be enumerated metal compounds of aluminum, titanium, zinc, and tin without any limitation which are usually employed. The compounds may be employed in combination of two or more kinds. Further, in the case that the metal alkoxide is employed as an initiator, catalysts may be even not employed.

In the present invention, preferably, the average continuous chain length is preferably not less than 3 in the lactide unit, and the average continuous chain length is preferably 1–10 in the lactone unit, and more preferably, the average continuous chain length is not less than 4.5 in the lactide unit, and the average continuous chain length is 1.5–10 in the lactone unit. In the case of less than those, it becomes not different from a random copolymer synthesized in a one step and, in the case of more than those, it becomes not different from a completely-blocked copolymer.

Further, in the present invention, the average continuous chain length is preferably 1 to 20 in the lactide unit, and the average continuous chain length is preferably 3 or more in the lactone unit, and more preferably, the average continuous chain length is 1.5 to 13 in the lactide unit, and the average continuous chain length is 4.5 or more in the lactone unit. In the case of less than those, it becomes not different from a random copolymer synthesized in one step and, in the case of more than those, it becomes not different from a completely-blocked copolymer.

Further, in the present invention, preferably, the lactide unit is preferably composed of a random portion having the average continuous chain length of not less than 5 and a block portion having the average continuous chain length of less than 5. More preferably, the average continuous chain length is not more than 3 in the random portion, and the average continuous chain length is not less than 8 in the block portion.

In the case that the average continuous chain length is not more than that in the random portion, it becomes not different from from a completely-blocked copolymer and, in the case that the average continuous chain length is less than that in the block portion, it becomes not different a random copolymer synthesized in a one step.

The average continuous chain length of a random portion and block portion in the lactone unit is identically mentioned.

In the present invention, a polymerization is conducted by adding residual lactide during or after polymerization of 2–85% of the lactide in the total of the lactide and the lactone. In the case, conversion is preferably not less than 80% in first step, and more preferably 80–97%. In the case that a monomer for second step is added at a conversion period being less than that, the average continuous chain length can not be extended in the block portion, occasionally resulting in that purpose of the present invention cannot be attained.

Further, in the case that a monomer for second step is added at a conversion of not more than 90%, there is prepared a polymer having a large amount of lactone units at terminals, and a thermal decomposition resistance is elevated.

In the case that the amount of lactide to be initially introduced is less than 2% based on total amount of lactide, it becomes not different from a completely-blocked copolymer and, in exceeding 85%, it becomes not different from a random copolymer synthesized in a one step.

Further, in the present invention, a polymerization is conducted by adding residual lactide and lactone during or after polymerization of 2–85% of the lactide in the total lactide and 50–98% of the lactone in the total lactone. In the case, a conversion is preferably not less than 80% in first step, and more preferably 80–97%. In the case that a monomer for second step is added at a conversion period being less than that, the average continuous chain length can not be extended in the block portion, occasionally resulting in that purpose of the present invention cannot be attained. Further, in the case that a monomer for second step is added at a conversion of not more than 90%, there is prepared a polymer having a large amount of lactone units at terminals, and a thermal decomposition resistance is elevated.

In the case that the amount of lactide to be firstly introduced is less than 2% based on total amount of lactide, it becomes not different from a completely-blocked copolymer and, in exceeding 85%, it becomes not different from a random copolymer synthesized in a one step. In the case that amount of lactone to be initially introduced is less than 50% based on total amount of the lactone, it becomes not different from a completely-blocked copolymer and, in exceeding 98%, it becomes identical to the above-described invention.

Still further, in order to adjust the lactide/lactone to not more than 2.5 in the present invention, there is repeatedly conducted an operation in which a polymerization is conducted by adding at least one kind of the residual lactide and lactone during or after polymerization of 2–85% of the lactide in the total lactide and 50–98% of the the lactone in the total lactone.

In the present invention, the copolymer is polymerized in two or more steps. In the case of adding the monomers, a conversion in a previous step is preferably not less than 80%. In the case of adding the monomers at a period of the conversion being less than that, the average continuous chain length can not be extended in the block portion, occasionally resulting in that purpose of the present invention cannot be attained.

Further, in the case that lactide and/or lactone are added at a second step from a final, final monomers are preferably added at a conversion of 80–97%. In the case, the average continuous chain length is extended as desired in the block portion and, there is prepared a polymer having a large amount of lactone units at terminals, and a thermal decomposition resistance is elevated. The amount of lactide and lactone to be initially introduced is the same as previously mentioned.

Still further, in the present invention, a polymerization is conducted by adding residual lactide and lactone during or after polymerization of 25–90% of the lactone in the total lactone. In the case, conversion is preferably not less than 80% in first step, and more preferably 80–97%. In the case that a monomer for second step is added at a conversion period being less than that, the average continuous chain length can not be extended in the block portion, occasionally resulting in that purpose of the present invention cannot be attained. Further, in the case that a monomer for second step is added at a conversion of not more than 90%, there is prepared a polymer having a large amount of lactone units at terminals, and a thermal decomposition resistance is elevated. In the case that the lactone in the first step is added at a period less than 25% based on total amount of the lactone, the average continuous chain length can not be extended in the block portion, occasionally resulting in that purpose of the present invention cannot be attained. In exceeding 90%, it becomes not different from a completely-blocked copolymer.

Still further, in the present invention, there is repeatedly conducted an operation in which a polymerization is conducted by adding at least one kind of the residual lactide and lactone during or after polymerization of 25–90% of the the lactone in the total lactone. In the present invention, the copolymer is prepared using two or more steps. In the case of adding the monomers, conversion in a prior step is preferably not less than 80%.

In the case that the monomers are added at a period of conversion less than that, the average continuous chain length can not be extended in the block portion, occasionally resulting in that purpose of the present invention cannot be attained.

Still further, in the case that lactide and/or lactone are added at a second step from a final, final monomers are preferably added at a conversion of 80–97%. In the case, the average continuous chain length is extended as desired in the block portion and, there is prepared a polymer having a large amount of lactone units at terminals, and a thermal decomposition resistance is elevated.

The amount of lactone to be initially introduced is the same as previously mentioned.

In the present invention, reaction temperature and period are appropriately selected depending upon starting raw materials to be employed, catalysts, a kind of initiators, and a copolymer to be desired.

In the present invention, a cyclic ester monomer can be ring-opening-polymerized by continuously feeding the cyclic ester monomer into a continuous polymerization apparatus.

As the continuous polymerization apparatus, there can be employed an agitator-equipped vessel type reactor, a plug-flow type reactor, and a combination thereof. More specifically, in addition to the agitator-equipped vessel type reactor, there can be employed a static mixer type reactor, a column type reactor, and an extruder type reactor, etc. Further, these can be employed in combination of two or more kinds.

EXAMPLES

Hereinafter, although the present invention is specifically illustrated by Examples, the present invention is not limited to those.

It is to be noted that "part" and "%" are shown by "part by mass" and "% by mass" except a case being specifically shown.

Hereinafter, Examples are illustrated in relation to an aliphatic polyester of the No. I in the present invention and a method for the preparation thereof.

A proportion occupied by an alcohol terminal and carboxylic acid terminal is merely shown by "%" based on total terminals of a polymer obtained.

Thermal decomposition was evaluated by a molecular weight retention ratio at the temperature of 180 and 200° C. and in a nitrogen atmosphere and air.

Hydrolizability was evaluated by a molecular weight retention ratio of pellets after storing for a fixed period under a circumstance at the temperature of 40° C. and humidity of 40% and a circumstance at the temperature of 60° C. and humidity of 80%.

Evaluation of biodegradability was conducted using powder of a polymer obtained by a method using an active sludge according to JIS K6950.

Tensile test was conducted according to JIS K7113.

Comparative Example I-A 67.5 μl (1.2 mmol) of ethylene glycol which is an initiator and 3.4 μl (8.4×10$^{-3}$ mmol) of tin octylate which is a catalyst were added to 100 ml (902.4 mmol) of a caprolactone monomer (water content of 150 ppm and an acid value of 0.23 mg-KOH/g) to prepare a polycaprolactone at 180° C., in which a proportion occupied by an alcohol terminal and a carboxylic terminal was 73% and 27%, respectively.

Number average molecular weight was 49,800 in the polymer.

A result of a thermal decomposition test of the polycaprolactone obtained was 82% at 180° C. for 6 hours (under a nitrogen stream), 81% at 200° C. for 6 hours (under a nitrogen stream), 55% at 180° C. for 6 hours (in air), and 42% at 200° C. for 6 hours (in air), respectively.

Further, in the hydrolizability test, it was 84% at 40° C. for 360 hours and 81% at 60° C. for 25 hours, respectively.

In a sheet having thickness of 75 μm compression-molded from that, degradation ratio according to the above evaluation method for biodegradability was 71% at a period after 25 days, and tensile strength was 252 kgf/cm$^2$.

Comparative Example I-B 67.5 μl (1.2 mmol) of ethylene glycol which is an initiator and 3.4 μl (8.4×10$^{-3}$ mmol) of tin octylate which is a catalyst were added to 100 ml (902.4 mmol) of a caprolactone monomer (water content of 50 ppm and an acid value of 0.10 mg-KOH/g) to prepare a polycaprolactone at 180° C., in which a proportion occupied by an alcohol terminal and a carboxylic terminal was 69% and 31%, respectively.

A result of a thermal decomposition test of the polycaprolactone obtained was 88% at 180° C. for 6 hours (under a nitrogen stream), 87% at 200° C. for 6 hours (under a nitrogen stream), 60% at 180° C. for 6 hours (in air), and 48% at 200° C. for 6 hours (in air), respectively.

Number average molecular weight was 64,000 in the polymer.

Further, in the hydrolizability test, it was 92% at 40° C. for 360 hours and 91% at 60° C. for 25 hours, respectively.

In a sheet having thickness of 75 μm compression-molded from that, degradation ratio according to the above evaluation method for biodegradability was 72% at a period after 25 days, and tensile strength was 252 kgf/cm$^2$.

Example I-1

189.5 μl (1.2 mmol) of octanol (molecular weight of 130.23) which is an initiator and 3.4 μl (8.4×10$^{-3}$ mmol) of tin octylate which is a catalyst were added to 100 ml (902.4 mmol) of a caprolactone monomer (molecular weight of 114, water content of 50 ppm and an acid value of 0.10 mg-KOH/g) to prepare a polycaprolactone at 180° C. and, in which a proportion occupied by an alcohol terminal and a carboxylic terminal was 48% and 25%, respectively, and the remainder was an alkyl terminal derived from octanol.

Number average molecular weight was 70,400 in the polymer.

A result of a thermal decomposition test of the polycaprolactone obtained was 82% at 180° C. for 6 hours (under a nitrogen stream), 95% at 200° C. for 6 hours (under a nitrogen stream), 95% at 180° C. for 6 hours (in air), and 92% at 200° C. for 6 hours (in air), respectively.

Further, in the hydrolizability test, it was 99% at 40° C. for 360 hours and 98% at 60° C. for 25 hours, respectively.

In a sheet having thickness of 75 μm compression-molded from that, degradation ratio according to the above evaluation method for biodegradability was 59% at a period after 25 days, and tensile strength was 250 kgf/cm$^2$.

Example I-2

284.2 μl (1.8 mmol) of octanol which is an initiator and 3.4 μl (8.4×10$^{-3}$ mmol) of tin octylate which is a catalyst were added to 100 ml (902.4 mmol) of a caprolactone monomer (water content of 50 ppm and an acid value of 0.10 mg-KOH/g) to conduct a polymerization at 180° C., followed by allowing to react with 322.6 μl (2.1 mmol) of hexamethylene diisocyanate which is a modifier to prepare a polycaprolactone and, in which a proportion occupied by an alcohol terminal and a carboxylic terminal was 0% and 27%, respectively, and the remainder was an alkyl terminal derived from octanol.

Number average molecular weight was 67,400 in the polymer.

A result of a thermal decomposition test of the polycaprolactone obtained was 99% at 180° C. for 6 hours (under a nitrogen stream), 99% at 200° C. for 6 hours (under a nitrogen stream), 98% at 180° C. for 6 hours (in air), and 98% at 200° C. for 6 hours (in air), respectively.

Further, in the hydrolizability test, it was 99% at 40° C. for 360 hours and 98% at 60° C. for 25 hours, respectively.

In a sheet having thickness of 75 μm compression-molded from that, degradation ratio according to the above evaluation method for biodegradability was 47% at a period after 25 days, and tensile strength was 260 kgf/cm$^2$.

Example I-3

284.2 μl (1.8 mmol) of octanol which is an initiator and 3.4 μl (8.4×10$^{-3}$ mmol) of tin octylate which is a catalyst were added to 100 ml (902.4 mmol) of a caprolactone monomer (water content of 50 ppm and an acid value of 0.10 mg-KOH/g) to conduct a polymerization at 180° C., followed by allowing to react with 86.2 μl (1.0 mmol) of butylene oxide and 322.6 μl (2.1 mmol) of hexamethylene diisocyanate which are a modifier to prepare a polycaprolactone and, in which a proportion occupied by an alcohol terminal and a carboxylic terminal was 0%, respectively.

Number average molecular weight was 63,800 in the polymer.

A result of a thermal decomposition test of the polycaprolactone obtained was 102% at 180° C. for 6 hours (under a nitrogen stream), 102% at 200° C. for 6 hours (under a nitrogen stream), 100% at 180° C. for 6 hours (in air), and 100% at 200° C. for 6 hours (in air), respectively.

Further, in the hydrolizability test, it was 99% at 40° C. for 360 hours and 98% at 60° C. for 25 hours, respectively.

In a sheet having thickness of 75 μm compression-molded from that, degradation ratio according to the above evaluation method for biodegradability was 38% at a period after 25 days, and tensile strength was 252 kgf/cm².

Example I-4

245.8 mg (1.2 mmol) of aluminum isopropoxide which is an initiator was added to 100 ml (902.4 mmol) of caprolactone monomer (water content of 50 ppm and an acid value of 0.10 mg-KOH/g) to conduct a polymerization at 180° C., followed by allowing to react with 86.2 µl (1.0 mmol) of butylene oxide and 322.6 µl (2.1 mmol) of hexamethylene diisocyanate which are a modifier to prepare a polycaprolactone and, in which a proportion occupied by an alcohol terminal and a carboxylic terminal was 0%, respectively.

Number average molecular weight was 37,100 in the polymer.

A result of a thermal decomposition test of the polycaprolactone obtained was 100% at 180° C. for 6 hours (under a nitrogen stream), 100% at 200° C. for 6 hours (under a nitrogen stream), 99% at 180° C. for 6 hours (in air), and 99% at 200° C. for 6 hours (in air), respectively.

Further, in the hydrolizability test, it was 99% at 40° C. for 360 hours and 98% at 60° C. for 25 hours, respectively.

In a sheet having thickness of 75 µm compression-molded from tat, degradation ratio according to the above evaluation method for biodegradability was 45% at a period after 25 days, and tensile strength was 255 kgf/cm².

Comparative Example I-C 114.2 µl (1.2 mmol) of diethylene glycol which is an initiator and 3.4 µl (8.4×10⁻³ mmol) of tin octylate which is a catalyst were added to 50 ml (451.2 mmol) of a caprolactone monomer (water content of 150 ppm and an acid value of 0.10 mg-KOH/g) and 65.0 g (451.2 mmol) of a lactide monomer (water content of 70 ppm and an acid value of 0.12 mg-KOH/g) to prepare a (caprolactone/lactide) (50/50) block copolymer at 180° C., in which a proportion occupied by an alcohol terminal and a carboxylic terminal was 63% and 37%, respectively. It is to be noted that in the case of a block copolymer, lactide was polymerized after polymerization of caprolactone (hereinafter, in the case of a block copolymer, the same reaction order is applied).

Number average molecular weight was 76,400 in the polymer.

A result of a thermal decomposition test of samples was 50% at 180° C. for 6 hours (under a nitrogen stream), 33% at 200° C. for 6 hours (under a nitrogen stream), 31% at 180° C. for 6 hours (in air), and 25% at 200° C. for 6 hours (in air), respectively.

Further, in the hydrolizability test, it was 55% at 40° C. for 360 hours and 48% at 60° C. for 25 hours, respectively.

In a sheet having thickness of 75 µm compression-molded from that, degradation ratio according to the above evaluation method for biodegradability was 58% at a period after 25 days, and tensile strength was 62 kgf/cm².

Example I-5

189.5 µl (1.2 mmol) of octanol which is an initiator and 3.4 µl (8.4×10⁻³ mmol) of tin octylate which is a catalyst were added to 50 ml (451.2 mmol) of a caprolactone monomer (water content of 50 ppm and an acid value of 0.10 mg-KOH/g) and 65.0 g (451.2 mmol) of a lactide monomer (water content of 70 ppm and an acid value of 0.12 mg-KOH/g) to prepare a (caprolactone/lactide) (50/50) block copolymer at 180° C. and, in which a proportion occupied by an alcohol terminal and a carboxylic terminal was 46% and 29%, respectively.

Number average molecular weight was 82,500 in the polymer.

A result of a thermal decomposition test of the polycaprolactone obtained was 81% at 180° C. for 6 hours (under a nitrogen stream), 77% at 200° C. for 6 hours (under a nitrogen stream), 50% at 180° C. for 6 hours (in air), and 29% at 200° C. for 6 hours (in air), respectively.

Further, in the hydrolizability test, it was 77% at 40° C. for 360 hours and 69% at 60° C. for 25 hours, respectively.

In a sheet having thickness of 75 µm compression-molded from that, degradation ratio according to the above evaluation method for biodegradability was 52% at a period after 25 days, and tensile strength was 63 kgf/cm².

Example I-6

284.2 µl (1.8 mmol) of octanol which is an initiator and 3.4 µl (8.4×10⁻³ mmol) of tin octylate which is a catalyst were added to 50 ml (451.2 mmol) of a caprolactone monomer (water content of 50 ppm and an acid value of 0.10 mg-KOH/g) and 65.0 g (451.2 mmol) of a lactide monomer (water content of 70 ppm and an acid value of 0.12 mg-KOH/g) to conduct a polymerization at 180° C. and, followed by allowing to react with 322.6 µl (2.1 mmol) of hexamethylene diisocyanate which is a modifier to prepare a (caprolactone/lactide) (=50/50) block copolymer and, in which a proportion occupied by an alcohol terminal and a carboxylic terminal was 0% and 27%, respectively.

Number average molecular weight was 84,000 in the polymer.

A result of a thermal decomposition test of the polycaprolactone obtained was 98% at 180° C. for 6 hours (under a nitrogen stream), 97% at 200° C. for 6 hours (under a nitrogen stream), 89% at 180° C. for 6 hours (in air), and 79% at 200° C. for 6 hours (in air), respectively.

Further, in the hydrolizability test, it was 82% at 40° C. for 360 hours and 75% at 60° C. for 25 hours, respectively.

In a sheet having thickness of 75 µm compression-molded from that, degradation ratio according to the above evaluation method for biodegradability was 39% at a period after 25 days, and tensile strength was 62 kgf/cm².

Example I-7

284.2 µl (1.8 mmol) of octanol which is an initiator and 3.4 µl (8.4×10⁻³ mmol) of tin octylate which is a catalyst were added to 50 ml (451.2 mmol) of a caprolactone monomer (water content of 50 ppm and an acid value of 0.10 mg-KOH/g) and 65.0 g (451.2 mmol) of a lactide monomer (water content of 70 ppm and an acid value of 0.12 mg-KOH/g) to conduct a polymerization at 180° C., followed by allowing to react with 86.2 µl (1.0 mmol) of butylene oxide and 322.6 µl (2.1 mmol) of hexamethylene diisocyanate which are a modifier to prepare a (caprolactone/lactide) (=50/50) block copolymer and, in which a proportion occupied by an alcohol terminal and a carboxylic terminal was 0%, respectively.

Number average molecular weight was 84,200 in the polymer.

A result of a thermal decomposition test of the polycaprolactone obtained was 99% at 180° C. for 6 hours (under a nitrogen stream), 99% at 200° C. for 6 hours (under a nitrogen stream), 98% at 180° C. for 6 hours (in air), and 95% at 200° C. for 6 hours (in air), respectively.

Further, in the hydrolizability test, it was 98% at 40° C. for 360 hours and 92% at 60° C. for 25 hours, respectively.

In a sheet having thickness of 75 μm compression-molded from that, degradation ratio according to the above evaluation method for biodegradability was 31% at a period after 25 days, and tensile strength was 65 kgf/cm$^2$.

Comparative Example I-D 67.5 μl (1.2 mmol) of ethylene glycol which is an initiator and 3.4 μl (8.4×10$^{-3}$ mmol) of tin octylate which is a catalyst were added to 40 ml (361.0 mmol) of a caprolactone monomer (water content of 50 ppm and an acid value of 0.10 mg-KOH/g) and 78.0 g (541.4 mmol) of a lactide monomer (water content of 70 ppm and an acid value of 0.12 mg-KOH/g) to prepare a (caprolactone/lactide) (=40/60) random copolymer at 180° C., in which a proportion occupied by an alcohol terminal and a carboxylic terminal was 72% and 28%, respectively.

Number average molecular weight was 87,700 in the polymer.

A result of a thermal decomposition test of samples was 89% at 180° C. for 6 hours (under a nitrogen stream), 85% at 200° C. for 6 hours (under a nitrogen stream), 85% at 180° C. for 6 hours (in air), and 85% at 200° C. for 6 hours (in air), respectively.

Further, in the hydrolizability test, it was 82% at 40° C. for 360 hours and 76% at 60° C. for 25 hours, respectively.

In a sheet having thickness of 75 μm compression-molded from that, degradation ratio according to the above evaluation method for biodegradability was 77% at a period after 25 days, and tensile strength was 71 kgf/cm$^2$.

Example I-8

189.5 μl (1.2 mmol) of octanol which is an initiator and 3.4 μl (8.4×10$^{-3}$ mmol) of tin octylate which is a catalyst were added to 40 ml (361.0 mmol) of a caprolactone monomer (water content of 50 ppm and an acid value of 0.10 mg-KOH/g) and 78.0 g (541.4 mmol) of a lactide monomer (water content of 70 ppm and an acid value of 0.12 mg-KOH/g) to prepare a (caprolactone/lactide) (=40/60) random copolymer at 180° C., in which a proportion occupied by an alcohol terminal and a carboxylic terminal was 49% and 25%, respectively.

Number average molecular weight was 89,100 in the polymer.

A result of a thermal decomposition test of samples was 95% at 180° C. for 6 hours (under a nitrogen stream), 95% at 200° C. for 6 hours (under a nitrogen stream), 91% at 180° C. for 6 hours (in air), and 89% at 200° C. for 6 hours (in air), respectively.

Further, in the hydrolizability test, it was 92% at 40° C. for 360 hours and 87% at 60° C. for 25 hours, respectively.

In a sheet having thickness of 75 μm compression-molded from that, degradation ratio according to the above evaluation method for biodegradability was 71% at a period after 25 days, and tensile strength was 73 kgf/cm$^2$.

Example I-9

284.2 μl (1.8 mmol) of octanol which is an initiator and 3.4 μl (8.4×10$^{-3}$ mmol) of tin octylate which is a catalyst were added to 40 ml (361.0 mmol) of a caprolactone monomer (water content of 50 ppm and an acid value of 0.10 mg-KOH/g) and 78.0 g (541.4 mmol) of lactide monomer (water content of 70 ppm and an acid value of 0.12 mg-KOH/g) to conduct a polymerization, followed by allowing to react with 86.2 μl (1.0 mmol) of butylene oxide and 322.6 μl (2.1 mmol) of hexamethylene diisocyanate which are a modifier to obtain a (caprolactone/lactide) (=40/60) random copolymer at 180° C., in which a proportion occupied by an alcohol terminal and a carboxylic terminal was 0%, respectively.

Number average molecular weight was 89,900 in the polymer.

A result of a thermal decomposition test of samples was 100% at 180° C. for 6 hours (under a nitrogen stream), 98% at 200° C. for 6 hours (under a nitrogen stream), 101% at 180° C. for 6 hours (in air), and 97% at 200° C. for 6 hours (in air), respectively.

Further, in the hydrolizability test, it was 98% at 40° C. for 360 hours and 97% at 60° C. for 25 hours, respectively.

In a sheet having thickness of 75 μm compression-molded from that, degradation ratio according to the above evaluation method for biodegradability was 52% at a period after 25 days, and tensile strength was 73 kgf/cm$^2$.

Example I-10

411.5 μl (1.2 mmol) of titanium butoxide which is an initiator were added to 40 ml (361.0 mmol) of a caprolactone monomer (water content of 50 ppm and an acid value of 0.10 mg-KOH/g) and 78.0 g (541.4 mmol) of lactide monomer (water content of 70 ppm and an acid value of 0.12 mg-KOH/g) to conduct a polymerization at 180° C., followed by allowing to react with 86.2 μl (1.0 mmol) of butylene oxide and 322.6 μl (2.1 mmol) of hexamethylene diisocyanate which are a modifier to obtain a (caprolactone/lactide) (=40/60) random copolymer, in which a proportion occupied by an alcohol terminal and a carboxylic terminal was 0%, respectively.

A result of a thermal decomposition test of samples was 98% at 180° C. for 6 hours (under a nitrogen stream), 98% at 200° C. for 6 hours (under a nitrogen stream), 92% at 180° C. for 6 hours (in air), and 91% at 200°0 C. for 6 hours (in air), respectively.

Number average molecular weight was 35,500 in the polymer.

Further, in the hydrolizability test, it was 94% at 40° C. for 360 hours and 92% at 60° C. for 25 hours, respectively.

In a sheet having thickness of 75 μm compression-molded from that, degradation ratio according to the above evaluation method for biodegradability was 54% at a period after 25 days, and tensile strength was 75 kgf/cm$^2$.

The above results are shown in Table I-1.

TABLE I-1

|  | OH terminal (%) | acid terminal (%) | Molecular weight retention ratio (%) | | Biodegradability (degradation ratio)(%) | Tensile strength (kgf/cm$^2$) |
|---|---|---|---|---|---|---|
|  |  |  | Thermal decomposition[1] | Hydrolysis[2] |  |  |
| Comparative Example I-A | 73 | 27 | 42 | 81 | 71 | 252 |
| Comparative Example I-B | 69 | 31 | 48 | 91 | 72 | 252 |
| Example I-1 | 48 | 25 | 92 | 98 | 59 | 250 |
| Example I-2 | 0 | 27 | 98 | 98 | 47 | 260 |
| Example I-3 | 0 | 0 | 100 | 98 | 38 | 252 |
| Example I-4 | 0 | 0 | 99 | 98 | 45 | 255 |
| Comparative Example I-C | 63 | 37 | 25 | 48 | 58 | 62 |
| Example I-5 | 46 | 29 | 29 | 69 | 52 | 63 |
| Example I-6 | 0 | 27 | 79 | 75 | 35 | 62 |
| Example I-7 | 0 | 0 | 95 | 92 | 31 | 65 |
| Comparative Example I-D | 72 | 28 | 85 | 76 | 77 | 71 |
| Example I-8 | 49 | 25 | 89 | 87 | 71 | 73 |
| Example I-9 | 0 | 0 | 97 | 97 | 52 | 73 |
| Example I-10 | 0 | 0 | 91 | 92 | 54 | 75 |

[1]Results of a thermal decomposition test at 200° C. for 6 hours (in air).
[2]Results of a hydrolysis test at 60° C. and humidity of 80% for 25 hours.

Hereinafter, Examples are illustrated in relation to a particle-state composition for agriculture and gardening of the No. II in the present invention.
(1) Synthesis of an Aliphatic Polyester Resin Employed as a Coating Thin Layer II-A in which Terminals are Controlled or Not Controlled.

The following substances were employed as raw materials for the synthesis.

Caprolactone monomer: molecular weight of 114, water content of 50 ppm (by mass), and an acid value of 0.10 mg-KOH/g.

Lactide monomer: molecular weight of 144, water content of 70 ppm (by mass), and an acid value of 0.12 mg-KOH/g.

Comparative Synthesis Example II-1
(Synthesis of an Aliphatic Polyester Resin II-1 in which Terminals are Not Controlled)

67.5 µl (1.2 mmol) of ethylene glycol which is an initiator and 3.4 µl (8.4×10$^{-3}$ mmol) of tin octylate which is a catalyst were added to 100 ml (902.4 mmol) of a caprolactone monomer to prepare a polycaprolactone at 180° C., in which a proportion occupied by an alcohol terminal and a carboxylic terminal was 69% and 31%, respectively.

Synthesis Example II-1
(Synthesis of an Aliphatic Polyester Resin II-1 in which Terminals are Controlled)

189.5 µl (1.2 mmol) of octanol (molecular weight of 130.23) which is an initiator and 3.4 µl (8.4×10$^{-3}$ mmol) of tin octylate which is a catalyst were added to 100 ml (902.4 mmol) of a caprolactone monomer to synthesize a polycaprolactone at 180° C., in which a proportion occupied by an alcohol terminal and a carboxylic terminal was 48% and 25%, respectively, with respect to total terminals, and the remainder was an alkyl terminal derived from octanol.

Synthesis Example II-2
(Synthesis of an Aliphatic Polyester Resin II-2 in which Terminals are Controlled)

284.2 µl (1.8 mmol) of octanol which is an initiator and 3.4 µl (8.4×10$^{-3}$ mmol) of tin octylate which is a catalyst were added to 100 ml (902.4 mmol) of a caprolactone monomer (water content of 50 ppm and an acid value of 0.10-KOH/g) to polymerize at 180° C., followed by allowing to react with 322.6 µl (2.1 mmol) of hexamethylene diisocyanate which are a modifier to obtain a polycaprolactone and, in which a proportion occupied by an alcohol terminal and a carboxylic terminal was 0% and 27%, respectively.

Synthesis Example II-3
(Synthesis of an Aliphatic Polyester Resin II-3 in which Terminals are Controlled)

284.2 µl (1.8 mmol) of octanol which is an initiator and 3.4 µl (8.4×10$^{-3}$ mmol) of tin octylate which is a catalyst were added to 100 ml (902.4 mmol) of a caprolactone monomer (water content of 50 ppm and an acid value of 0.10-KOH/g) to conduct a polymerization at 180° C., followed by allowing to react with 86.2 µl (1.0 mmol) of butylene oxide which is a modifier to obtain a polycaprolactone and, in which a proportion occupied by an alcohol terminal and a carboxylic terminal was 0%, respectively.

Synthesis Example II-4
(Synthesis of an Aliphatic Polyester Resin II-4 in which terminals are Controlled)

284.2 µl (1.8 mmol) of octanol which is an initiator and 3.4 µl (8.4×10$^{-3}$ mmol) of tin octylate which is a catalyst were added to 100 ml (902.4 mmol) of a caprolactone monomer to conduct a polymerization at 180° C., followed by allowing to react with 86.2 µl (1.0 mmol) of butylene oxide and 322.6 µl (2.1 mmol) of hexamethylene diisocyanate which are a modifier to obtain a polycaprolactone in which a proportion occupied by an alcohol terminal and a carboxylic terminal was 0%, respectively.

Comparative Synthesis Example II-2
(Synthesis of an Aliphatic Polyester Resin II-2 in which Terminals are not Controlled)

114.2 µl (1.2 mmol) of diethylene glycol which is an initiator and 3.4 µl (8.4×10$^{-3}$ mmol) of tin octylate which is a catalyst were added to 50 ml (451.2 mmol) of a caprolactone monomer and 65.0 g (451.2 mmol) of a lactide monomer to synthesize at 180° C. In a block copolymer (polycaprolactone/lactide=50/50) obtained, a proportion occupied by an alcohol terminal and a carboxylic terminal was 63% and 37%, respectively.

Synthesis Example II-5
(Synthesis of an Aliphatic Polyester Resin II-5 in which Terminals are Controlled)

284.2 μl (1.8 mmol) of octanol which is an initiator and 3.4 μl (8.4×10$^{-3}$ mmol) of tin octylate which is a catalyst were added to 50 ml (451.2 mmol) of a caprolactone monomer and 65.0 g (451.2 mmol) of a lactide monomer to synthesize a block copolymer (caprolactone/lactide=50/50) at 180° C. and, in which a proportion occupied by an alcohol terminal and a carboxylic terminal was 46% and 29%, respectively.

Synthesis Example II-6
(Synthesis of an Aliphatic Polyester Resin II-6 in which Terminals are Controlled)

284.2 μl (1.8 mmol) of octanol which is an initiator and 3.4 μl (8.4×10$^{-3}$ mmol) of tin octylate which is a catalyst were added to 50 ml (451.2 mmol) of a caprolactone monomer and 65.0 g (451.2 mmol) of a lactide monomer to conduct a polymerization at 180° C., followed by allowing to react with 322.6 μl (2.1 mmol) of hexamethylene diisocyanate which are a modifier. In a block copolymer (caprolactone/lactide=50/50) obtained, a proportion occupied by an alcohol terminal and a carboxylic terminal was 0% and 27%, respectively.

Synthesis Example II-7
(Synthesis of an Alphatic Polyester Resin II-7 in which Terminals are Controlled)

284.2 μl (1.8 mmol) of octanol which is an initiator and 3.4 μl (8.4×10$^{-3}$ mmol) of tin octylate which is a catalyst were added to 50 ml (451.2 mmol) of a caprolactone monomer and 65.0 g (451.2 mmol) of a lactide monomer to conduct a polymerization at 180° C., followed by allowing to react with 86.2 μl (1.0 mmol) of butylene oxide and 322.6 μl (2.1 mmol) of hexamethylene diisocyanate which are a modifier. In a block copolymer (caprolactone/lactide=50/50) obtained, a proportion occupied by an alcohol terminal and a carboxylic terminal was 0%, respectively.

Comparative Synthesis Example II-3
(Synthesis of an Alphatic Polyester Resin II-3 in which Terminals are not Controlled)

67.5 μl (1.2 mmol) of ethylene glycol which is an initiator and 3.4 μl (8.4×10$^{-3}$ mmol) of tin octylate which is a catalyst were added to 40 ml (361.0 mmol) of a caprolactone monomer and 50 ml, 78.0 g (541.4 mmol) of a lactide monomer to synthesize at 180° C. In a random copolymer (polycaprolactone/lactide=40/60) obtained, a proportion occupied by an alcohol terminal and a carboxylic terminal was 72% and 28%, respectively.

Example II-8
(Synthesis of an Alphatic Polyester Resin II-8 in which Terminals are Controlled)

189.5 μl (1.2 mmol) of octanol which is an initiator and 3.4 μl (8.4×10$^{-3}$ mmol) of tin octylate which is a catalyst were added to 40 ml (361.0 mmol) of a caprolactone monomer and 78.0 g (541.4 mmol) of a lactide monomer to synthesize at 180° C. In a random copolymer (polycaprolactone/lactide=40/60) obtained, a proportion occupied by an alcohol terminal and a carboxylic terminal was 49% and 25%, respectively.

Synthesis Example II-9)
(Synthesis of an Alphatic Polyester Resin II-9 in which Terminals are Controlled)

284.2 μl (1.8 mmol) of octanol which is an initiator and 3.4 μl (8.4×10$^{-3}$ mmol) of tin octylate which is a catalyst were added to 40 ml (451.2 mmol) of caprolactone monomer and 78.0 g (541.4 mmol) of a lactide monomer to conduct a polymerization at 180° C., followed by allowing to react with 86.2 μl (1.0 mmol) of butylene oxide and 322.6 μl (2.1 mmol) of hexamethylene diisocyanate which are a modifier. In a random copolymer (caprolactone/lactide=40/60) obtained, a proportion occupied by an alcohol terminal and a carboxylic terminal was 0%, respectively.

Synthesis Example II-10
(Synthesis of an Alphatic Polyester Resin II-10 in which Terminals are Controlled)

411.5 μl (1.2 mmol) of titanium butoxide which is an initiator was added to 40 ml (451.2 mmol) of a caprolactone monomer and 78.0 g (541.4 mmol) of a lactide monomer to conduct a polymerization at 180° C., followed by allowing to react with 86.2 μl (1.0 mmol) of butylene oxide which is a modifier. In a random copolymer (caprolactone/lactide=40/60) obtained, a proportion occupied by an alcohol terminal and a carboxylic terminal was 0%, respectively.

Figure 7:
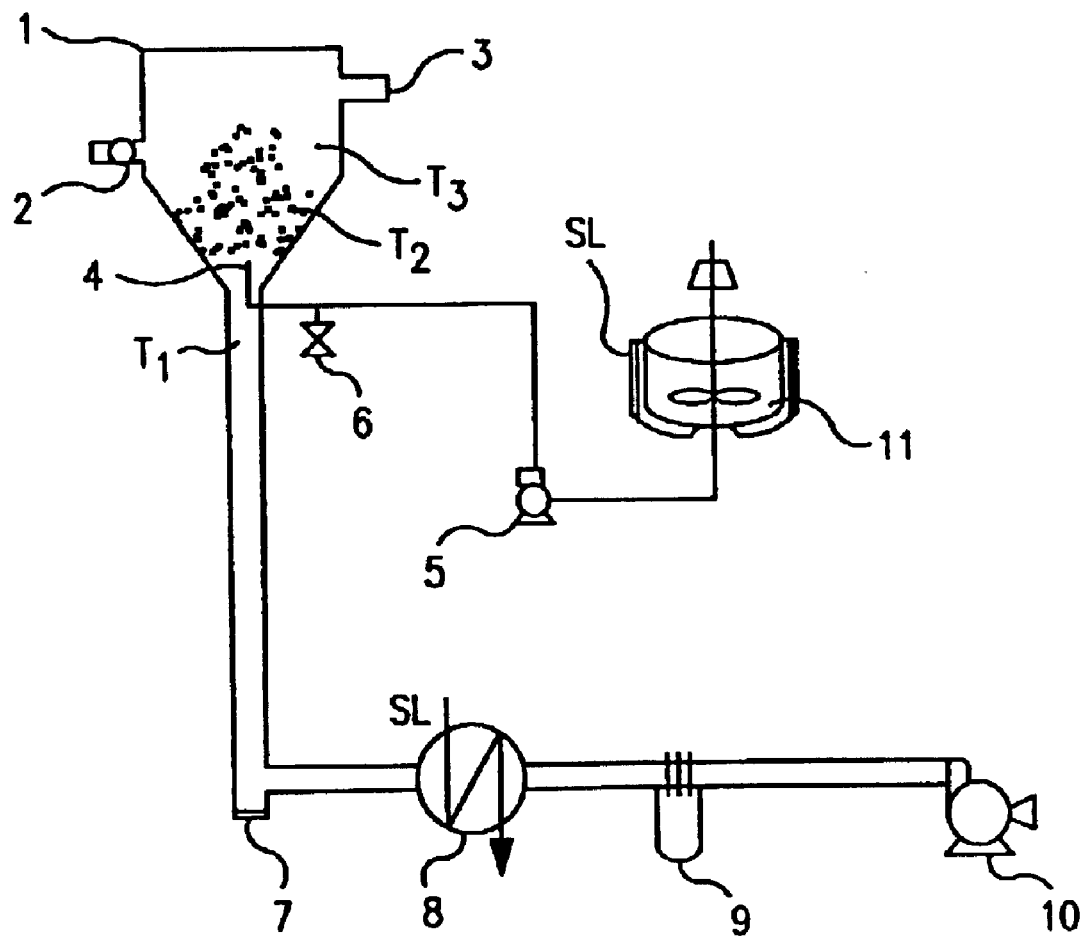
FIG. 7 is an outlined drawing showing one example of an apparatus which is appropriate for the preparation of an article of the No. II of the present invention.

(2) Method for the Preparation of a Particle-state Composition for Agriculture and Gardening, and an Apparatus FIG. 7 shows an apparatus in a preferred embodiment of the present invention. Blowing column 1 has a column diameter of 200 mm, height of 180 mm, diameter of an opening for blowing air of 42 mm, and which has a hole 2 for throwing a fertilizer and a hole 3 for exhausting a waste gas. Air for blowing is blown from a blower 10, and it reaches the blowing column through an orifice flow meter 9 and a heat exchanger 8. Flow volume is controlled at the flow meter 9, temperature is controlled at the heat exchanger 8, and waste gas is exhausted from the hole 3 for exhausting to an outside of the column.

A particle-state fertilizer to be supplied for coating is thrown from the hole 2 for throwing a fertilizer while streaming a fixed heat air to form a blowing stream. Treatment for coating is carried out by spraying the a solution containing a cellulose acetate composition having a low substitution degree through a nozzle 4 for a liquid against the blowing stream after adjusting temperature of particles for coating to a fixed temperature.

Preparation of a solution for coating is carried out while agitating in the vicinity of a boiling point of solvent after supplying a fixed amount of a coating material and solvent into a liquid tank 11. The solution for coating is supplied into the nozzle 4 by a pump 5, and keeping warmth is sufficiently conducted in order to maintain a temperature in a system.

After supplying the fixed solution for coating, the pump 5 is stopped, and then the blower 10 is stopped. Fertilizer coated is taken out of a hole 7 for taking out. 6 is a valve.

In the FIG. 7, $T_1$, $T_2$, and $T_3$ are a thermometer, and SL is steam. It is to be noted that a particle-state fertilizer was coated while maintain the following basic conditions in all Examples and Comparative Examples.

Nozzle for a liquid: opening of 0.8 mm, a Fullcon type
Amount of heated air: 4 m$^3$/min
Temperature of heated air: 100° C.

Kind of fertilizer: Potassium-ammonium phosphate-nitrate having 5–7 meshes
Thrown amount of fertilizer: 5 kg
Concentration of a coating solution: Solid content of 5% by weight
Feed amount of a coating solution: 0.5 kg/minute
Coating period: 10 minutes
Coating ratio (based on fertilizer): 5.5% by weight (containing components of surfactants)
Solvent: Tetrahydrofran (THF)
Coating material II-A: There were employed materials obtained in the above-described Synthesis Examples II-1 to II-10 and Comparative Synthesis Examples II-1 to II-3.
Coating material II-B: Diacetate: manufactured by Daicel Chemical Industries, Ltd. [acetylated degree of 55.0 and Viscosity of 100 cps in 6%-acetone solution]
Coating material II-C: (additives to be added to the Coating material II-A and Coating material II-B): talc
(3) Composition of a Coating Thin Layer and Biodegradability Test
Two sides were cut in relation to every particle of 50 particles of coated samples prepared in the Examples and Comparative Examples, and then those were immersed in water to remove internal fertilizing components. After In the case of employing the coating materials II-A, II-B, II-C, as understood from comparison of the Comparative Example II-1 with Examples II-1, II-3, II-5, and II-7, biodegradation rate was able to be significantly lowered over a wide range in Examples II-1, II-3, II-5, and II-7 compared to Comparative Example II-1.

Also in the case of employing the coating materials II-A and II-C, as understood from comparison of the Comparative Example II-2 with Examples II-4, II-6, and II-8, biodegradation rate was able to be significantly lowered over a wide range in Examples II-2, II-4, II-6, and II-8 compared to Comparative Example II-2.

Further, also in the case of adding II-B and II-C using the random copolymer (caprolactone/lactide=40/60 or 50/50) as the coating material II-A, as understood from comparison of the Comparative Example II-3 with Examples II-9, II-10, and II-11, and from comparison of the Comparative Example II-4 with Examples II-12, II-13, and II-14, biodegradation rate was able to be significantly lowered over a wide range by the present invention.

TABLE II-1

| | Composition of coating layer material | | | | Biodegradation |
| --- | --- | --- | --- | --- | --- |
| | Coating layer material II-A % | Coating layer material II-B % | Coating layer material II-C % | Solvent | ratio after 28 days |
| Comparative Example II-1 | Comparative synthesis Example II-1 30 | Diacetate 20 | Talc 50 | THF | 60 |
| Comparative Example II-2 | Comparative synthesis Example II-1 50 | None 0 | Talc 50 | THF | 80 |
| Example II-1 | Synthesis Example II-1 30 | Diacetate 20 | Talc 50 | THF | 40 |
| Example II-2 | Synthesis Example II-1 50 | None 0 | Talc 50 | THF | 65 |
| Example II-3 | Synthesis Example II-2 30 | Diacetate 20 | Talc 50 | THF | 35 |
| Example II-4 | Synthesis Example II-2 50 | None 0 | Talc 50 | THF | 60 |
| Example II-5 | Synthesis Example II-3 30 | Diasetate 20 | Talc 50 | THF | 30 |
| Example II-6 | Synthesis Example II-3 50 | None 0 | Talc 50 | THF | 50 |
| Example II-7 | Synthesis Example II-4 30 | Diacetate 20 | Talc 50 | THF | 30 |
| Example II-8 | Synthesis Example II-4 50 | None 0 | Talc 50 | THF | 45 |
| Comparative Example II-3 | Comparative synthesis Example II-2 30 | Diacetate 20 | Talc 50 | THF | 50 |
| Example II-9 | Synthesis Example II-5 30 | Diacetate 20 | Talc 50 | THF | 40 |
| Example II-10 | Synthesis Example II-6 30 | Diacetate 20 | Talc 50 | THF | 30 |
| Example II-11 | Synthesis Example II-7 30 | Diacetate 20 | Talc 50 | THF | 20 |
| Comparative Example II-4 | Comparative synthesis Example II-3 30 | Diacetate 20 | Talc 50 | THF | 65 |
| Example II-12 | Synthesis Example II-8 30 | Diacetate 20 | Talc 50 | THF | 50 |
| Example II-13 | Synthesis Example II-9 30 | Diacetate 20 | Talc 50 | THF | 40 |
| Example II-14 | Synthesis Example II-10 30 | Diacetate 20 | Talc 50 | THF | 40 | drying, those were finely crushed, and decomposition ratio was measured according to JIS K6950 (an experimental method for biodegradability under airing by an active sludge). Active sludge employed was an active sludge sent from a municipal drainage in Himeji city.

Examples II-1 to II-14 and Comparative Example II-1 to II-3

Coated phosphorous potassium ammonium nitrate having a variety of composition in a coating layer was prepared by the above-described method for the preparation using coating materials II-A, II-B, and II-C at a proportion shown in Table II-1.

Table II-1 shows results of composition ratio in coating layer and biodegradability in the Examples II-1 to II-14 and Comparative Examples II-1 to II-3.

Hereinafter, there is illustrated Examples in relation to the particle-state fertilizer for agriculture and gardening of the present invention.
(1) Synthesis of a Cyclic Ester-modified Cellulose Ester
A sufficiently-dried reaction vessel equipped with an agitator, a thermometer, and a condenser was charged with 50 parts of ε-caprolactone, 50 parts of a sufficiently-dried cellulose acetate (an acetylated degree of 55.2% and a substitution degree of 2.43 manufactured by Daicel Chemical Industries, Ltd.) at 180° C. while agitating and, after uniformly dissolved, 0.12 part of tin octylate was charged, followed by allowing to react for 3 hours.

Thus, a caprolactone-modified cellulose acetate [I] was obtained which is slightly yellow and transparent. Intrinsic viscosity of $[\eta]=0.75$ liter/g in a graft polymer was measured using acetone at 50° C.

The caprolactone-modified cellulose acetate [I] obtained was employed as the coating material III-A (2) A Method for the Preparation of a Particle-state Fertilizer for Agriculture and Gardening and an Apparatus It was prepared by a method for the preparation in an Example of the No. II of the present invention using an apparatus of the FIG. 7.

Herein, ethyl acetate or 2-butanone was employed as a solvent.

Coating Material III-B

PCL: a polycaprolactone [PCL-H7] manufactured by Daicel Chemical Industries, Ltd.

Diacetate: It was manufactured by Daicel Chemical Industries, Ltd. [acetylated degree of 55.0 and viscosity of 100 cps in 6%-acetone solution].

Coating material III-C (fillers for adding to the coating material III-A and the coating material III-B): talc (3) Composition of a Coating Thin Layer and Biodegradability Test By the above-described method for the preparation, a coated phosphoric potassium ammonium nitrate having a variety of composition shown in Table III-1. After that, two sides were cut in relation to every particle of 50 particles of coated samples prepared in the Examples, and then those were immersed in water to remove internal fertilizing components. After drying, those were finely crushed, and decomposition ratio was measured according to JIS K6950 (a biodegradability experimental method under airing by an active sludge). Active sludge employed was an active sludge sent from a municipal drainage in Himeji city.

Table III-1 shows results of Examples III-1 to III-6.

TABLE III-1

| | Composition of coating layer material | | | | |
|---|---|---|---|---|---|
| | Coating layer material III-A % | Coating layer material III-B % | Coating layer material III-C % | Solvent | Biodegradation ratio after 28 days |
| Example III-1 | [1] 50 | None 0 | Talc 50 | Ethyl acetate | 60 |
| Example III-2 | [1] 50 | None 0 | Talc 50 | 2-butanone | 60 |
| Example III-3 | [1] 30 | PCL 20 | Talc 50 | Ethyl acetate | 80 |
| Example III-4 | [1] 30 | PCL 20 | Talc 50 | 2-butanone | 80 |
| Example III-5 | [1] 30 | Diacetate 20 | Talc 50 | Ethyl acetate | 40 |
| Example III-6 | [1] 30 | Diacetate 20 | Talc 50 | 2-butanone | 40 |

Hereinafter, there are illustrated Examples in relation to a base film for the marking film of the No. IV of the present invention.

Examples IV-1 to IV-4

A reaction vessel equipped with an agitator and a thermometer, a condenser (equipped with a drying tube at a top portion) was charged with an absolutely-dried cellulose acetate (an acetylated degree of 55% and a substitution degree of 2.45 manufactured by Daicel Chemical Industries, Ltd., referred to as CA in Table) and a refined ε-caprolactone, and respective part by mass is shown in Table IV-1 described below, followed by uniformly dissolving the cellulose acetate by agitating while heating at 180° C. and adjusting moisture content in a reaction system to not more than 0.1% by mass.

After confirming a condition of uniformly dissolving, 0.24 part by mass of tin (II) octylate was added dropwise as a catalyst to allow to react for 4 hours, followed by taking out a graft product from the reaction vessel. The product was dried by hot air at 90° C. for 8 hours, followed by melting at 230° C. using an injection machine to prepare test pieces for evaluation of physical properties. Evaluation was conducted by measurements of tensile properties and a bleed out property according to methods described below, and by visual observation of the presence or absence of a migration of components other than the cellulose acetate.

Tables IV-2 (1) and (2) show results of the evaluations.

(1) Presence or absence of a migration of components other than the cellulose acetate: Observation of the presence or absence of adherence of respective components in surface of a molded article.

(2) Bleed out test: There was measured a mass decrease degree in a molded article having a square of 5 cm×5 cm molded by injection according to measurement conditions described below.
   (a) Test by a hot air circulating dryer: 80° C.×1 day or 4 days.
   (b) Tensile test: according to JIS K7113.

Comparative Examples IV-1 to IV-2

Composition containing respective plasticizers was prepared by mixing 100 parts by mass of the absolutely-dried cellulose acetate (an acetylated degree of 55% and a substitution degree of 2.45 manufactured by Daicel Chemical Industries, Ltd., referred to as CA in the Table IV-1) with 40 parts by mass of diethylphthalate (DEP) (Comparative Example IV-1) and 40 parts by mass of Cellgreen™3058 (a three-functional lactone polyol having a molecular weight of 500 manufactured by Daicel Chemical Industries, Ltd.) (Comparative Example IV-2) which are a plasticizer, followed by drying by hot air at 50° C. for 12 hours. After that, the composition was melted at 230° C. using an injection machine to likewise prepare test pieces as in the Examples. Respective evaluations were conducted by measurements of tensile properties and a bleed out property, and by visual observation of the presence or absence of a migration of components such as plasticizers other than cellulose acetate. Table IV-1 shows the composition, and Tables IV-2 (1) and (2) show results of the respective evaluations.

TABLE IV-1

| | Raw materials and feeding ratio (part by mass) | | | Raw materials and feeding ratio (part by mass) | |
|---|---|---|---|---|---|
| Example | Cellulose acetate | ε-caprolactone | Comparative Example | Cellulose acetate | Plasticizer |
| IV-1 | 100 | 50 | IV-1 | 100 | 40 (DEP) |
| IV-2 | 100 | 100 | | | |
| IV-3 | 100 | 150 | IV-2 | 100 | 40 (Lactone polymer) |
| IV-4 | 100 | 200 | | | |

TABLE IV-2 (1)

| Tensile properties | Example | | | | Comparative Example | |
|---|---|---|---|---|---|---|
| | IV-1 | IV-2 | IV-3 | IV-4 | IV-1 | IV-2 |
| Yield strength (kgf/cm$^2$) | 480 | 320 | 120 | 60 | 270 | 310 |
| Yield extension (%) | 6.1 | 4.8 | 7.2 | 7.3 | 5.1 | 5.5 |
| Fracture strength (kgf/cm$^2$) | 500 | 340 | 210 | 120 | 260 | 400 |
| Fracture extension (%) | 28 | 52 | 74 | 120 | 43 | 65 |
| Elasticity (kgf/cm$^2$) | 17500 | 13800 | 4200 | 2200 | 6800 | 11900 |

TABLE IV-2 (2)

| Bleed out properties (heatedair-circulating dryer test) | Example | | | | Comparative Example | |
|---|---|---|---|---|---|---|
| | IV-1 | IV-2 | IV-3 | IV-4 | IV-1 | IV-2 |
| (1 day) | | | | | | |
| Total weight retention ratio (%) | 99.9 | 99.8 | 99.6 | 99.4 | 97.2 | 96.8 |
| Weight retention ratio of plasticizer (%) | 99.7 | 99.6 | 99.3 | 99.1 | 90.2 | 88.7 |
| (4 days) | | | | | | |
| Total weight retention ratio (%) | 99.8 | 99.7 | 99.4 | 99.2 | 97.1 | 96.6 |
| Weight retention ratio of plasticizer (%) | 99.4 | 99.4 | 99.0 | 98.8 | 89.9 | 88.0 |
| Presence or absence of movement of compoments other than cellulose acetate | None | None | None | None | None | None |

Hereinafter, there are specifically illustrated Examples in relation to the heat-sensitive transfer recording material and method for the preparation thereof of the No. V in the present invention.

Evaluation methods are as follows.
(Evaluation of Concentration in a Printing Picture Image):

A picture image recording material (a picture image recording sheet) was printed using a sublimatable type digital color printer DPP-M1 (manufactured by Sony Ltd.) to measure a coloring concentration with a reflection type Macbeth densitometer RD-1255 (manufactured by Sakata Inks, Ltd.). It is to be noted that an exclusive printer pack VPM-P50STA for DPP-M1 was employed as an ink ribbon. Printing conditions were fitted to a standard setting up for a printer driver (manufactured by Sony Ltd.) for a Mackintosh (manufactured by Apple Ltd.).
(Evaluation of Strippability):

There was visually observed the presence or absence of occurrence of an abnormal transfer by thermal fusion when an ink ribbon is stripped from a picture image recording sheet in printing.

Example V-1
(Polymerization of a Graft Polymer)

A sufficiently-dried reaction vessel equipped with an agitator and a thermometer, a condenser was charged with 50 parts of ε-caprolactone and 100 parts of a sufficiently-dried cellulose acetate (an acetylated degree of 55.2% and a substitution degree of 2.43 manufactured by Daicel Chemical Industries, Ltd.) at 180° C. while agitating and, after uniformly dissolved, 0.12 part of tin octylate was charged, followed by allowing to react for 3 hours.

Thus, a graft polymer was obtained which is slightly yellow and transparent. Intrinsic viscosity of [η]=0.75 dl/g in the graft polymer was measured using acetone at 50° C.
(Preparation of a Sublimatable Transfer Picture Image Recording Sheet)

20 parts of the graft polymer was dissolved in 80 parts of acetone to prepare a solution, and the solution was coated on a polypropylene-based synthetic paper (Yupo FPG-150 manufactured by Ohji Yuka Goseishi, Ltd.) having thickness of 150 μm using a wire bar so that a dried coating layer is obtained which has thickness of 10 μm, followed by drying at 110° C. for 10 minutes to obtain a heat-sensitive transfer image recording material having a dye-receiving layer.

As results in evaluation of a print recording image concentration, there was obtained a high coloring concentration of 5.5 (total sum of a maximum value of reflection concentration in respective colors including cyan, magenta, yellow, and black).

Further, a high strippability was visually observed without causing an abnormal transfer by thermal fusion.

Example V-2

The same polymerization was conducted as in the Example V-1 by changing a feeding amount of ε-caprolactone to 70 parts.

Intrinsic viscosity of [η]=0.52 dl/g in a graft polymer obtained was measured using acetone at 50° C. A picture image recording sheet was prepared by the same method as in the Example V-1 using graft polymer obtained. As results of the same test as in the Example V-1, there was obtained a high coloring concentration of 5.5. Further, a high strippability was visually observed without causing an abnormal transfer by thermal fusion.

Hereinafter, Examples are specifically illustrated in relation to a heat-sensitive transfer image recording material of the No. VI in the present invention.
(1) Sticking Resistance It was evaluated using a sublimating-type printer or a line-type printer shown hereinafter.
(A-1): A melting type printer: Printing was conducted at a speed of 2"/sec in a printing energy of 25 mJ/mm$^2$ using TECB-30 (manufactured by Tokyo Denki, Ltd.). (A-2): A melting type printer: Printing was conducted at a speed of 7"/sec in a printing energy of 23 mJ/mm$^2$ using SWEDOT 196 (manufactured by UBI, Ltd.). (B): A sublimating type printer: Transfer printing was conducted at an applied voltage of 14V using a Sharp Color video printer GZ-P11. ⊚: Sticking is not completely observed, and transport can be stably conducted. ∞: Sticking is not almost caused. Δ: Sticking is slightly caused. ×: Sticking is remarkable, and transport can not be conducted at all.
(2) Blocking Resistance
1) After laminating an ink layer with a heat-resistible protecting layer, it was placed at 40° C. for 72 hours under compression of 392.3 kPa (4.0 kgf/cm$^2$), and there was observed an extent of transfer of an ink layer to the heat-resistible protecting layer when being stripped.
2) After laminating an ink layer with a heat-resistible protecting layer, it was placed at 50° C. for 72 hours under compression of 392.3 kPa (4.0 kgf/cm$^2$), and there was observed an extent of transfer of an ink layer to the heat-resistible protecting layer when being stripped. ○: Transfer by blocking is not observed at all. Δ: Transfer by blocking is slightly observed. ×: Transfer is distinctly observed.

(3) Migrating Property of a Heat-resistible Protecting Layer to an Ink Layer

After laminating an ink layer with a heat-resistible protecting layer, it was placed at room temperatures for 72 hours under compression of 392.3 kPa (4.0 kgf/cm$^2$), and evaluation was conducted using a sublimating-type printer or a line-type printer shown hereinafter. (A): A melting type printer: Printing was conducted at a standard transfer energy (approximately 17 mJ/mm$^2$) in Intermec 8646, followed by comparing to a picture image obtained as in the above without bringing into contact with the heat-resistible protecting layer. (B): A sublimating type printer: Transfer print was conducted at an applied voltage of 12V using a Sharp Color video printer GZ-P11, followed by comparing to a picture image obtained as in the above without bringing into contact with the heat-resistible protecting layer. ○: Quite same image is obtained. Δ: There were slightly observed lack of an image and unevenness of transfer. ×: Lack of an image and unevenness of transfer are remarkable.

(3) Staining Property of a Thermal Head

Using a printer shown below, transfer of 500 m was continuously conducted, and staining in a thermal head was observed. Further, a quality of initial printing was compared to a quality of final printing. (A-1): A melting type printer: Printing was conducted at a speed of 4"/sec in a printing energy of 20 MJ/mm$^2$ using TECB-30 (manufactured by Tokyo Denki, Ltd.). (A-2): A melting type printer: Printing was conducted at a speed of 7"/sec in a printing energy of 22 mJ/mm$^2$ using SWEDOT 196 (manufactured by UBI, Ltd.). (B): A sublimating type printer: Transfer print was conducted at an applied voltage of 12V using a Sharp Color video printer GZ-P11. ∞: Staining is not completely observed in a thermal head. Δ: Sticking is slightly caused, and quality of printing slightly lowers. ×: Staining is remarkable, and quality of printing remarkably lowers.

(3) Heat Sensitivity

It was confirmed by capability of obtaining a picture image without sticking using a high speed printer (A-2) in the sticking resistance test.

Preparation Example VI-1

A sufficiently-dried reaction vessel equipped with an agitator and a thermometer, a condenser was charged with 50 parts of ε-caprolactone and 100 parts of a sufficiently-dried cellulose acetate (an acetylated degree of 55.2% and a substitution degree of 2.43 manufactured by Daicel Chemical Industries, Ltd.) at 180° C. while agitating under an atmosphere of dried nitrogen and, after uniformly dissolved, 0.12 part of tin octylate was charged, followed by allowing to react for 3 hours. Thus, a graft polymer was obtained which is slightly yellow and transparent.

Intrinsic viscosity of $[\eta]=0.75$ dl/g in a graft polymer was measured using acetone at 50° C. This is designated as Resin A.

Preparation Example VI-2

A sufficiently-dried reaction vessel equipped with an agitator and a thermometer, a condenser was charged with 70 parts of ε-caprolactone, 100 parts of a sufficiently-dried cellulose acetate (an acetylated degree of 55.2% and a substitution degree of 2.43 manufactured by Daicel Chemical Industries, Ltd.) at 180° C. while agitating under an atmosphere of dried nitrogen and, after uniformly dissolved, 0.12 part of tin octylate was charged, followed by allowing to react for 3 hours. Thus, a graft polymer was obtained which is slightly yellow and transparent. Intrinsic viscosity of $[\eta]=0.50$ dl/g in a graft polymer was measured using acetone at 50° C. This is designated as Resin B.

Example VI-1

Methyl ethyl ketone/cyclohexanone (9/1) solution containing 4% of the Resin A obtained in the Preparation Example VI-1 was coated on lower surface of a polyethylene terephthalate (PET) film having thickness of approximately 4.5 μm with a wire-bar, and dried at 90° C. for 30 seconds to form a heat-resistible protecting layer having thickness of approximately 0.5 μm. Further, a dispersion liquid of a melting-type heat-transfer ink (a) described below was coated on upper surface of the film, and dried to prepare an ink layer having a coating amount of approximately 2.8 g/cm$^2$ and obtain a heat-transfer recording medium.

Melting-type Heat-transfer Ink (a)

| | |
|---|---|
| carnauba wax | 6 parts |
| paraffin wax | 8 parts |
| carbon black | 4 parts |
| toluene | 82 parts |

Example VI-2

Methyl ethyl ketone/cyclohexanone (9/1) solution containing 5% of the Resin B obtained in the Preparation Example VI-2 was coated on lower surface of a PET film having thickness of approximately 4.5 μm with a wire-bar, and dried at 90° C. for 30 seconds to form a heat-resistible protecting layer having thickness of approximately 0.5 μm. Further, an ink layer was likewise formed as in the Example VI-1 on upper surface of the film to obtain a heat-transfer recording medium.

Example VI-3

Methyl ethyl ketone/cyclohexanone (9/1) solution containing 5% of the Resin A obtained in the Preparation Example VI-1 was coated on lower surface of a PET film having thickness of approximately 4.5 μm with a wire-bar, and dried at 90° C. for 30 seconds to form a heat-resistible protecting layer having thickness of approximately 0.5 μm. Further, a dispersion liquid of a sublimating-type heat-transfer ink (b) described below was coated on upper surface of the film, and dried to prepare an ink layer having a coating amount of approximately 0.8 g/cm$^2$ and obtain a heat-transfer recording medium.

Sublimating-type Heat-transfer Ink (b)

| | |
|---|---|
| MS Red G | 6 parts |
| polyvinyl butylal | 8 parts |
| 1,4-dioxane | 55 parts |
| toluene | 17 parts |
| methylethyl ketone | 17 parts |

Example VI-4

Methyl ethyl ketone/cyclohexanone (9/1) solution containing 7% of the Resin B obtained in the Preparation Example VI-2 was coated on lower surface of a PET film having thickness of approximately 6.0 μm with a wire-bar, and dried at 90° C. for 30 seconds to form a heat-resistible protecting layer having thickness of approximately 0.6 μm. Further, an ink layer was likewise formed as in the Example VI-1 on upper surface of the film to obtain a heat-transfer recording medium.

Printing was conducted in relation to the heat-transfer recording mediums obtained in the respective Examples, and there were compared a sticking property, a blocking property, a migrating property of the heat-resistible protecting layer to the ink layer, staining resistance and heat sensitivity of a thermal head. Results are shown in Table VI-1.

TABLE VI-1

|  |  | Example |  |  |  |
|---|---|---|---|---|---|
|  |  | VI-1 | VI-2 | VI-3 | VI-4 |
| Sticking resistance | A-1 | ⊚ | ⊚ | — | — |
|  | A-2 | ⊚ | ⊚ | — | — |
|  | B | — | — | ⊚ | ⊚ |
| Blocking resistance | 1 | ○ | ○ | ○ | ○ |
|  | 2 | ○ | ○ | ○ | ○ |
| Movement onto ink layer | A | ○ | ○ | — | — |
|  | B | — | — | ○ | ○ |
| Staining property of a thermal head | A-1 | ○ | ○ | — | — |
|  | A-2 | ○ | ○ | — | — |
|  | B | — | — | ○ | ○ |

From the results in the Table VI-1, it is understood that the heat-transfer recording medium of the present invention is excellent in a sticking property and it is excellent in a blocking property, a migrating property of the heat-resistible protecting layer to the ink layer, and a staining resistance of a thermal head.

Hereinafter, the conductive coating composition of the No. VII in the present invention is more specifically illustrated by Synthetic Examples, Examples, and Comparative Examples.

Synthetic Examples VII-1 and VII-2

(Synthesis of a Cellulose Ester Derivative)

A reaction vessel equipped with an agitator and a thermometer, a condenser (equipped with a drying tube at a top portion) was charged with an absolutely-dried cellulose acetate (an acetylated degree of 55% and a substitution degree of 2.45 manufactured by Daicel Chemical Industries, Ltd., and it is described as CA in the Table VII-1) and a refined ε-caprolactone in a mass ratio shown in the Table VII-1, whereby, moisture content in a reaction system is controlled to not more than 0.1%, followed by heating at 180° C. while agitating to uniformly dissolve the cellulose acetate. After confirming dissolving, 0.24 part of tin octylate (II valent) was charged, followed by allowing to react for 4 hours and take out a graft product from the reaction vessel.

TABLE VII-1

| Synthesis Example | Feed (part) |  | Mass average molecular weight |
|---|---|---|---|
|  | Cellulose acetate | ε-caprolactone |  |
| VII-1 | 100 | 50 | 150,000 |
| VII-2 | 100 | 100 | 180,000 |

Examples VII-1 to VII-3 and Comparative Examples VII-1 to VII-5

(Synthesis Examples of Coatings A to H)

The coatings A to H were prepared by formulation shown in Table VII-2.

TABLE VII-2

|  |  | Example |  |  | Comparative Example |  |  |  |  |
|---|---|---|---|---|---|---|---|---|---|
| Coating |  | VII-1 A | VII-2 B | VII-3 C | VII-1 D | VII-2 E | VII-3 F | VII-4 G | VII-5 H |
| Resin | 20% sparklon S-822 | 360 |  |  | 400 | 335 | 310 |  | 450 |
|  | 70% oil-free polyester Uban 222 |  | 77 | 77 |  |  |  | 85 |  |
|  |  |  | 35 | 35 |  |  |  | 42.5 |  |
|  | Synthesis Example VII-1 | 8 |  |  | 8 | 6 |  |  | 10 |
|  | Synthesis Example VII-2 |  | 5 | 5 |  |  |  | 5 |  |
| Conductive pigment | Denka HS-100 | 10 |  |  | 10 | 25 | 30 |  |  |
|  | Vulcan XC-72 |  | 10 | 10 |  |  |  |  |  |
|  | Graphite powder POG-2 | 10 | 8 |  | 10 |  |  | 15 |  |
|  | Graphite powder SP-10 |  |  | 8 |  |  |  |  |  |
|  | Zinc oxide |  |  |  |  |  |  |  | 150 |
|  | JR-600A |  | 10 | 10 |  |  |  | 10 |  |
| Solvent | Toluene |  | 100 | 100 |  |  |  | 100 |  |
|  | Ethyl acetate | 40 | 50 | 50 | 40 | 40 | 40 | 40 |  |
|  | Total | 428 | 295 | 295 | 460 | 408 | 386 | 297.5 | 610 |

Values in the Table are represented by part by mass.

Sparklon S-822: a trade name of a chlorinated polyolefin manufactured by Nippon Seishi, Ltd., a toluene solution having a solid content of 20%.

an electrostatic coating machine (Turbo G minibel), followed by drying at 120° C. for 30 minutes to supply to tests.

Results of evaluation tests are shown in Table VII-3.

TABLE VII-3

| | | | | | Product by the present invention | | | | Product corresponding to Comparative Examples | | | | | |
|---|---|---|---|---|---|---|---|---|---|---|---|---|---|---|
| Kind of coating | | | | | A | B | B | C | D | E | E | F | G | H |
| Storage stability of coating (1) | | | | | ○ | ○ | ○ | ○ | ○ | Δ | Δ | Δ | ○ | X |
| Resistivity of coating layer (Ω/cm) (2) | Material | | | | a | b | b | b | a | a | a | a | b | a |
| | Drying conditions | 20° C. 80% RH | 3 minutes | | $2 \times 10^8$ | | | | $2 \times 10^9$ | | | $1.5 \times 10^8$ | | |
| | | | 6 minutes | | | $3 \times 10^6$ | | | | | $3 \times 10^7$ | | $1.5 \times 10^8$ | $2 \times 10^8$ |
| | | 120° C. | 10 minutes | | | | | $7 \times 10^4$ | $5.5 \times 10^4$ | | $2.5 \times 10^6$ | | | |
| Coated ratio of a finishing coating (%) (3) | | | | | 98 | 98 | 100 | 100 | 32 | 73 | 86 | 99 | 100 | 40 |
| General coating properties | Finishing property | Visual outer appearance (4) | | | ○ | ○ | ○ | ○ | X | Δ | Δ | ○ | ○ | X |
| | | 60° mirror reflection ratio (%) | | | 93 | 94 | 93 | 93 | 76 | 89 | 91 | 93 | 92 | 80 |
| | | Brightness (5) | | | 82 | 78 | 84 | 86 | 14 | 36 | 65 | 78 | 81 | 25 |
| | property of coating | Adhesion (6) | | | ○ | ○ | ○ | ○ | ○ | ○ | ○ | ○ | x | ○ |
| | | Bending resistance (7) | | | ○ | ○ | ○ | ○ | ○ | X | X | X | ○ | X |
| | | Chipping resistance (8) | | | ○ | ○ | ○ | ○ | ○ | ○ | ○ | ○ | X | Δ |
| | | Moisture resistance (9) | | | ○ | ○ | ○ | ○ | ○ | ○ | ○ | ○ | ○ | Δ |

Tests methods for evaluation and results in Table VII-3 are shown as follows.

Oil-free polyester: isophthalic acid/tetrahydrophthalic acid/trimeyhlolpropane/neopentyl glycol, a xylene solution having a solid content of 70% (OH value of 50 mg KOH/g of a resin, an acid value of 9 mg KOH/g of a resin).

Uban 222: a trade name of a urea melamine resin manufactured by Mitsui Kagaku, Ltd., a n-butanol solution having a solid content of 60%.

Denka HS-100: a trade name of a conductive carbon black (DBP absorption amount of 115 ml/100 g, electric resistivity of 0.24 Ω·cm) manufactured by Denki Kagaku Kogyo, Ltd.

Vulcan XC-72: a trade name of a conductive carbon black (DBP absorption amount of 175 ml/100 g, electric resistivity of not more than 0.1 Ω·cm) manufactured by Cabot. Corp. Ltd.

Scaly graphite (graphite powder) POG-2: a trade name of an artificial graphite (an average particle diameter of 2 μm) manufactured by Kyowa Carbon. Ltd.

Scaly graphite (graphite powder) SP-5: a trade name of a graphite (an average particle diameter of 45 μm) manufactured by Nihon Kokuen Kogyo. Ltd.

JP-600A: a trade name of a titanium white manufactured by Teikoku Kako. Ltd.

(Preparation of a Test Plate)

Material "a" (a polypropylene plate manufactured by Mitsubishi Yuka, Ltd.) and Material "b" (a RIM-polyurethane plate manufactured by Nihon Test Panel, Ltd.) which are adjusted to the size of 70×150×3 mm were exposed in trichloroethane vapor for 1 minute to remove grease. Subsequently, the above-described coatings A–H were coated on the plates by spray coating so that the thickness of a dried coating layer is adjusted to 20 μm, followed by drying by conditions as shown in Table VII-3. Subsequently, a finishing coating (Soflex #1200 white: an amino polyester-based resin coating manufactured by Kansai Paint, Ltd.) was coated at coating conditions of a rotation speed of 15000 rpm and a shaving pressure of 1 kg/cm², applied voltage of 90 kV, a distance of 30 cm between an article to be coated and a top of a spray gun, a discharging amount of 200 ml/min, a conveyer speed of 3 m/min using (1) Storage stability of coatings: Coatings were charged into a polyethylene-made closed vessel and placed at 40° C. for 1 month, followed by confirming the presence or the absence of abnormality such as a deposition state of pigments and a viscosity change to evaluate by a level of ○ to ×.

○: none of abnormality, Δ: pigments deposited, and ×: pigments remarkably deposited and viscosity remarkably increased.

(2) Resistivity of a coating layer: Layers having resistivity of coating layer of less than $1 \times 10^8$ Ω/cm were measured using a Rolestar MCP-tester (manufactured by Mitsubishi Yuka, Ltd.). Layers having resistivity of coating layer of not less than $1 \times 10^8$ Ω/cm were measured using an electric cell-style ohm-meter Hioki 3110 (manufactured by Hioki Denki, Ltd.).

(3) Coated ratio: A tin plate having the same size as in the material "a" and the material "b" was employed in the preparation of test plates, and a finishing coating was conducted on the tin plate and dried together with plates in which the material "a" and the material "b" are coated using the coatings A–H by the same method as in the preparation of the above-described test pieces. Coated ratio was calculated by the equation described below. (the weight of the finishing coating adhered to the material "a" and the material "b"/the weight of the finishing coating adhered to the tin plate)×100

(4) Visual outer appearance: The presence or the absence of glossiness, smoothness, and abnormality in the coating layer was judged by a level of ○ to × under conditions of not more than 500 lux by a color matching fluorescent lamp at an inside of a room.

○: none of abnormality, Δ: slightly poor, ×: poor (5) Brightness: It was measured using Image Clarity Meter (HA-ICH manufactured by Suga Shikenki, Ltd.)

(6) Adhesion: It was evaluated by a crosshatched test by a level of ○ and × using a cellophane tape according to JIS K5400.

○: none of peeling, ×: peeled at all surface
(7) Bending resistance: Test plate was cut into a size of 20×150 mm, and bent at 180° by winding around a column (made by a steel) having diameter of 25.4 mm by facing coating surface to outside under an atmosphere of −20° C. and, an extent of peeling and crack in the coating layer was evaluated by a level of ○ to ×.
○: nothing of abnormality, Δ: slightly cracked, ×: cracked and peeled
(8) Chipping resistance:
(i) Tester: Q-G-R gravelometer (manufactured by Q Panel, Co.)
(ii) Stones sprayed: crushed stone having diameter of approximately 15–20 mm
(iii) amount of stones sprayed: approximately 500 ml
(iv) air pressure in spraying: approximately 4 kg/cm$^2$
(v) temperature in test: approximately −20° C.

Test piece was clamped at a stand for test pieces, and approximately 500 ml of crushed stones were sprayed toward test pieces by air pressure of approximately 4 kg/cm$^2$, and conditions of the coating surface were evaluated according to the following standards.
○: an extent that scratches by impulse are slightly observed at a portion of a finishing coating layer.
Δ: an extent that scratches by impulse are observed, and peeling of the coating layer reaches an under-coating layer.
×: an extent that damages by impulse are remarkable, and peeling area of the coating layer occupies not less than 10% of test area.
(9) Moisture resistance: Test piece was placed at an atmosphere of 50° C. and not less than 98% RH for 10 days, followed by conducting a crosshatched test.

Hereinafter, the graft copolymer of the No. VIII in the present invention and the coating composition containing thereof are more specifically illustrated by Examples. Part is represented by part by mass.

Synthetic Examples VIII-1 and VIII-2
Synthesis of a Cellulose Ester Derivative

The cellulose ester derivatives obtained in the Synthetic Examples VII-1 and VII-2 were employed.
Preparation of the Graft Copolymer (I)

Examples VIII-1

A reaction vessel equipped with an agitator, a thermometer, a condenser, and a dropping funnel was charged with 104 parts of butyl acetate and 10 parts of the cellulose ester derivative obtained in the Synthetic Examples VII-1, followed by elevating temperature to 100° C. by heating in a nitrogen stream. After confirmation of completely dissolving of the cellulose ester derivative, moisture in the cellulose ester derivative was completely removed through a water separator by heating while refluxing.

Subsequently, at the same temperature, there were added dropwise over 3 hours a mixed solution of polymerizable unsaturated monomers which include 9 parts of styrene, 22.5 parts of methylmethacrylate, 9 parts of 2-ethylhexyl acrylate, 13.5 parts of n-butylacrylate, 22.5 parts of i-butylmethacrylate, and 13.5 parts of isocyanateethyl methacrylate, and 3 parts of t-butylperoxy benzoate which is a polymerization initiator. Further, aging was continued at the same temperature for 2 hours to obtain a graft copolymer solution (I-1) having approximately 50% of nonvolatile components. There are shown properties of the graft copolymer solution obtained and the graft copolymer in Table VIII-1.

Examples VIII-2 to VIII-4 and Comparative Examples VIII-1 and VIII-2

The same procedures were followed as in the Examples VIII-1 except that the mixed solution composed of the cellulose ester derivatives obtained in the Synthetic Examples VII-1 and VII-2, the polymerizable unsaturated monomers, and the polymerization initiator was changed to a mixed solution shown in Table VIII-1 to obtain a graft copolymer solutions (I-2) to (I-6). There are shown properties of the graft copolymer solution obtained and graft copolymer in Table VIII-1.

TABLE VIII-1

| Feeding ratio and Physical properties of Graft copolymer (I) | | Example | | | | Comparative Example | |
|---|---|---|---|---|---|---|---|
| | | VIII-1 | VIII-2 | VIII-3 | VIII-4 | VIII-1 | VIII-2 |
| Solution of Graft copolymer (I) | | I-1 | I-2 | I-3 | I-4 | I-5 | I-6 |
| Solvent, butyl acetate | | 104 | 104 | 100 | 104 | 100 | 100 |
| Derivative of a fatty acid cellulose ester (a) | Synthesis Example VIII-1 | 10 | | | 30 | | |
| | Synthesis Example VIII-2 | | 10 | 10 | | 20 | |
| Polymerizable unsaturated monomer (b) Styrene | | | | | | | |
| Methyl methacrylate | | 9 | 9 | 9 | | 8 | 10 |
| 2-ethylhexyl acrylate | | 22.5 | 27 | 19.8 | 7 | 20 | 25 |
| n-butylacrylate | | 9 | | | | 8 | |
| Methylacrylate | | 13.5 | 9 | 13.5 | 7 | | 25 |
| i-butylmethacrylate | | | 18 | 27 | | 24 | |
| n-butylmethacrylate | | 22.5 | | 18 | | | 25 |
| Isocyanateethyl methacrylate | | 13.5 | 27 | 2.7 | 58 | 20 | 15 |
| Polymerization initiator | | | | | | | |
| t-butylperoxy benzoate | | 3 | 3 | 1.5 | 3 | | 2.5 |
| Benzoil peroxide | | | | | | 2 | |
| Unvolatile components (%) | | 50 | 50 | 50 | 50 | 50 | 50 |
| Viscosity (Gardner, 25° C.) | | ST | V | VX | TU | VW | Q |

TABLE VIII-1-continued

| Feeding ratio and Physical properties of Graft copolymer (I) | Example | | | | Comparative Example | |
|---|---|---|---|---|---|---|
| | VIII-1 | VIII-2 | VIII-3 | VIII-4 | VIII-1 | VIII-2 |
| Mass average molecular weight | 25000 | 33000 | 53000 | 26000 | 30000 | 23000 |
| Glass transition temperature (° C.) | 36 | 53 | 32 | 58 | 42 | 31 |
| NCO group content (%) | 3.7 | 7.3 | 0.7 | 15.2 | — | 4.1 |
| (a)/(b) chain (mass ratio) | 10/90 | 10/90 | 10/90 | 30/70 | 20/80 | 0/100 |

Preparation of the Graft Copolymer (IV)

A reaction vessel equipped with an agitator, a thermometer, a condenser, and a dropping funnel was charged with 67 parts of xylene, followed by elevating temperature to 120° C. by heating while agitating, and there were added dropwise over 3 hours a mixed solution of polymerizable unsaturated monomers which include 15 parts of "AA-6" (a methacryloyl-based macromonomer having methylmethacrylate as a segment manufactured by Toa Gosei Kagaku, Ltd.), 10 parts of styrene, 20 parts of methylmethacrylate, 30 parts of n-butylmethacrylate, and 15 parts of isobutyl methacrylate, 10 parts of n-butylacrylate which are other polymerizable unsaturated monomers, and 3 parts of t-butylperoxy-2-ethylhexanoate which is a polymerization initiator. Further, aging was continued at the same temperature for 2 hours, followed by adding 15 parts of xylene to dilute and obtain a graft copolymer (IV) solution having 55% of nonvolatile components.

Preparation of Non-aqueous Dispersed Resin (V)

A reaction vessel equipped with an agitator, a thermometer, a condenser, and a dropping funnel was charged with 70 parts of xylene, followed by elevating temperature to 100° C. by heating while agitating, and there were added dropwise over 3 hours a mixed solution of 10 parts of styrene, 25 parts of n-butylacrylate, 35 parts of isobutyl methacrylate, 15 parts of t-butyl methacrylate, and 15 parts of 2-ethylhexylmethacrylate, and 1.0 part of 2,2'-azobisisobutyronitrile and, aging was further continued at the same temperature for 2 hours, followed by adding 30 parts of xylene to dilute and obtain a polymer solution having 50% of nonvolatile components and viscosity of V which is a stabilizer for dispersion.

Mass average molecular weight of the polymer was 45,000 and a glass transition temperature was 45° C.

133 parts of the obtained polymer solution which is a stabilizer for dispersion and 85 parts of heptane were fed in a reaction vessel and refluxed while heating, and there were added dropwise over 3 hours a mixed solution of 5 parts of styrene, 23 parts of methylmethacrylate, 6 parts of acrylonitrile, and 66 parts of methylacrylate, and 1.5 part of 2,2'-azobisisobutyronitrile and, aging was further continued for 2 hours to obtain a polymer emulsion having 52% of nonvolatile components and viscosity of EF which is a stabilizer for dispersion, and particle diameter of 0.3 μm in polymer particles, which is an opalescent and stable polymer dispersion.

Preparation of a Single-liquid Type Clear Coating

Examples VIII-5 to VIII-14 and Comparative Examples VIII-3 to VIII-5

Single-liquid type clear coatings were prepared by mixing and agitating thus-obtained graft copolymer solutions (I-1) to (I-6), the polyisocyanate compounds, the cellulose ester derivatives, modified vinyl copolymers, the graft copolymer (IV), and the non-aqueous dispersed resin (V) according to formulation shown in Table VIII-3.

Subsequently, viscosity of the respective clear coatings was adjusted to 13–14 seconds (Ford cup, #4/25° C.) by a thinner having the formulation ratio of toluene/xylene/ethyl acetate/butyl acetate=50/20/10/20 by mass, followed by spray-coating onto a processed plate on which there are coated in order a commercially-supplied lacquer primer, a lacquer primer surfacer, and a metallic base coating at room temperature (20° C.), so that a coating layer having the thickness of 40 μm is formed after dried. Table VIII-2 collectively shows results of performance tests by the coatings.

TABLE VIII-2

| Composition of a clear coating and performance test | Example | | | | | | | | | | Comparative Example | | |
|---|---|---|---|---|---|---|---|---|---|---|---|---|---|
| | VIII-5 | VIII-6 | VIII-7 | VIII-8 | VIII-9 | VIII-10 | VIII-11 | VIII-12 | VIII-13 | VIII-14 | VIII-3 | VIII-4 | VIII-5 |
| Solution of a graft copolymer (I) | | | | | | | | | | | | | |
| I-1 | 100 | | | | 90 | | 90 | 90 | | | | | |
| I-2 | | 100 | | | | | | | | | | | |
| I-3 | | | 100 | | | 90 | | | 90 | 100 | | | |
| I-4 | | | | 100 | | | | | | | | | |
| I-5 | | | | | 10 | | | | | | 100 | | |
| I-6 | | | | | | 10 | | | | | | 100 | 10 |
| Solution of a graft copolymer (IV) | | | | | | | 10 | | | | | | 90 |
| Nonaqueous resin dispersion (V) | | | | | | | | 10 | | | | | |
| Polyisocyanate compound (note 1) | | | | | | | | | 5 | | | | |

TABLE VIII-2-continued

| Composition of a clear coating and performance test | Example | | | | | | | | | | Comparative Example | | |
|---|---|---|---|---|---|---|---|---|---|---|---|---|---|
| | VIII-5 | VIII-6 | VIII-7 | VIII-8 | VIII-9 | VIII-10 | VIII-11 | VIII-12 | VIII-13 | VIII-14 | VIII-3 | VIII-4 | VIII-5 |
| Oxazoline compound (note 2) | | | | | | | | | | 0.75 | | | |
| Catalyst A for curing (note 3) | 0.015 | 0.015 | 0.015 | 0.015 | 0.015 | 0.015 | 0.015 | 0.015 | 0.015 | | | 0.015 | 0.015 |
| Catalyst B for curing (note 4) | | | | | | | | | | 0.008 | | | |
| Thinner | 11 | 11 | 11 | 11 | 11 | 11 | 12 | 11 | 16 | 12 | 11 | 11 | 11 |
| Nonvolatile components in a coating (% by mass) | 45 | 45 | 45 | 45 | 45 | 45 | 45 | 45 | 45 | 45 | 45 | 45 | 45 |
| Dryability (sec) | 90 | 60 | 90 | 30 | 60 | 90 | 60 | 60 | 60 | 60 | 120 | 270 | 180 |
| Hardness of a coating layer  1 day | 4.2 | 6.6 | 3.9 | 7.0 | 4.5 | 3.9 | 4.5 | 4.5 | 3.8 | 3.9 | 2.0 | 3.1 | 3.0 |
| Hardness of a coating layer  7 days | 9.2 | 10.7 | 8.8 | 11.0 | 9.2 | 9.0 | 9.2 | 9.4 | 9.1 | 9.1 | 3.3 | 3.5 | 8.0 |
| Outer appearance after finishing | ○ | ○ | ○ | ○ | ○ | ○ | ○ | ○ | ○ | ○ | Δ | Δ | × |
| Accelerated weatherability | ○ | ○ | ○ | ○ | ○ | ○ | ○ | ○ | ○ | ○ | × | ○ | × |
| Storage stability | ○ | ○ | ○ | ○ | ○ | ○ | ○ | ○ | ○ | ○ | ○ | ○ | ○ |

It is to be noted that (note 1)-(note 2) and experimental methods in the Table VIII-2 are as follows.

(note 1) Polyisocyanate compound: "N-3500" which is an isocyanurate type one of hexamethylene diisocyanate manufactured by Sumitomo Bayer Urethane, Ltd., and which has nonvolatile components of 100%, NCO group content of 21.6%.

(note 2) Oxazolidine compound: "Incozol LV" manufactured by Industrial Copolymer, Ltd., and which has a purity of 99%.

(note 3) Catalyst A for curing: dibutyltin dilaurate (note 4) Catalyst B for curing: diisopropyl phosphate Experimental Methods Dryability: After coated at 20° C. and a coated plate was horizontally maintained for 20 minutes, it was placed at the temperature of 20° C. and humidity of 75% RH in an air-conditioned room, and 8 pieces of gauze were put one upon another on surface of coating layer, and the weight of 200 g having contact area of 12.56 cm$^2$ was put on the gauze. There was measured a placing time of period (second) during which the gauze does not completely leave marks.

Hardness of coating layer: After coated at 20° C. and a coated plate was horizontally maintained for 20 minutes, it was placed at the temperature of 20° C. and humidity of 75% RH in an air-conditioned room for 1 day or 7 days, and Toucon hardness of the coating layer was measured under a condition of 20° C. using a Toucon hardness meter manufactured by American Chain & Cable Company. A larger value is harder.

Finishing state: After coated at 20° C. and a coated plate was horizontally maintained for 20 minutes, it was placed at the temperature of 20° C. and humidity of 75% RH in an air-conditioned room for 1 day, and smoothness, a build-feeling, and transparency in the coating layer on the plate were visually judged.

○: excellent
Δ: slightly worse
×: worse

Accelerated weatherability: After coated at 20° C. and a coated plate was horizontally maintained for 20 minutes, it was placed at the temperature of 20° C. and humidity of 75% RH in an air-conditioned room for 7 days, and there was observed the presence or the absence of a change in the coating layer after placing the coated plate for 1000 hours in a sunshine weather-o-meter.

○: Surface of the coating layer is not almost changed.
×: Water marks are observed on the surface of the coating layer.

Storage stability: A coating having nonvolatile components of 45% was sealed up and stored at 40° C. for 6 months and, subsequently, a viscosity change was measured.

○: Viscosity change was not almost observed.
Δ: Viscosity was slightly changed.
×: Viscosity remarkably increased, or gelation was caused.

Hereinafter, the lactide/lactone copolymer of the No. IX in the present invention and the method for the preparation thereof is more specifically illustrated by Examples.

Figure 8:
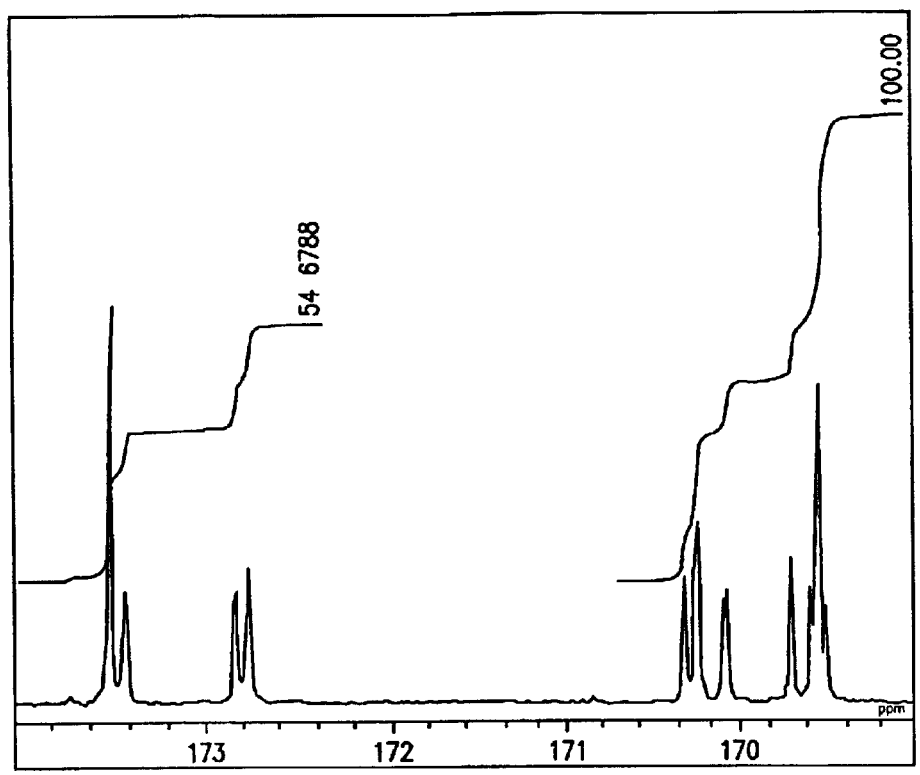
FIG. 8 is a $^{13}$C-NMR chart of a reaction product after completion of the step 1 in Example IX-3.
Figure 9:
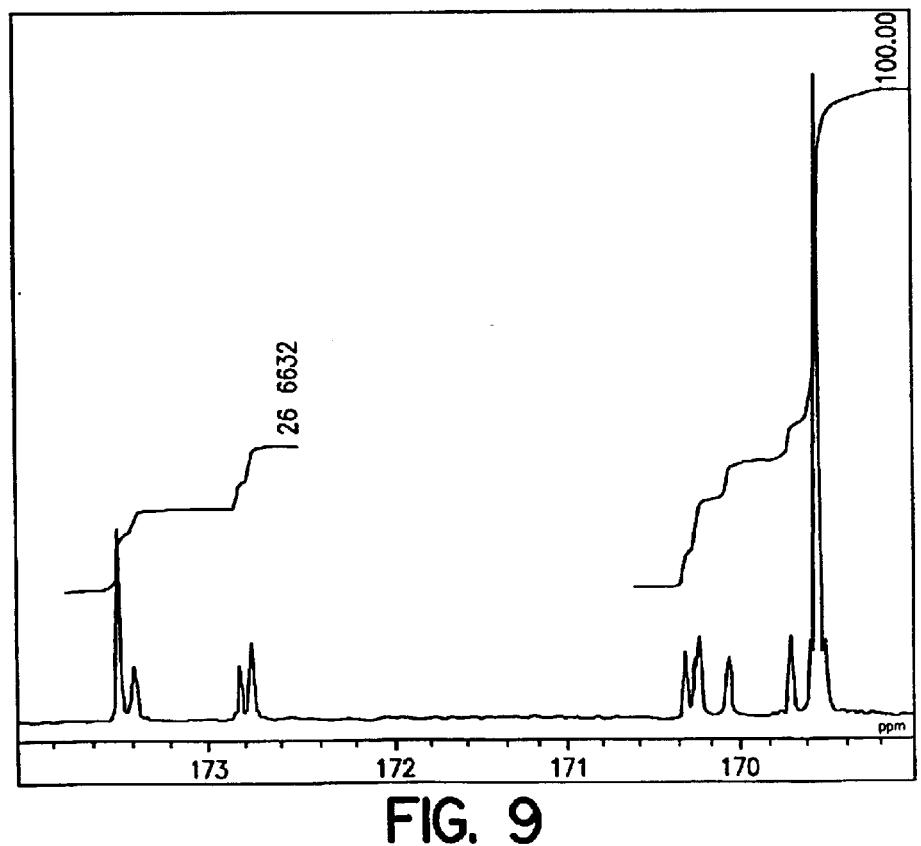
FIG. 9 is a $^{13}$C-NMR chart of a reaction product after completion of the step 2 in Example IX-3.

Molecular weight represents a value based on a Polystyrene measured by GPC. An average continuous chain length in respective units was calculated by integrated values of carbonyl carbon in $^{13}$C-NMR according to a report [Makromol. Chem. 194, 913–925 (1993)] by Kasperczyk, et al. For references, FIG. 8 shows a $^{13}$C-NMR chart after a termination of a step 1 in Example IX-3, and FIG. 9 shows a $^{13}$C-NMR chart after a termination of a step 2 in Example VIII-3.

Average continuous chain length in lactide unit (1LL)=1/2*[LLL+LLC+CLL+CLC]/[CLC+1/2*(LLC+CLL)]

Wherein, LLL, LLC, CLL, and CLC are as follows.
LLL=1/2*[CapLLLL]+1/2*[LLLLCap]+1/3*[CapLLLCap]+[LLLLLL]
LLC=1/2*[CapLLCap]+1/2*[LLLLCap]+1/3*[CapLLLCap]
CLL=1/2*[CapLLCap]+1/2*[CapLLLL]+1/3*[CapLLLCap]
CLC=[CapLCap]

Average continuous chain length in lactone unit (1 Cap)=[LCL+CCL+LCC+CCC]/[LCL+1/2*(CCL+LCC)]

Wherein, LCL, CCL, LCC, and CCC are as follows.
LCL=[LLCapLL]+[LLCapLCap]+[CapLCapLL]+[CapLCapLCap]
CCL=[CapCapLCap]+[CapCapLL]
LCC=[CapLCapCap]+[LLCapCap]
CCC=[CapCapCap]

Carbonyl carbons of the respective units in $^{13}$C-NMR spectrum are assigned as follows.

CapLLLL, LLLLLL: 169.6 ppm; (CapLLLCap: 169.65 ppm); LLLLCap: 169.7 ppm

CapLLLL: 170.1 ppm; (CapLLLCap: 170.15 ppm); CapLLCap: 170.2 ppm (CapLLLCap,): LLLLCap: 170.3 ppm; CapLCap: 170.8 ppm (CapLCapLCap, LLCapLCap: 172.7 ppm); LLCapLL: 172.75 ppm CapCapLL: 172.8 ppm; LLCapCap: 173.4 ppm (CapLCapCap: 173.45 ppm); CapCapCap: 173.5 ppm In the above descriptions, Cap represents caproyl unit, even-numbered pieces of LL represent lactydyl unit, odd-numbered pieces of L represents one piece of lactyl unit and lactydyl unit. Values in ( ) are values for reference.

After measuring the average continuous chain length at a period of termination of respective steps, an average continuous chain length in a random or block portion was decided. According to the method for the preparation of the present invention, since there is not a restructuring of units constructed at a prior step by transesterification reaction, the average continuous chain length in a block portion is decided by a calculation as shown below.

$$1LL(B) = [1LL(2) - F1_1 LL(1)]/F_2$$

[wherein, 1LL(B) represents the average continuous chain length of lactide units in a block portion, 1LL(1) represents the average continuous chain length of lactide units at termination of the step 1, 1LL(2) represents the average continuous chain length of lactide units at termination of the step 2, $F_1$ represents a lactide amount fed in the step 1, and $F_2$ represents a lactide amount fed in the step 2]

Tensile test was according to JIS K7113.

DCS measurement was conducted at a temperature elevation speed of 10° C./min.

Comparative Example IX-A

A lactide/caprolactone (=60/40) copolymer was synthesized at 180° C. by adding 138.4 g (960.2 mmol) of a lactide monomer (water content of 70 ppm, an acid value of 0.12 mgKOH/g), 70.9 ml (639.8 mmol) of a caprolactone monomer (water content of 70 ppm, an acid value of 0.10 mgKOH/g), 89.0 ml (1.6 mmol) of ethylene glycol which is an initiator, and 0.26 ml (0.8 mmol) of tin octylate which is a catalyst.

A molecular weight of the copolymer obtained was 97,300, the average continuous chain length of lactide units was 3.3, the average continuous chain length of lactone units is 1.8, and Tg was 13.2° C.

In a sheet having thickness of 2 mm molded from the copolymer by a compression molding, elasticity was 4 kgf/cm$^2$, tensile strength was not less than 12 kgf/cm$^2$, and elongation at rupture was not less than 1,700%.

Further, in a polymer sampled on the way of a reaction, total conversion was 56.5%, conversion of lactide was 98.5%, 1LL was 85.7, and 1Cap was 1.9. From the results, it is understood that a transesterification reaction is caused on the way of the reaction in the copolymer obtained by the synthesis method and, structures as shown in the present invention are contained only in a low content. Low elasticity shows a fact.

Comparative Example IX-B

A lactide/caprolactone (=60/40) copolymer was synthesized at 150° C. by adding 138.4 g (960.2 mmol) of a lactide monomer (water content of 70 ppm, an acid value of 0.12 mgKOH/g), 70.9 ml (639.8 mmol) of a caprolactone monomer (water content of 70 ppm, an acid value of 0.10 mgKOH/g), 89.0 ml (1.6 mmol) of ethylene glycol which is an initiator, and 0.26 ml (0.8 mmol) of tin octylate which is a catalyst.

A molecular weight of the copolymer obtained was 97,900, the average continuous chain length of lactide units was 3.9, the average continuous chain length of lactone units is 2.0, and Tg was 4.3° C.

In a sheet having thickness of 2 mm molded from the copolymer by a compression molding, elasticity was 7 kgf/cm$^2$, tensile strength was not less than 20 kgf/cm$^2$, and elongation at rupture was not less than 2,050%.

Further, in a polymer sampled on the way of a reaction, total conversion was 59.2%, conversion of lactide was 98.5%, 1LL was 6.9, and 1Cap was 2.2. From the results, it is understood that a transesterification reaction is caused on the way of the reaction in the copolymer obtained by the synthesis method and, structures as shown in the present invention are contained only in a low content. Low elasticity shows a fact.

Comparative Example IX-C

A lactide/caprolactone (=60/40) copolymer was synthesized at 180° C. by adding 70.9 ml (639.8 mmol) of a caprolactone monomer (water content of 70 ppm, an acid value of 0.10 mgKOH/g) and 0.25 ml (1.6 mmol) of octanol which is an initiator, and 0.26 ml (0.8 mmol) of tin octylate which is a catalyst, followed by adding 138.4 g (960.2 mmol) of a lactide monomer (water content of 70 ppm, an acid value of 0.12 mgKOH/g) while further agitating at 180° C.

A molecular weight of the copolymer was 60,000, the average continuous chain length of lactide units was 153.6, the average continuous chain length of lactone units is 31.4, Tg was −68.2° C., and Tm was 55.9° C. and 164.8° C.

In a sheet having thickness of 2 mm molded from the copolymer by a compression molding, elasticity was 2844 kgf/cm$^2$, tensile strength was 56 kgf/cm$^2$, and elongation at rupture was not less than 2.4%.

Comparative Example IX-D

A lactide/caprolactone (=60/40) copolymer was synthesized at 180° C. by adding 70.9 ml (639.8 mmol) of a caprolactone monomer (water content of 70 ppm, an acid value of 0.10 mgKOH/g) and 89.0 ml (1.6 mmol) of ethylene glycol which is an initiator, and 0.26 ml (0.8 mmol) of tin octylate which is a catalyst, followed by adding 138.4 g (960.2 mmol) of a lactide monomer (water content of 70 ppm, an acid value of 0.12 mgKOH/g) while further agitating at 180° C.

A molecular weight of the copolymer was 30,000, the average continuous chain length of lactide units was 40.4, the average continuous chain length of lactone units is 39.3, Tg was −68.5° C., and Tm was 56.5° C. and 162.0° C.

A sheet having thickness of 2 mm molded from the copolymer by a compression molding is very brittle, and tensile strength was impossible.

Comparative Example IX-E

A polymerization was conducted by adding 138.4 g (960.2 mmol) of a lactide monomer (water content of 70 ppm, an acid value of 0.12 mgKOH/g), 106.4 ml (960.2 mmol) of a caprolactone monomer (water content of 70 ppm, an acid value of 0.10 mgKOH/g), and 0.368 ml (2.4 mmol) of diethylaluminum ethoxide which is an initiator at 75° C. in chlorobenzene for 280 hours. A copolymer was precipitated by hexane from a solution obtained, and dried at 50° C. in vacuo.

Yield of the copolymer obtained was 74.0%, and a molecular weight was 97,500. The average continuous chain length of lactide units was 6.7, and the average continuous chain length of lactone units was 3.2.

In a sheet having thickness of 2 mm molded from the copolymer by a compression molding, elasticity was 18 kgf/cm$^2$, tensile strength was 28 kgf/cm$^2$, and elongation at rupture was not less than 920%.

Further, in a copolymer sampled on the way of a reaction, total conversion was 53.3%, conversion of lactide was 90.7%, 1LL was 15.3 which is the average continuous chain length of lactide units, and 1cap was 2.5 which is the average continuous chain length of lactone units. From the results, it is understood that a transesterification reaction is caused on the way of the reaction in the copolymer obtained by the synthesis method and, structures as shown in the present invention are contained only in a low content. Low elasticity shows a fact.

Example IX-1

Polymerization was conducted at 180° C. by adding 13.84 g (96.02 mmol) of a lactide monomer (water content of 70 ppm, an acid value of 0.12 mgKOH/g), 70.9 ml (639.8 mmol) of a caprolactone monomer (water content of 70 ppm, an acid value of 0.10 mgKOH/g), and 89.0 ml (1.6 mmol) of ethylene glycol which is an initiator, and 0.26 ml (0.8 mmol) of tin octylate which is a catalyst, followed by adding 124.6 g (864.2 mmol) of a lactide monomer so that total molar ratio of lactide/caprolactone is adjusted to 60/40 while further agitating at 180° C. to synthesize a lactide/caprolactone (=60/40) copolymer.

Molecular weight of the copolymer obtained was 84,300, the average continuous chain length of lactide units was 12.5, the average continuous chain length of lactone units is 5.9, Tg was −47.5° C., and Tm was 42.1° C. and 164.0° C. Further, at a period of termination of the step 1, 1LL(1) was 1.3 which is the average continuous chain length of lactide units, and 1Cap (1) was 5.9 which is the average continuous chain length of lactone units.

From the results, it was confirmed that 1LL(R) is 1.3 which is the average continuous chain length of lactide units of a random portion, and 1LL(B) is 13.7 which is the average continuous chain length of lactide units of a block portion.

In a sheet having thickness of 2 mm molded from the copolymer by a compression molding, elasticity was 920 kgf/cm$^2$, tensile strength was 41 kgf/cm$^2$, and elongation at rupture was 8.9%.

Example IX-2

Polymerization was conducted at 180° C. by adding 41.52 g (288.06 mmol) of a lactide monomer (water content of 70 ppm, an acid value of 0.12 mgKOH/g), 70.9 ml (639.8 mmol) of a caprolactone monomer (water content of 70 ppm, an acid value of 0.10 mgKOH/g), and 89.0 ml (1.6 mmol) of ethylene glycol which is an initiator, and 0.26 ml (0.8 mmol) of tin octylate which is a catalyst, followed by adding 96.9 g (672.1 mmol) of a lactide monomer so that total molar ratio of lactide/caprolactone is adjusted to 60/40 while agitating at 180° C. to synthesize a lactide/caprolactone (=60/40) copolymer.

Molecular weight of the copolymer obtained was 83,900, the average continuous chain length of lactide units was 5.5, the average continuous chain length of lactone units is 3.0, Tg was −29.1° C., and Tm was 152.0° C.

In a sheet having thickness of 2 mm molded from the copolymer by a compression molding, elasticity was 239 kgf/cm$^2$, tensile strength was 26 kgf/cm$^2$, and elongation at rupture was 870%.

Example IX-3

Polymerization was conducted at 180° C. by adding 69.2 g (480.1 mmol) of a lactide monomer (water content of 70 ppm, an acid value of 0.12 mgKOH/g), 70.9 ml (639.8 mmol) of a caprolactone monomer (water content of 70 ppm, an acid value of 0.10 mgKOH/g), and 89.0 ml (1.6 mmol) of ethylene glycol which is an initiator, and 0.26 ml (0.8 mmol) of tin octylate which is a catalyst, followed by adding 69.2 g (480.1 mmol) of a lactide monomer so that total molar ratio of lactide/caprolactone is adjusted to 60/40 while further agitating at 180° C. to synthesize a lactide/caprolactone (=60/40) copolymer.

Molecular weight of the copolymer obtained was 86,000, the average continuous chain length of lactide units was 4.7, the average continuous chain length of lactone units is 2.3, Tg was −14.0° C., and Tm was 138.0° C.

In a sheet having thickness of 2 mm molded from the copolymer by a compression molding, elasticity was 70 kgf/cm$^2$, tensile strength was not less than 63 kgf/cm$^2$, and elongation at rupture was not less than 1220%.

Example IX-4

A polymerization was continuously conducted at 180° C. by adding 692 g/h (4.8 mol/h) of a lactide monomer (water content of 70 ppm, an acid value of 0.12 mgKOH/g), 709 ml/h (6.4 mol/h) of a caprolactone monomer (water content of 70 ppm, an acid value of 0.10 mgKOH/g), and 1.1 g/h (5.3 mmol/h) of aluminum isopropoxide which is an initiator through an extruder type reactor, followed by adding 692 g/h (4.8 mol/h) of a lactide monomer so that total molar ratio of lactide/caprolactone is adjusted to 60/40 at 180° C. to further polymerize a lactide/caprolactone (=60/40) copolymer.

Molecular weight of the copolymer obtained was 80,000, the average continuous chain length of lactide units was 4.6, the average continuous chain length of lactone units is 2.3, Tg was −13.8° C., and Tm was 135.7° C.

In a sheet having thickness of 2 mm molded from the copolymer by a compression molding, elasticity was 71 kgf/cm$^2$, tensile strength was not less than 68 kgf/cm$^2$, and elongation at rupture was not less than 1320%.

Example IX-5

Polymerization was conducted at 180° C. by adding 41.52 g (288.06 mmol) of a lactide monomer (water content of 70 ppm, an acid value of 0.12 mgKOH/g), 49.6 ml (447.9 mmol) of a caprolactone monomer (water content of 70 ppm, an acid value of 0.10 mgKOH/g), and 89.0 µl (1.6 mmol) of ethylene glycol which is an initiator, and 0.26 ml (0.8 mmol) of tin octylate which is a catalyst, followed by adding 96.9 g (672.1 mmol) of a lactide monomer and 21.3 ml (191.9 mmol) of a caprolactone monomer so that total molar ratio of lactide/caprolactone is adjusted to 60/40 while further agitating at 180° C. to synthesize a lactide/caprolactone (=60/40) copolymer.

Molecular weight of the copolymer obtained was 85,100, the average continuous chain length of lactide units was 5.1, the average continuous chain length of lactone units is 3.4, Tg was −33.8° C., and Tm was 158.1° C.

In a sheet having thickness of 2 mm molded from the copolymer by a compression molding, elasticity was 22 kgf/cm², tensile strength was not less than 35 kgf/cm², and elongation at rupture was not less than 1200%.

Example IX-6

Polymerization was conducted at 180° C. by adding 41.52 g (288.06 mmol) of a lactide monomer (water content of 70 ppm, an acid value of 0.12 mgKOH/g), 49.6 ml (447.9 mmol) of a caprolactone monomer (water content of 70 ppm, an acid value of 0.10 mgKOH/g), and 89.0 µl (1.6 mmol) of ethylene glycol which is an initiator, and 0.26 ml (0.8 mmol) of tin octylate which is a catalyst.

Subsequently, 21.3 ml (191.9 mmol) of a caprolactone monomer was added, and 96.9 g (672.1 mmol) of a lactide monomer was added so that molar ratio of lactide/caprolactone is adjusted to 60/40 while agitating at 180° C. to synthesize a lactide/caprolactone (=60/40) copolymer having total molar ratio of lactide/caprolactone 60/40 at a termination period of polymerization.

Molecular weight of the copolymer obtained was 82,000, the average continuous chain length of lactide units was 5.7, the average continuous chain length of lactone units is 3.7, Tg was −13.3° C., and Tm was 56.8° C. and 152.1° C.

In a sheet having thickness of 2 mm molded from the copolymer by a compression molding, elasticity was 305 kgf/cm², tensile strength was 37 kgf/cm², and elongation at rupture was not less than 380%.

The above results are shown in Table IX-1.

An number average continuous chain length: 1LL(1) is the length of the lactide unit at a termination period of the step 1, 1Cap(1) is the length of the lactone unit at a termination period of the step 1, 1LL is the length of the lactide unit at a termination period of the step 2, 1cap is the length of the lactone unit at a termination period of the step 2, 1LL(B) is the length of the lactide unit in a block portion, and 1LL(R) is the length of the lactide unit in a random portion.

Possibility of Utilization in Industry

According to the No. I in the present invention, there can become readily designed aliphatic polyesters having a controlled thermal decomposition property, hydrolizability, and biodegradability without affecting to other physical properties, and there is provided a method for the preparation of such the aliphatic polyesters.

In the particle-state composition for agriculture and gardening of the No. II in the present invention, biodegradability in a coating thin layer can become appropriately and selectively lowered, a duration period of time a fertilizing effect can be controlled, and the coating thin layer is disintegrated and decomposed by microorganisms in soil after elution of a fertilizer, whereby, it is not remained in soil. Further, it has an effect that residual components disappear after a cultivation period of farm products by disintegration and decomposition of the coating thin layer, and it becomes easy to control a supply of the fertilizer.

In the particle-state composition for agriculture and gardening of the No. III in the present invention, operability of solvent is excellent in a period of formation of a coating thin layer, and a duration period of time of a fertilizing effect can be controlled in the particle-state composition for agriculture and gardening obtained, and the coating thin layer is disintegrated and decomposed by microorganisms in soil after elution of a fertilizer, whereby, it is not remained in soil. Further, it has an effect that residual components disappear after a cultivation period of field products by disintegration and decomposition of the coating thin layer, and it becomes easy to control a supply of the fertilizer.

TABLE IX-1

|  | Molecular weight | 1 LL | 1 Cap | Eleasticity | Tensile Strength | Extention at fracture | Tg | 1 LL (1) 1 LL (B) | 1 Cap (1) 1 LL (R) |
|---|---|---|---|---|---|---|---|---|---|
| Comparative Example IX-A | 97,300 | 3.3 | 1.8 | 4 | >11 | >1700 | 13.2 |  |  |
| Comparative Example IX-B | 97,900 | 3.9 | 2.0 | 7 | >20 | >2050 | 4.3 |  |  |
| Comparative Example IX-C | 60,000 | 153.6 | 31.4 | 2844 | 56 | 2.4 | −68.2 |  |  |
| Comparative Example IX-D | 30,000 | 40.4 | 39.3 | — | — | — | −68.5 |  |  |
| Example IX-1 | 84,300 | 12.5 | 5.9 | 920 | 41 | 8.9 | −47.5 | 1.3 13.7 | 5.9 1.3 |
| Example IX-2 | 83,900 | 5.5 | 3.0 | 239 | 26 | 870 | −29.1 | 1.8 7.1 | 3.1 1.8 |
| Example IX-3 | 86,000 | 4.7 | 2.3 | 70 | >68 | >1220 | −14.0 | 2.4 7.0 | 2.5 2.4 |
| Example IX-4 | 80,900 | 4.6 | 2.3 | 71 | >68 | >1320 | −19.8 | 3.6 6.9 | 2.5 3.6 |
| Example IX-5 | 85,100 | 5.1 | 3.4 | 22 | >35 | >1200 | 13.8 | 3.1 6.0 | 3.7 8.1 |
| Example IX-6 | 82,000 | 5.7 | 3.7 | 305 | 37 | 380 | −13.3 | 1.9 7.3 | 2.1 1.9 |

Unit: In the elasticity and tensile strength, it is kgf/cm², in the elongation at rupture, it is %, and, in the glass transition temperature Tg, it is °C.

In the base film for a marking film of the No. IV in the present invention, there is employed an aliphatic cellulose ester derivative obtained by a ring-opening graft polymerization of a cyclic ester with a fatty acid cellulose ester having hydroxyl groups. And, it does not contain additives having a migrating property compared to conventional publicly-known mixed-type plasticizers having a low or high molecular weight, it is most appropriate as utilization for the derivative.

By the use of the heat-sensitive transfer picture image recording material formed by the cyclic ester-modified cellulose ester derivative of the No. V in the present invention, there can be obtained a printed picture image having a high coloring concentration while maintaining a strippability.

By setting up the heat-resistible protecting layer composed of the cyclic ester-modified cellulose ester derivative of the No. VI in the present invention onto an opposite surface to surface having a heat-transfer ink layer in a substrate, the following excellent effects can be obtained, and an excellent printing quality can be obtained. (i) Occurrence of a sticking phenomenon can be sufficiently prevented. (ii) There can be suppressed occurrence of a migrating phenomenon of constructing components in the heat-resistible protecting layer toward a surface of an ink layer and a blocking phenomenon even in the case of storing a heat-sensitive transfer picture image recording medium for a long period of time or under a high temperature in a roll state. (iii) Staining of a thermal head is suppressed which is caused by the heat-resistible protecting layer shaved by an abrasion force with the thermal head.

In the conductive coating composition of the No. VII in the present invention in which there are mixed a conductive carbon black and a scaly graphite in a specified proportion, since the scaly graphite is not apt to be separated from resin components and to precipitate, there is shown an effect that it is excellent in storage stability for a long time of period and, since those connect each other, there can be repeatedly and efficiently obtained an effect that it elevates conductivity in a coating layer.

By the use of a cellulose ester derivative obtained by a ring-opening graft polymerization of a cyclic ester with a cellulose ester having hydroxyl groups, since there is shown an effect that contact of the scaly graphite itself is often caused and conductivity in a coating layer is elevated by connection of the scaly graphite with the scaly graphite, there can be formed a coating layer which is excellent in adhesion to an article to be coated and a finishing coating, and which is excellent in conductivity.

According to the No. VIII in the present invention, there can be obtained a moisture-curable type graft copolymer which is useful for a single-liquid type coating and a sealing agent, and a coating composition containing the copolymer, in which there is not a problem such as a toxicity and an irritative property, and which is excellent in dryability and does not deteriorate physical properties in a coating layer.

According to the No. IX in the present invention, there can be obtained a lactide/lactone copolymer which is excellent in a heat resistance and an impact resistance, and there can be stably obtained the copolymer in a low cost.

What is claimed is:

1. A lactide/lactone copolymer wherein an average continuous chain length is at least 3 in a lactide unit and an average continuous chain length is 1–10 in a lactone unit, and in which the lactide unit is composed of a random portion having the average continuous chain length of not more than 5 and a block portion having the average continuous chain length of more than 5, and a average continuous chain length 1LL(B) in the block portion is satisfied by the formula described below;

$$1LL(B)^2 > (fL/(fL+fCap))^3 \times 23$$

wherein fL is the fraction of lactide component in the lactide/lactone copolymer, and fCap is the fraction of lactone component in the lactide/lactone copolymer.

2. A method for the preparation of a lactide/lactone copolymer having an average continuous chain length of not less than 3 in the lactide unit and an average continuous chain length of 1–10 in the lactone unit or a lactide/lactone copolymer wherein an average continuous chain length is at least 3 in a lactide unit and an average continuous chain length is 1–10 in a lactone unit, and in which the lactide unit is composed of a random portion having the average continuous chain length of not more than 5 and a block portion having the average continuous chain length of more than 5, and a number average continuous chain length 1LL(B) in the block portion is satisfied by the formula described below;

$$1LL(B)^2 > (fL/(fL+fCap))^3 \times 23$$

(wherein fL is a component of a lactone in the lactide/lactone copolymer and fCap is a component of a lactide in the lactide/lactone copolymer);

characterized in that a polymerization is conducted by adding residual lactide during or after a polymerization of 2–85% of the lactide in total lactide components with the lactone.

3. A method for the preparation of a lactide/lactone copolymer having an average continuous chain length of not less than 3 in the lactide unit and an average continuous chain length of 1–10 in the lactone unit or a lactide/lactone copolymer having an average continuous chain length of 1–20 in the lactide unit and an average continuous chain length of not less than 3 in the lactone unit, or a lactide/lactone copolymer wherein an average continuous chain length is at least 3 in a lactide unit and an average continuous chain length is 1–10 in a lactone unit, and in which the lactide unit is composed of a random portion having the average continuous chain length of not more than 5 and a block portion having the average continuous chain length of more than 5, and a number average continuous chain length 1LL(B) in the block portion is satisfied by the formula described below;

$$1LL(B)^2 > (fL/(fL+fCap))^3 \times 23$$

(wherein fL is a component of a lactone in the lactide/lactone copolymer and fCap is a component of a lactide in the lactide/lactone copolymer);

characterized in that a polymerization is conducted by adding residual lactide and lactone during or after a polymerization of 2–85% of the lactide in total lactide components with 50–98% of the lactone in total lactone components.

4. A method for the preparation of a lactide/lactone copolymer having an average continuous chain length of not less than 3 in the lactide unit and an average continuous chain length of 1–10 in the lactone unit or a lactide/lactone copolymer having an average continuous chain length of 1–20 in the lactide unit and an average continuous chain length of not less than 3 in the lactone unit, or a lactide/lactone copolymer wherein an average continuous chain length is at least 3 in a lactide unit and an average continuous chain length is 1–10 in a lactone unit, and in which the lactide unit is composed of a random portion having the average continuous chain length of not more than 5 and a block portion having the average continuous chain length of more than 5, and a number average continuous chain length $1LL(B)$ in the block portion is satisfied by the formula described below;

$$1LL(B)^2 > (fL/(fL+fCap))^3 \times 23$$

(wherein fL is a component of a lactone in the lactide/lactone copolymer and fCap is a component of a lactide in the lactide/lactone copolymer);

characterized in that there is repeatedly conducted an operation by adjusting the ratio of a lactide/lactone unit number to not more than 2.5 and adding at least one of residual lactide and lactone during or after a polymerization of 2–85% of the lactide in total lactide components with 50–98% of the lactone in total lactone components.

* * * * *

UNITED STATES PATENT AND TRADEMARK OFFICE
CERTIFICATE OF CORRECTION

PATENT NO.         : 6,864,351 B2                                Page 1 of 1
APPLICATION NO.    : 10/261422
DATED              : March 8, 2005
INVENTOR(S)        : Masanori Sakane and Masaaki Ito It is certified that error appears in the above-identified patent and that said Letters Patent is hereby corrected as shown below:

On the Title page, after line 58, insert the following references considered by the Examiner:

WO 92/04393       3/1992

JP 2-84434        3/1990

JP 9-59356        3/1997

JP 9-100344       4/1997

EP 900815         7/1999

Signed and Sealed this

Seventh Day of August, 2007

JON W. DUDAS
*Director of the United States Patent and Trademark Office*